(12) United States Patent
Maus et al.

(10) Patent No.: US 6,547,020 B2
(45) Date of Patent: Apr. 15, 2003

(54) BATTERY MOUNTING ASSEMBLY

(75) Inventors: Jeremy P. Maus, Bloomington, MN (US); Richard A. Mink, Ossian, IN (US); Nathan L. Schuler, Fort Wayne, IN (US); Steven W. Weissner, Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 45 days.

(21) Appl. No.: 09/845,857

(22) Filed: May 4, 2001

(65) Prior Publication Data
US 2002/0162696 A1 Nov. 7, 2002

(Under 37 CFR 1.47)

(51) Int. Cl.[7] ............... B60R 16/04; B62D 7/22; B60J 7/00
(52) U.S. Cl. ............. 180/68.5; 280/784; 296/189
(58) Field of Search ............... 280/784; 180/68.5, 180/65.1; 296/189, 188; 248/548, 503, 900

(56) References Cited

U.S. PATENT DOCUMENTS

| 3,708,028 A | * | 1/1973 | Hafer | 180/68.5 |
|---|---|---|---|---|
| 3,821,997 A | * | 7/1974 | Sieren | 180/68.5 |
| 4,216,839 A | * | 8/1980 | Gould et al. | 180/65.1 |
| 4,754,827 A | * | 7/1988 | Hirabyashi | 180/68.5 |
| 5,156,225 A | * | 10/1992 | Murrin | 180/65.1 |
| 5,379,555 A | * | 1/1995 | Waters et al. | 429/97 |
| 5,392,873 A | * | 2/1995 | Masuyama et al. | 180/68.5 |
| 5,501,289 A | * | 3/1996 | Nishikawa et al. | 180/68.5 |
| 5,555,950 A | * | 9/1996 | Harada et al. | 180/65.1 |
| 5,639,571 A | | 6/1997 | Waters et al. | |
| 5,681,057 A | | 10/1997 | Whirley et al. | |
| 5,709,280 A | | 1/1998 | Beckley et al. | |
| 5,948,298 A | | 9/1999 | Ijaz | |
| 6,189,635 B1 | * | 2/2001 | Schuler et al. | 180/68.5 |
| 6,406,812 B1 | * | 6/2002 | Dreulle et al. | 429/99 |
| 2001/0049056 A1 | * | 12/2001 | Saito et al. | 429/175 |

FOREIGN PATENT DOCUMENTS

| DE | 3150652 A1 | * | 6/1983 | 180/68.5 |
|---|---|---|---|---|
| EP | 1018200930 A1 | * | 8/2001 | 180/68.5 |
| GB | 2 055 704 A | | 3/1981 | |
| JP | 407323737 A | * | 12/1995 | 180/68.5 |

OTHER PUBLICATIONS

Patent Abstracts of Japan, vol. 014, No. 311 (M–0994), Jul. 4, 1990 & JP 02 A (Mazda Motor Corp.), Apr. 16, 1990.

* cited by examiner

Primary Examiner—Brian L. Johnson
Assistant Examiner—G B Klebe
(74) Attorney, Agent, or Firm—Jeffrey P. Calfa; Neil T. Powell; Dennis Kelly Sullivan

(57) ABSTRACT

A battery mounting assembly for mounting batteries to a vehicle. The battery mounting assembly has lower battery tray and an upper battery tray disposed below and above one another respectively. The battery mounting assembly is constructed to move and deform in predetermined ways when it is subjected to relatively large forces such as might occur when the vehicle is involved in a traffic accident. The battery mounting assembly has one or more bumper components intended to protect batteries mounted to the battery mounting assembly from being subjected to a direct impact. Steel components of the battery mounting assembly are coated with an elastomer that has a high electrical resistance.

64 Claims, 27 Drawing Sheets

US 6,547,020 B2

BATTERY MOUNTING ASSEMBLY

BACKGROUND OF THE INVENTION

The present invention relates to assemblies for mounting batteries to vehicles. Modem vehicles utilize electrochemical batteries (hereinafter referred to as batteries) to store relatively large amounts of electrical energy. Some vehicles such as electric vehicles and hybrid electric vehicles need to store especially large quantities of electrical energy. Often the amount of electrical energy that can be stored on such a vehicle is limited as a result of limited space on the vehicle for batteries. The electrical energy stored in the batteries of an electric or hybrid electric vehicle is utilized to provide a "power reserve" at times when the desired rate of travel of the vehicle requires more power than what is being generated by any electrical generators of the vehicle. Such a vehicle can only be propelled at speeds and accelerations that require the "power reserve" until the electrical energy stored in the batteries is depleted. Thus, the quantity of energy stored in the batteries is the biggest determinant of how far and how fast the vehicle can be driven before it must be slowed to allow onboard generators to recharge the batteries or stopped so that external devices can be used to recharge the batteries. Limited driving distances and speeds of electric and hybrid-electric vehicles, as a result of limited amounts of electrical energy that can be stored in the batteries of the vehicles, have made electric and hybrid-electric vehicles seem less convenient to many people than more traditional vehicles.

In the event that a vehicle is involved in a traffic accident, any batteries that are mounted to the vehicle could interact with people and the environment in undesirable ways, as a result of the traffic accident. Damage to the vehicle caused by the traffic accident can cause the electrical connections of the battery(s) to become short-circuited. When the electrical connections of the battery(s) are short-circuited, heating of electrically conductive components of the vehicle and/or sparking may occur, either of which may, in turn, cause fires and/or explosions. It is also possible that the casing(s) of the battery(s) may be damaged and may, therefore, allow chemicals that are generally considered harmful to the environment and living beings to spill from the battery(s).

SUMMARY OF INVENTION

It is thus, an object of the present invention to provide a battery mounting assembly to which a relatively large volume of batteries may be mounted within a relatively compact space. A further object of the present invention is to provide a battery mounting assembly, for which, the risk that the batteries mounted to the vehicle will interact with people or the environment in undesirable ways in the event that the vehicle is involved in a traffic accident is relatively low.

The battery mounting assembly of the present invention provides structure for supporting a number of batteries on a first layer and structure for supporting a plurality of batteries on a second layer spaced vertically above the first layer. By mounting a plurality of batteries on a first layer and a second layer that are spaced below and above one another respectively the battery mounting assembly provides for mounting of relatively large number of batteries within a space that is relatively compact longitudinally and laterally.

The battery mounting assembly is constructed such that there is a relatively small risk that the batteries that are mounted to the battery mounting assembly will interact in an undesirable manner with people or the environment in the event that the vehicle is involved in a traffic accident. At least one embodiment of the battery mounting assembly of the present invention performs in accordance with the safety standards set forth by the Society of Automotive Engineers document J1766. One embodiment of the battery mounting assembly of the present invention is constructed to deform and move in predetermined ways and thus absorb and dissipate large amounts of energy when the battery mounting assembly is subjected to forces and accelerations greater than those experienced during normal vehicle operation. Because the battery mounting assembly of the present invention deforms and moves in such predetermined directions when the vehicle is involved in traffic accidents the mounting of the batteries to the vehicle is maintained and the batteries remain relatively undamaged in all but the most severe traffic accidents. The battery mounting assembly of the present invention is carefully designed such that the strength of certain portions of the battery mounting assembly in certain directions is of a certain proportion of the strength of certain other portions of the battery mounting assembly in certain directions. This proportioning of the strengths of various portions of the battery mounting assembly to one another is what causes the battery mounting assembly to deform and move in predetermined directions when the battery mounting assembly is subjected to forces and accelerations greater than those of normal vehicle operation. The battery mounting assembly is also preferably constructed in a manner such that there is a relatively small risk of electrically conductive components contacting the electrical connections of the batteries as a result of deformations and motions of the vehicle as a result of the vehicle's involvement in a traffic accident. This reduces the risk that the electrical connections of the batteries will be short-circuited as a result of the vehicle's involvement in a traffic accident.

Thus, it can be seen that the above mentioned objects of the invention as well as others not mentioned have been met.

DRAWINGS

Other objects and advantages of the invention will become more apparent upon perusal of the detailed description thereof and upon inspection of the drawings in which.

DETAILS OF INVENTION

Figure 1:
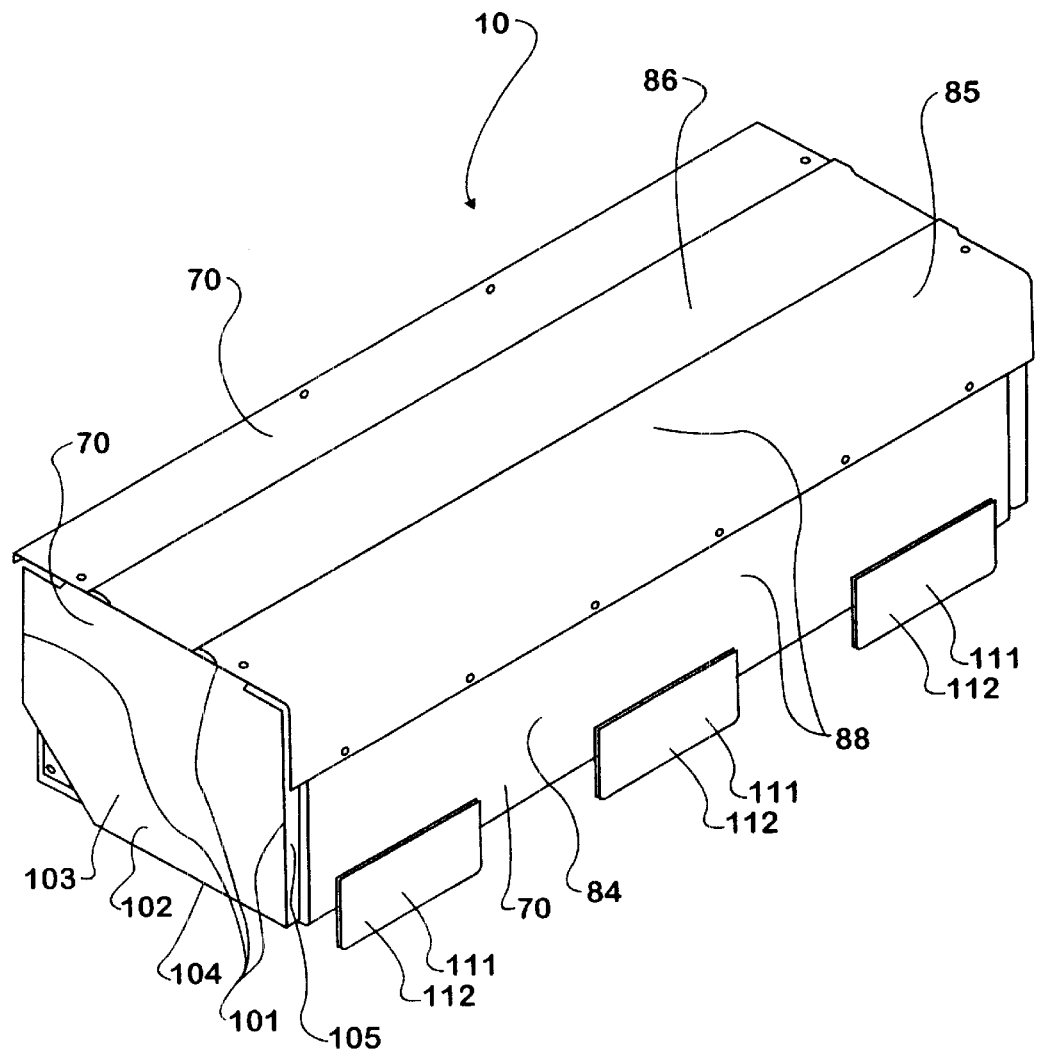
FIG. 1 is a perspective view of the first battery mounting assembly minus the first battery assembly hangers.
Figure 2:
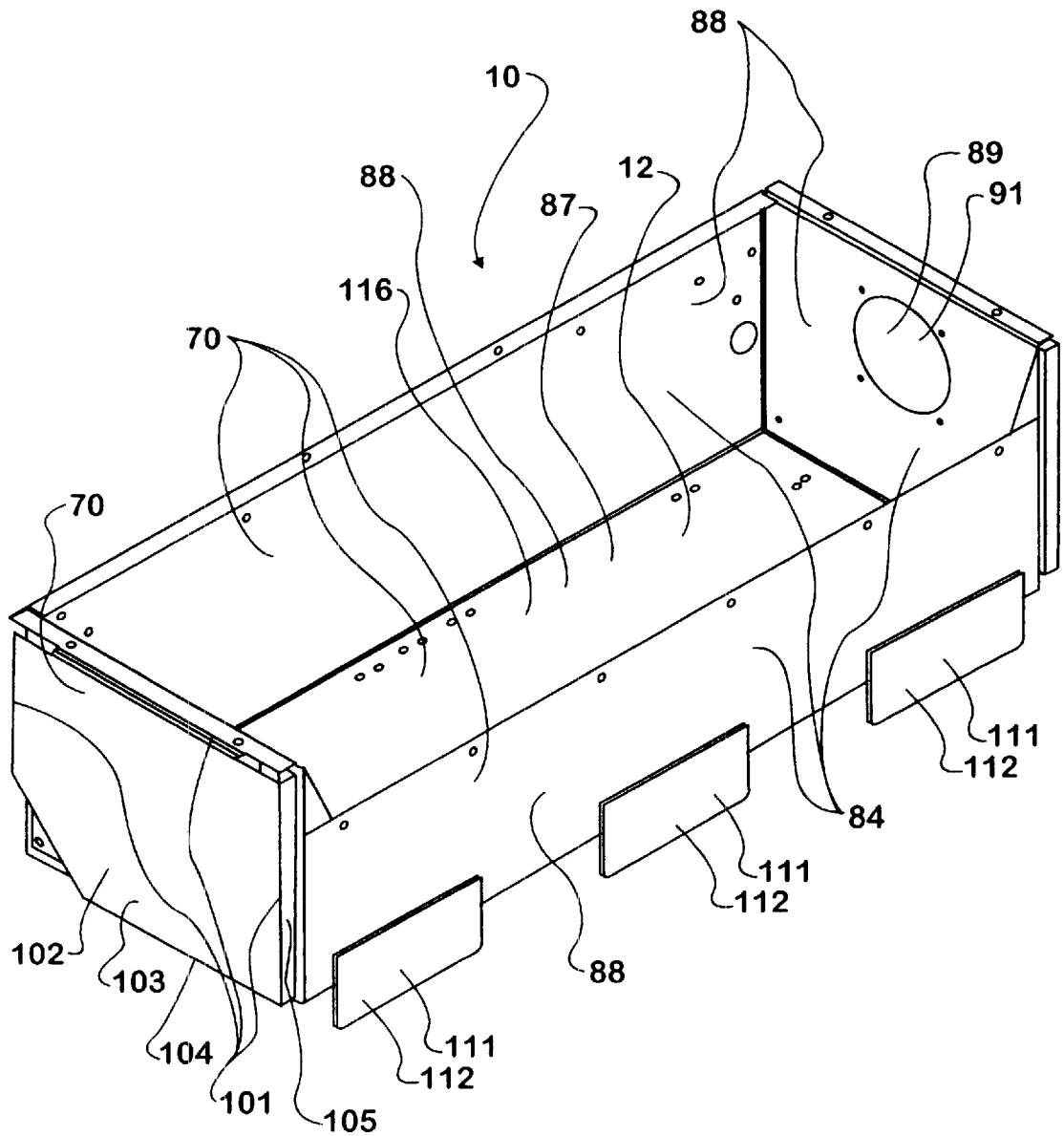
FIG. 2 is a perspective view of the first battery mounting assembly minus the lid and other components showing the interior of the battery mounting assembly.
Figure 3:
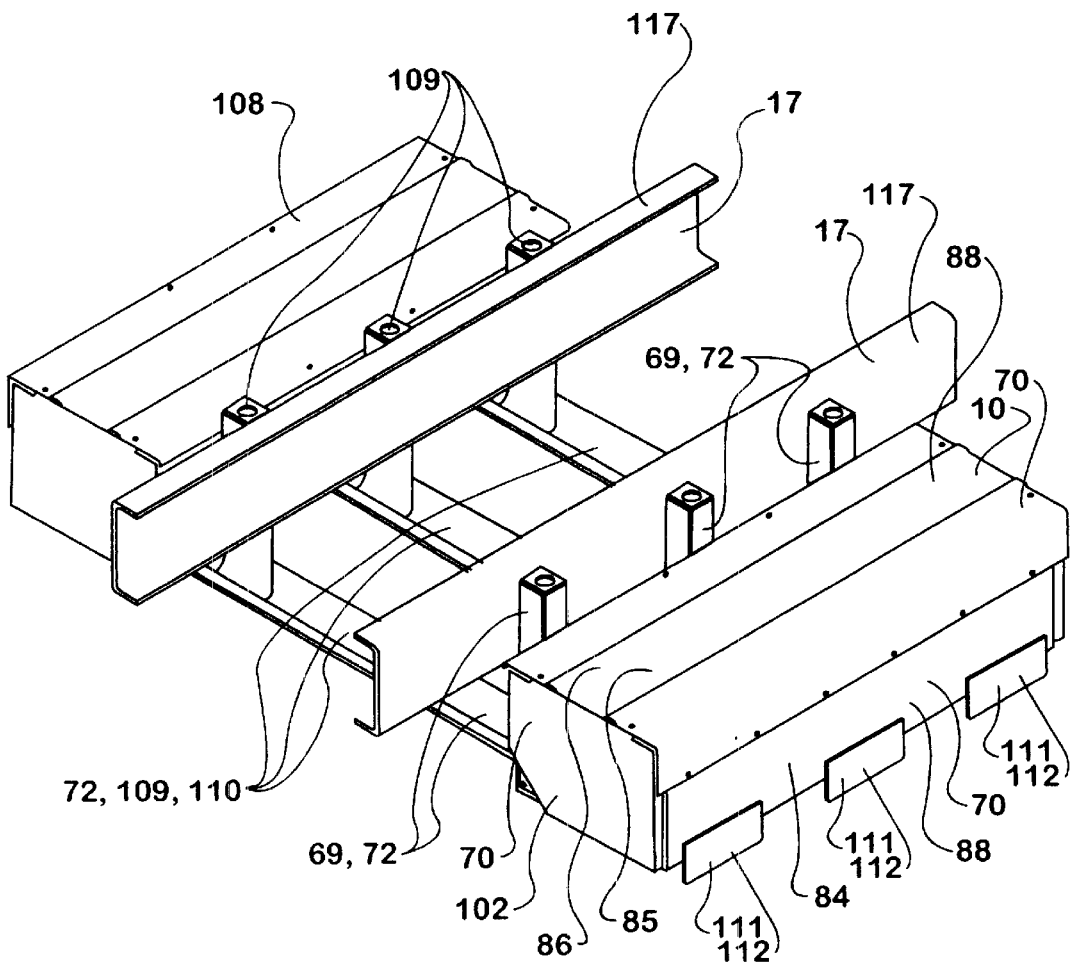
FIG. 3 is a perspective view from above of the first battery mounting assembly and the second battery mounting assembly mounted to the structural components of a vehicle.
Figure 4:
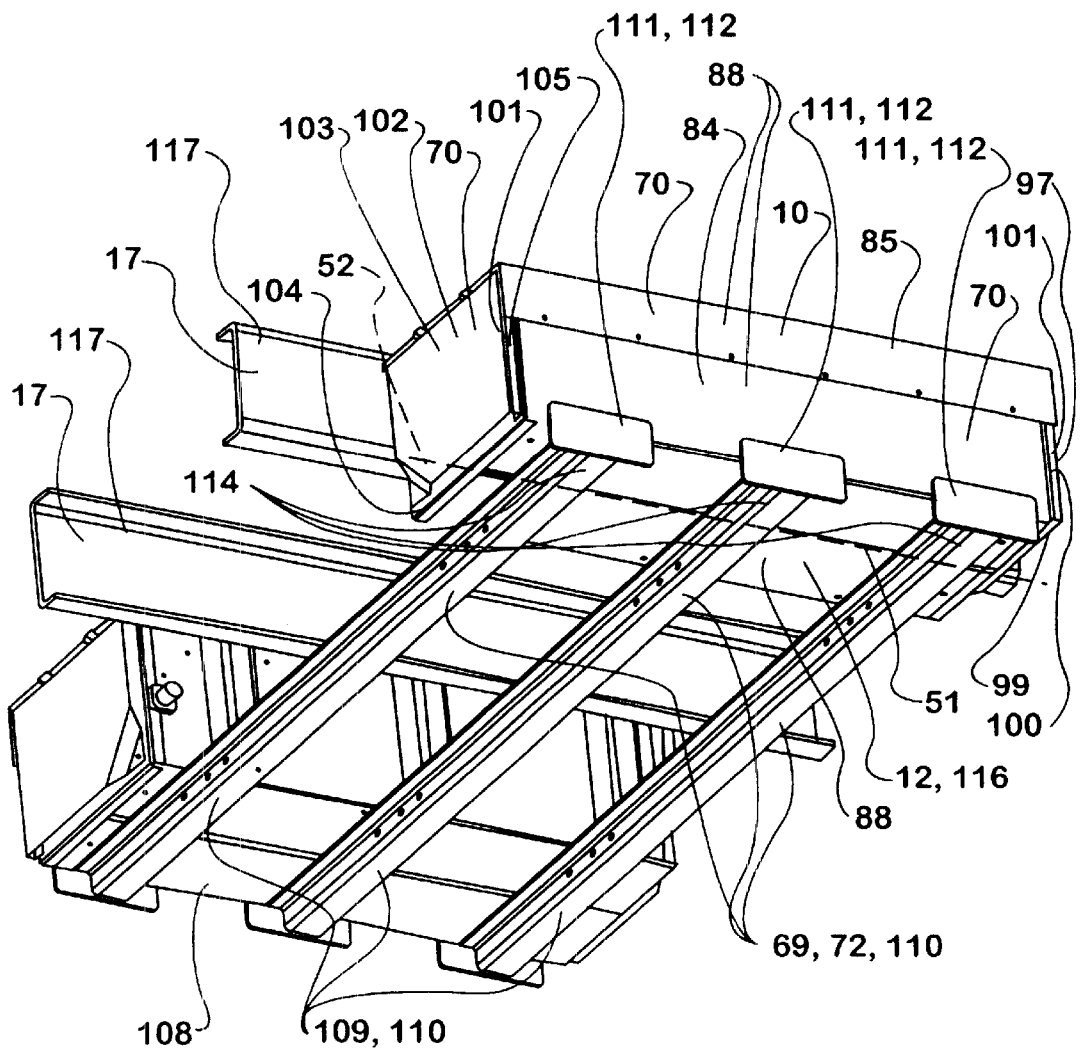
FIG. 4 is a perspective view from below of the first battery mounting assembly and the second battery mounting assembly mounted to the structural components of a vehicle.

The present invention is a first battery mounting assembly 10 for mounting batteries 16 to a vehicle 15. The first battery mounting assembly 10 includes one or more main support members 11 that are directly or indirectly engaged to structural components 17 of the vehicle 15. A first lower battery tray 12, upon which a plurality of batteries 16 may be supported, is engaged to and supported by the one or more main support members 11.

The first battery mounting assembly 10 of the present invention preferably includes structure for mounting a plurality of batteries 16 above those batteries 16 that are supported by the first lower battery tray 12. One or more embodiments of battery mounting assemblies 10 and/or battery mounting assembly components that are constructed in a manner such that they effect such feature(s) are best illustrated in FIGS. 5, 8, 22, 23, 24, 25, 26, and 27. One or more upper tray support components 13 are directly or indirectly engaged to and supported by the one or more main support members 11 and/or the first lower battery tray 12. A first upper battery tray 14, upon which a plurality of batteries 16 may be supported, is engaged to and supported by the one or more upper tray support components 13. At least a portion of the first upper battery tray 14 would be disposed directly vertically above the first lower battery tray 12. The first upper battery tray 14 would be disposed at a vertical distance above the first lower battery tray 12 such that space would be present above the batteries 16 supported by the first lower battery tray 12 and below a lower surface 18 of the first upper battery tray 14.

Preferably the first battery mounting assembly 10 is constructed such that the position of the batteries 16 may be fixed relative to the vehicle 15 when the vehicle 15 is in use. If the batteries 16 were to move relative to the vehicle 15 during operation of the vehicle 15, damage to the batteries 16 or the vehicle 15 and/or physical harm to the occupants of the vehicle 15 could result. Provisions are preferably included for clamping each of the plurality of batteries 16 that may be engaged to the first lower battery tray 12 and each of the plurality of batteries 16 that may be engaged to the first upper battery tray 14 to the first battery mounting assembly 10. One or more embodiments of battery mounting assemblies 10 and/or battery mounting assembly components that are constructed in a manner such that they effect such feature(s) are best illustrated in FIGS. 5, 11, 12, 22, 23, 24, 25, 26, and 27. One or more clamping devices 19 would be included in the first battery mounting assembly 10 for releasably clamping the batteries 16 to the first battery mounting assembly 10. Many types of clamping devices 19 that are well known might work to releaseably clamp the batteries 16 to the first battery mounting assembly 10. In the preferred embodiment clamp plates 20 are used to releaseably clamp the batteries to the first battery mounting assembly 10. When the clamping devices 19 of the preferred embodiment are in use for clamping one or more batteries 16 to the first battery mounting assembly 10 one of the clamp plates 20 abuts a clamp surface 21 of each of the batteries 16. A clamp bolt 22 protrudes through each of the clamp plates 20. A bolt head 23 is disposed on a side of each clamp plate 20 opposite the side of the clamp plate 20 that abuts the clamp surface(s) 21 of the battery(s) 16. A portion of each clamp bolt 22 distant from the bolt head 23 is threadedly engaged to a clamp nut 24. The clamp nut 24 is engaged to the first battery mounting assembly 10 in a manner preventing movement of the clamp nut 24 in a direction toward the bolt head 23. Thus, the clamping devices 19, and clamp plate opposing surfaces 25 apply opposing forces to the clamp surface(s) 21 and other surfaces of each of the batteries 16 in a direction parallel to the shank 25 of the clamp bolt 22. The clamping devices 19, thus, force the one or more batteries 16 against the clamp pate opposing surfaces 25 of the first battery mounting assembly 10. Tangential frictional forces and normal forces between the batteries 16 and surfaces of the first battery mounting assembly 10 maintain the batteries 16 in a fixed position relative to the first battery mounting assembly 10. In the preferred embodiment, the batteries 16 that are supported by the first lower battery tray 12 may be clamped against the first lower battery tray 12 or other components of the first battery mounting assembly 10. Whatever component(s) the batteries 16 that are supported by the first lower battery tray 12 are clamped against are preferably engaged to the first battery mounting assembly 10 in a manner such that their position relative to the vehicle 15 is fixed. This ensures that the position of the batteries 16 that are mounted to the first lower battery tray 12 is fixed relative to the vehicle 15. Also in the preferred embodiment, the batteries 16 that are supported by the first upper battery tray 14 are clamped against the first upper battery tray 14. The first upper battery tray 14 is also preferably fixedly engaged to the upper tray support components 13 when the vehicle is in operation. This ensures that the batteries 16 that are supported by the first upper battery tray 14 are also prevented from moving relative to the vehicle 15 during vehicle 15 operation. In the preferred embodiment the means for fixing the first upper battery tray 14 to the upper tray support components 13 is releaseable. The first upper battery tray 14 may be fixed to the upper tray support components 13 by threaded fasteners for instance. One or more embodiments of battery mounting assemblies 10 and/or battery mounting assembly components that are constructed in a manner such that they effect such feature(s)are best illustrated in FIGS. 5, 7, 8, 22, 23, 24, 25, 26, 27. In such a case threaded fasteners that fixedly engage a first upper battery tray 14 to upper tray support components 13 of the first battery mounting assembly 10 may be removed to allow removal of the first upper battery tray 14 from the first battery mounting assembly 10. The first upper battery tray 14, may, in fact, be removed from the first battery mounting assembly 10 with a plurality of batteries 16 clamped to it. Additionally, the clamping devices 19 that hold the batteries 16 to the first upper battery tray 14 may be released and batteries 16 may be removed from the first upper battery tray 14 regardless of whether the first upper battery tray 14 is fixedly engaged to the upper tray support components 13 or not.

The upper tray support components 13 of the first battery mounting assembly 10 may comprise a first side wall 26 and a second side wall 27. One or more embodiments of battery mounting assemblies 10 and/or battery mounting assembly components that are constructed in a manner such that they effect such feature(s) are best illustrated in FIGS. 5, 7, 8, 22, 23, 24, 25, 26, 27. The first side wall 26 would be fixedly engaged to either the first lower battery tray 12 or to one or more of the one or more main support members 11. The first side wall 26 would extend substantially vertically above the first lower battery tray 12. The second side wall 27 would be fixedly engaged to either the first lower battery tray 12 or to one or more of the one or more main support members 11. The second side wall 27 would extend substantially vertically above the first lower battery tray 12. The first upper battery tray 14 would be engaged directly or indirectly to and would be supported by the first side wall 26 and the second side wall 27. The first upper battery tray 14 would be disposed such that a majority of a battery support surfaces 31 of the first upper battery tray 14 would be disposed horizontally between the first side wall 26 and the second side wall 27. The first side wall 26 and the second side wall 27 would be positioned relative to one another such that a lower battery space 28 would be defined horizontally between the first side wall 26 and the second side wall 27. The relative positioning of the first side wall 26 and the second side wall 27 would also be such that the lower battery space 28 would be disposed vertically above at least a portion of the first lower battery tray 12. At least some of the plurality of batteries 16 that are to be supported on the first lower battery tray 12 would be disposed within the lower battery space 28. The first side wall 26 and the second side wall 27 aid in retaining any battery(s) 16 disposed within the lower battery space 28 in the lower battery space 28. The first side wall 26 and the second side wall 27 may each define one or more side wall openings 29 through themselves. Preferably any side wall openings 29 are of a shape and size such that none of the batteries 16 that are to be supported upon the first lower battery tray 12 could pass through any side wall opening 29.

The first battery mounting assembly 10 may be constructed such that the first upper battery tray 14 is prevented from moving in certain horizontal directions by abutment of portions of the first upper battery tray 14 and the upper tray support components 13. One or more embodiments of battery mounting assemblies 10 and/or battery mounting assembly components that are constructed in a manner such that they effect such feature(s) are best illustrated in FIGS. 7, 11, 12, 22, 23, and 26. The first side wall 26 may be comprised of a plurality of first side wall vertical tabs 30 that are fixedly engaged to the first side wall 26. The first side wall vertical tabs 30 would extend vertically from the first side wall 26 preferably to a point vertically higher than the battery support surface(s) 31 of the first upper battery tray 14. The first side wall vertical tabs 30 would be spaced relative to one another such that first side wall tray locating slots 32 would be defined between respective first side wall vertical tabs 30. Each first side wall tray locating slot 32 would extend from a lower end 33 to an upper end 34 that is an opening between an upper end of adjacent first side wall vertical tabs 30. The second side wall 27 may be comprised of a plurality of second side wall vertical tabs 35 that are fixedly engaged to the second side wall 27. The second side wall vertical tabs 35 would extend vertically from the second side wall 27 preferably to a point vertically higher than the battery support surface 31 of the first upper battery tray 14. The second side wall vertical tabs 35 would be spaced relative to one another such that second side wall tray locating slots 36 would be defined between respective second side wall vertical tabs 35. Each second side wall tray locating slot 36 would extend from a lower end 37 to an upper end 38 that is an opening between an upper end of adjacent second side wall vertical tabs 35. The first upper battery tray 14 may comprise a plurality of tray locating members 39. Each of the tray locating members 39 has a tray engagement end 40 at which it is engaged to the first upper battery tray 14 and a terminal end 41 opposite the tray engagement end 40. When the first battery mounting assembly 10 is properly assembled each tray locating member 39 protrudes through either a first side wall tray locating slot 32 or a second side wall tray locating slot 36. Thus, each tray locating member 39 is disposed such that either the first side wall 26 or the second side wall 27 is disposed horizontally between the tray engagement end 40 and the terminal end 41 of the tray locating member 39. Abutment of the tray locating members 39 against first side wall vertical tabs 30 and/or second side wall vertical tabs 35 prevents substantial movement of the first upper battery tray 14 relative to the first battery mounting assembly 10 in horizontal directions perpendicular to tray locating member axes 42. The abutment of the tray locating members 39 to the first side wall vertical tabs 30 and/or the second side wall vertical tabs 35 is a particularly beneficent feature in the event that the vehicle 15 is involved in a traffic accident. Such an engagement between the first upper battery tray 14 and the upper tray support components can prevent movement of the first upper battery tray 14 relative to the first battery mounting assembly 10 during traffic accidents of a severity that would cause other types of engagement to fail. The first side wall vertical tabs 30 and the second side wall vertical tabs 35 aid in preventing undesirable movement of the batteries 16 that are supported upon the first upper battery tray 14. Any battery(s) 16 supported upon the first upper battery tray 14 that move in a direction parallel to any of the tray locating member axes 42 are likely to eventually abut either a first side wall vertical tab 30 or a second side wall vertical tab 35.

Horizontal tray mounting tabs 75 may be engaged to the side walls 44 of the first battery mounting assembly 10. One or more embodiments of battery mounting assemblies 10 and/or battery mounting assembly components that are constructed in a manner such that they effect such feature(s) are best illustrated in FIGS. 5, 7, 22, 23, and 26. In the preferred embodiment, a horizontal mounting tab 75 is engaged to each side wall 44 at a position just below each side wall tray locating slot 76. In this embodiment, the mounting tab width 77 of each horizontal tray mounting tab 75 is preferably approximately the same as a slot width 78 of a side wall tray locating slot 76 that the horizontal tray mounting tab 75 is disposed below. In this preferred embodiment, an underside of one or more tray locating members 39 of the first upper battery tray 14 rests upon one or more of the horizontal tray mounting tabs 75. Thus, the first upper battery tray 14 derives its support from the horizontal tray mounting tabs 75, which, in turn derive their support from the side walls 44. Also in the preferred embodiment one or more of the tray locating members 39 are releaseably fixedly engaged to one or more of the horizontal tray mounting tabs 30 by threaded fasteners.

Figure 5:
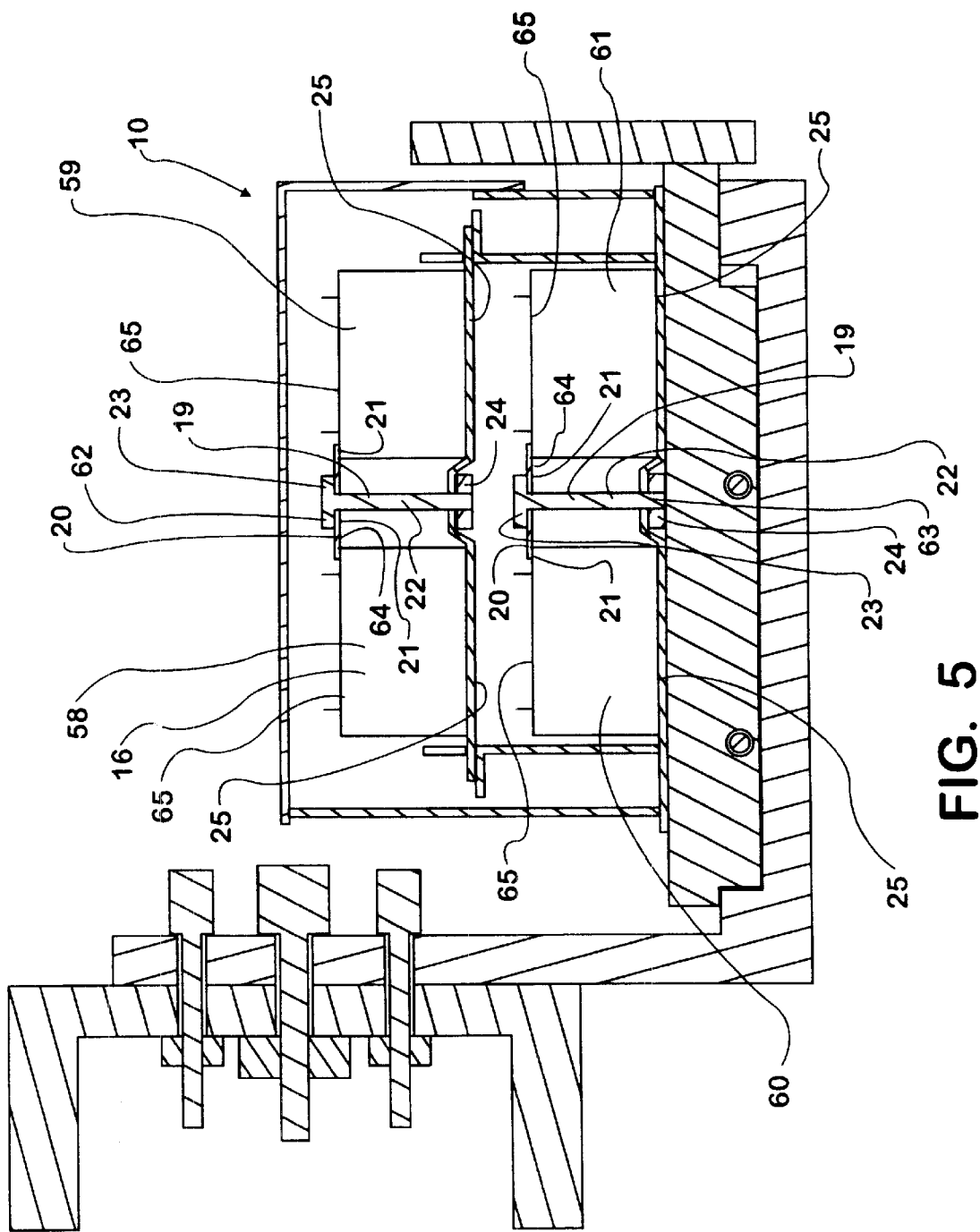
FIG. 5 is a side sectional view of the first battery mounting assembly in a direction parallel to the side walls of the upper tray support components showing the clamping devices.
Figure 6:
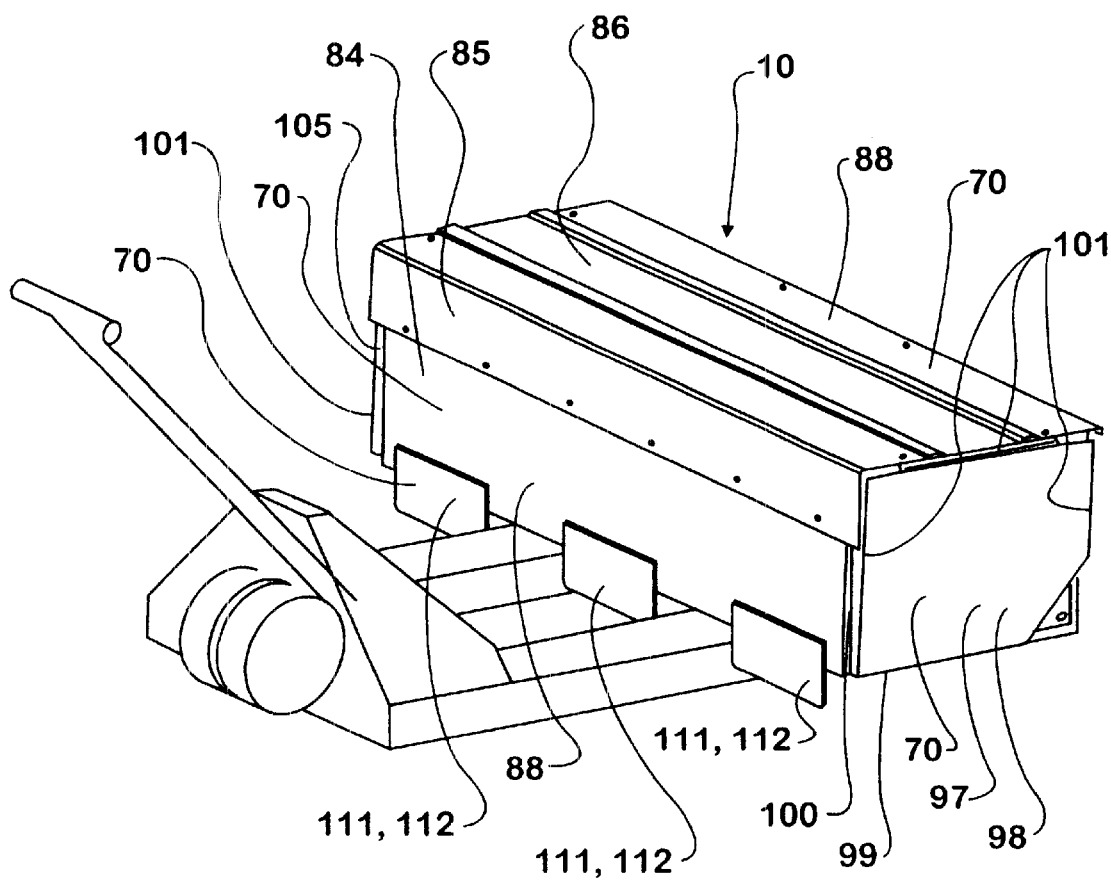
FIG. 6 is a perspective view from above of the first battery mounting assembly on a fork lift.

The first battery mounting assembly 10 may be constructed such that there is very little wasted space in the areas in which batteries 16 are to be mounted. The first battery mounting assembly 10 may be constructed such that the first side wall 26 and the second side wall 27 are both substantially planar in nature. The first side wall 26 and the second side wall 27 may also be positioned such that they are disposed substantially parallel to one another. The side wall spacing 43, which is a perpendicular distance between the first side wall 26 and the second side wall 27, may be just slightly greater than a sum of widths of batteries 16 that are to be disposed between them. One possible example of this is illustrated in FIG. 5. In FIG. 5 a battery mounting assembly is shown where across at least one plane that is perpendicular to the side walls 44 two batteries 16 are mounted between the side walls 44. As is shown in FIG. 5, the side wall spacing 43 is just slightly greater than the sum of the battery widths 45 of each of the batteries 16 of a lower tray string of batteries 49. It should be explained what is meant by a lower tray string of batteries 49. In this context, a lower tray string of batteries 49 is a group of batteries 16 that are disposed upon the first lower battery tray 12 between the side walls 44. Each lower tray string of batteries 49 consists of only batteries 16 that are intersected by a common plane perpendicular to the side walls 44. As a result of this construction, any spaces 46 between each respective battery 16 and other adjacent batteries 16 or between each respective battery 16 and adjacent side walls 44 are relatively narrow in directions perpendicular to the side walls 44. In a similar manner, all of the first side wall vertical tabs 30 may be disposed substantially within a first vertical tab plane. All of the second side wall vertical tabs 35 may be disposed substantially within a second vertical tab plane. The first battery mounting assembly 10 may be constructed such that the first vertical tab plane and the second vertical tab plane are disposed substantially parallel to one another. A perpendicular vertical tab spacing 47 is a perpendicular distance between the first vertical tab plane and the second vertical tab plane. The perpendicular vertical tab spacing 47 is just slightly greater than a sum of battery widths 45 of an upper tray string of batteries 50 disposed between the first side wall vertical tabs 30 and the second side wall vertical tabs 35. FIG. 5 shows an example of this construction. It should be explained what is meant by an upper tray string of batteries 50. In this context, an upper tray string of batteries 50 is a group of batteries 16 that are disposed upon the first upper battery tray 14 between the first side wall vertical tabs 30 and the second side wall vertical tabs 35. Each upper tray string of batteries 50 consists only of batteries 16 that are intersected by a common given plane that is perpendicular to the first vertical tab plane and the second vertical tab plane. As a result of this construction, any spaces 46 between each respective battery 16 and other adjacent batteries 16 or between each respective battery 16 and adjacent vertical tabs 48 are relatively narrow in directions perpendicular to the first vertical tab plane and the second vertical tab plane. A first battery mounting assembly 10 constructed in such a manner that the spaces between batteries 16 and adjacent batteries 16, side walls 44, or vertical tabs 48 are relatively small has a number of advantages. A first battery mounting assembly 10 constructed in such a manner allows for mounting of a relatively large volume of batteries 16 within a relatively confined space. Such a first battery mounting assembly 10 also considerably limits the range within which undesirable movement in certain directions of the batteries 16 mounted to it may occur. This is true because each respective battery 16 may move only a short distance in certain directions before abutting an adjacent battery 16, side wall 44, or vertical tab 48.

The first battery mounting assembly 10 may have additional structure intended to restrict the movement of any batteries 16 mounted to the first battery mounting assembly 10. The first lower battery tray 12 may define one or more lower tray ribs 51 that extend vertically above the first lower battery tray 12. Each of the lower tray ribs 51 would have a longitudinal rib axis 52. Each of the lower tray ribs 51 may be oriented such that its longitudinal rib axis 52 is parallel to the side walls 44 or, alternatively, perpendicular to the side walls 44. Each of the batteries 16 that are to be supported upon the first lower battery tray 12 would be positioned upon battery support surfaces 31 that are disposed between various ones of the lower tray ribs 51 and the side walls 44. The lower tray ribs 51 could be positioned such that a distance between each adjacent parallel pair of lower tray ribs 51 is just slightly greater than a battery width 45 of a battery 16 that is to be disposed between the pair of adjacent parallel lower tray ribs 51. The distance between a lower tray rib 51 and a side wall 44 that is adjacent to the lower tray rib 51 and parallel to the longitudinal rib axis 52 of the lower tray rib 51 is also an important consideration. The distance between such an adjacent lower tray rib 51 and side wall 44 may be just slightly greater than a battery width 45 of a battery that is to be disposed between the lower tray rib 51 and the side wall 44 that are adjacent to one another. Such a first battery mounting assembly 10 ensures that batteries 16 mounted to the first lower battery tray 12 may move only a short distance in directions perpendicular to longitudinal rib axes 52 of lower tray ribs 51 before abutting a lower tray rib 51 or side wall 44. These relationships are illustrated by way of example in FIG. 5. In the preferred embodiment, a single lower tray rib 51, which is defined by the first lower battery tray 12, is positioned such that its longitudinal rib axis 52 is disposed parallel to and equidistant from the first side wall 26 and the second side wall 27. In this embodiment, a first lower row of batteries 60 is supported upon the first lower battery tray 12 on one side of the lower tray rib 51. Also in this embodiment, a second lower row of batteries 61 is supported upon the first lower battery tray 12 on a side of the lower tray rib 51 opposite the first lower row of batteries 61. The first upper battery tray 14 may define one or more upper tray ribs 53 that extend vertically above the battery support surface 31 of the first upper battery tray 31. One or more embodiments of battery mounting assemblies 10 and/or battery mounting assembly components that are constructed in a manner such that they effect such feature(s) are best illustrated in FIGS. 5, 11, 12, 22, 23, 25, 26, 27. Each of the upper tray ribs 53 would have a longitudinal rib axis 52. The first upper battery tray 14 may define one or more upper tray ribs 53 that are positioned such that their longitudinal rib axis 52 is disposed substantially parallel to the first vertical tab plane and the second vertical tab plane. The first upper battery tray 14 may also define one or more upper tray ribs 53 that are positioned such that their longitudinal rib axis 52 is disposed substantially perpendicular to the first vertical tab plane and the second vertical tab plane. The upper tray ribs 53 could be positioned such that a distance between each adjacent parallel pair of upper tray ribs 53 is just slightly greater than a battery width 45 of a battery 16 that is to be disposed between the pair of adjacent parallel upper tray ribs 53. The distance between an upper tray rib 53 and a vertical tab 48 that is adjacent to the upper tray rib 53 and disposed within a vertical tab plane 54 that is parallel to the longitudinal rib axis 52 of the upper tray rib 53 is also an important consideration. The distance between such an adjacent upper tray rib 53 and vertical tab 48 may be just slightly greater than a battery width 45 of a battery that is to be disposed between the upper tray rib 53 and the vertical tab 48 that are adjacent to one another. Such a first battery mounting assembly 10 ensures that batteries 16 mounted to the first upper battery tray 14 may move only a short distance in directions perpendicular to longitudinal rib axes 52 of upper tray ribs 53 before abutting an upper tray rib 53 or a vertical tab 48. These relationships are illustrated by way of example in FIG. 5. In the preferred embodiment, a plurality of upper tray ribs 53 that are defined by the first upper battery tray 14 are positioned such that their longitudinal rib axes 52 are coincident with one another. In this embodiment each of the plurality of upper tray ribs 53 is positioned such that their longitudinal rib axes 52 are parallel to and equidistant from the first vertical tab plane and the second vertical tab plane. In this embodiment, a first upper row of batteries 58 is supported upon the first upper battery tray 14 on one side of this upper tray rib 53. Also in this embodiment, a second upper row of batteries 59 is supported upon the first upper battery tray 14 on a side of this upper tray rib 53 opposite the first upper row of batteries 58. Also in the preferred embodiment the first upper battery tray 14 defines a plurality of upper tray ribs 53 that are positioned such that their longitudinal rib axes 52 extend in directions perpendicular to the first vertical tab plane and the second vertical tab plane. In addition to restricting the motion of the batteries 16 the lower tray ribs 51 and the upper tray ribs 53 ensure that the batteries 16 will be spaced relative to one another. This is beneficial because it allows spaces for air to flow between the batteries 16 and, thus, better cool the batteries 16. Preferably each of the lower tray ribs 51 and each of the upper tray ribs 53 has a width in horizontal directions perpendicular to their longitudinal rib axes 52 such that spaces between adjacent batteries 16 for cooling air to travel through are at least ¼ inch wide.

Figure 7:
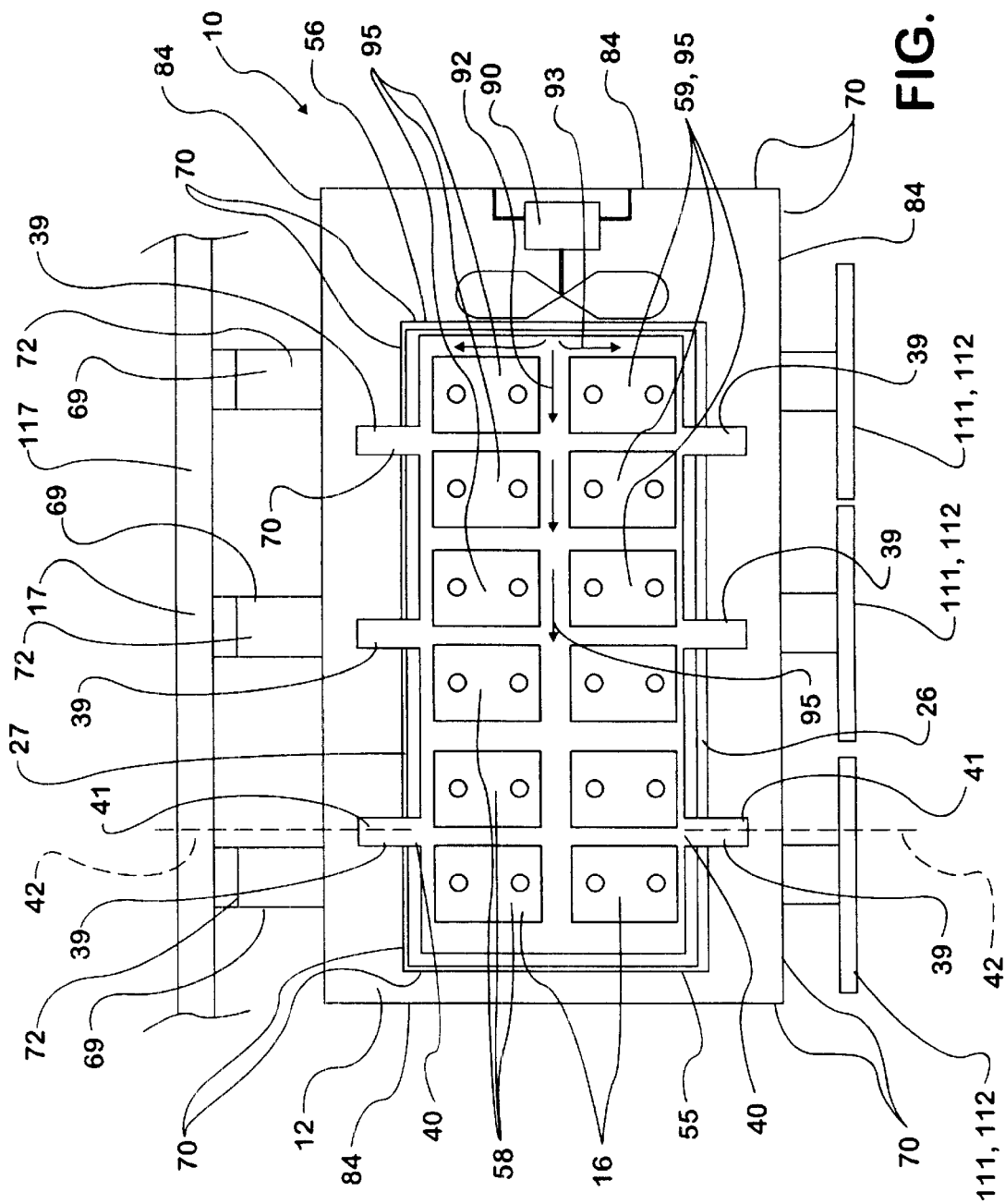
FIG. 7 is a top view of the first battery mounting assembly with the lid removed showing the flow of ventilation air through the interior of the first battery mounting assembly.
Figure 8:
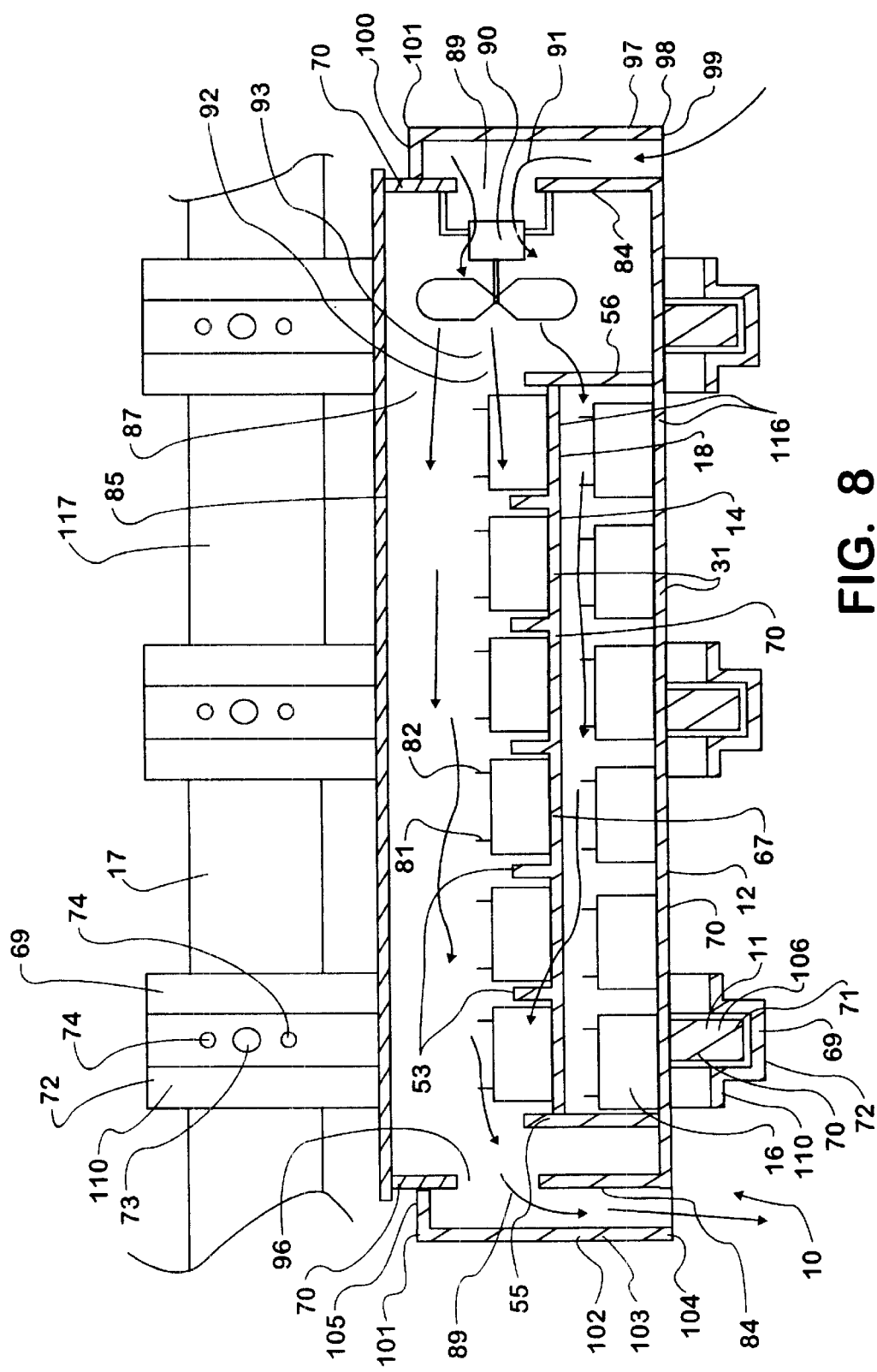
FIG. 8 is a side sectional view of the first battery mounting assembly in a direction perpendicular to the side walls of the upper tray support components.
Figure 22:
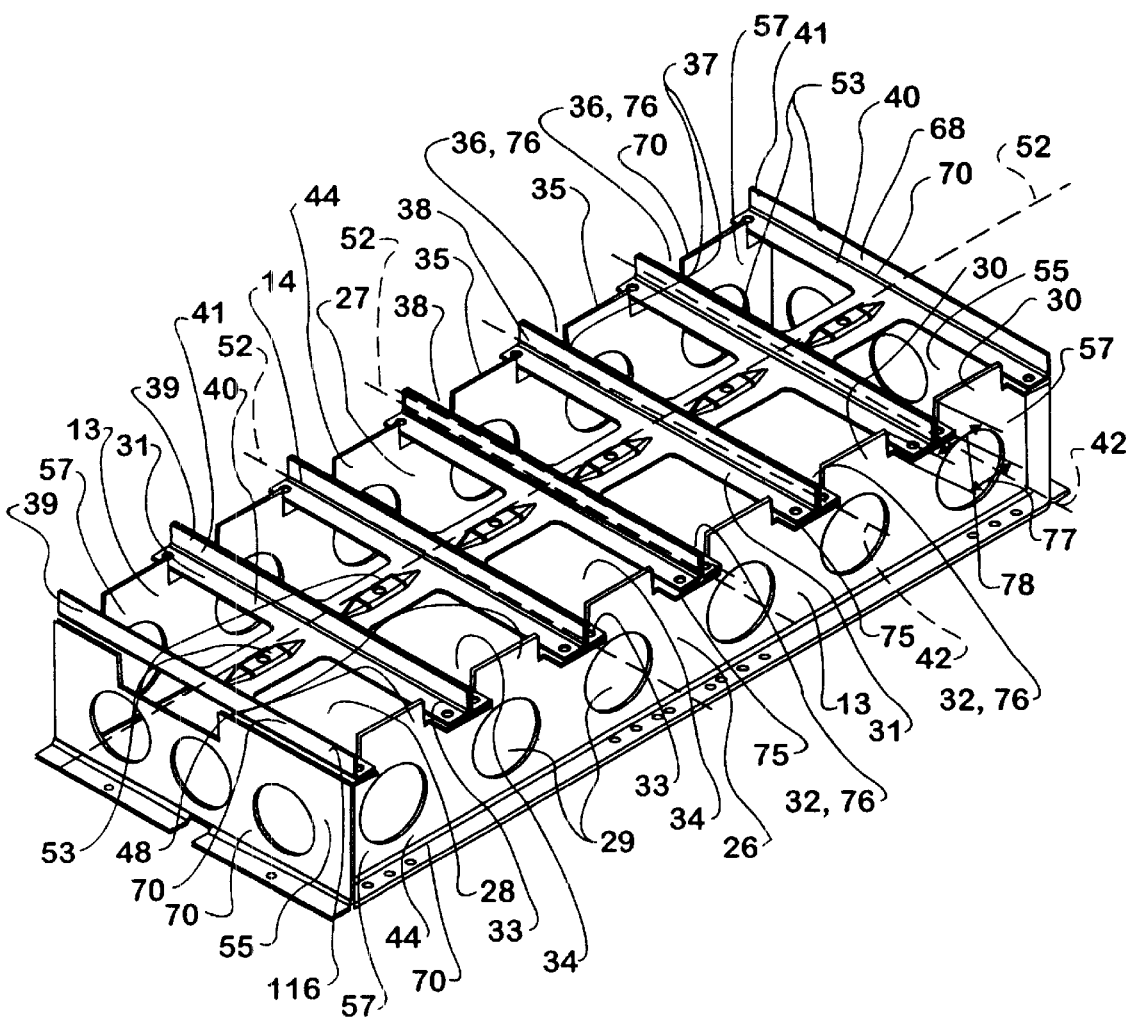
FIG. 22 is a perspective view of the upper tray support components, and upper battery trays separate from other component of the first battery mounting assembly.

The first battery mounting assembly 10 may further comprise a first end wall 55 and a second end wall 56 of the upper tray support components 13. One or more embodiments of battery mounting assemblies 10 and/or battery mounting assembly components that are constructed in a manner such that they effect such feature(s) are best illustrated in FIGS. 7, 8, and 22. The first end wall 55 would be fixedly engaged to the first lower battery tray 12 and/or one or more of the one or more main support members 11 and extends vertically above the first lower battery tray 12. The second end wall 56 would be fixedly engaged to the first lower battery tray 12 and/or one or more of the one or more main support members 11 and extends vertically above the first lower battery tray 12. The first end wall 55 and the second end wall 56 would be substantially planar and would be positioned such that they were substantially parallel to one another. The first end wall 55 and the second end wall 56 would each be fixedly engaged to both the first side wall 26 and the second side wall 27. In the preferred embodiment the first end wall 55 and the second end wall 56 would be engaged to each of the first side wall 26 and the second side wall 27 at outer end portions 57 of the first side wall 26 and the second side wall 27. The first end wall 55 and the second end wall 56 improve the functionality of the first battery mounting assembly 10 in a couple of ways. The first end wall 55 and the second end wall 56, which are disposed on opposite sides of the lower battery space 28, aid in retention of any batteries 16 that are disposed upon the first lower battery tray 12 within the lower battery space 28. The first end wall 55 and the second end wall 56 also increase the structural rigidity of the first battery mounting assembly 10. This is beneficial because it reduces the likelihood that the components of the first battery mounting assembly 10 will collapse inwardly and damage the batteries 16 mounted to the first battery mounting assembly 10 in the event that the vehicle 15 is involved in a traffic accident.

The preferred embodiment of the first battery mounting assembly 10 has unique structure for clamping the batteries 16 to the first battery mounting assembly 10. One or more embodiments of battery mounting assemblies 10 and/or battery mounting assembly components that are constructed in a manner such that they effect such feature(s) are best illustrated in FIGS. 5, 25, 26, and 27. In the preferred embodiment the clamping devices 19 for clamping the batteries 16 to the first upper battery tray 14 comprise upper tray clamping devices 62. In the preferred embodiment, the first battery mounting assembly 10 also comprises lower tray clamping devices 63. Each of the upper tray clamping devices 62 and the lower tray clamping devices 63 would be comprised of a clamp plate 20, a clamp bolt 22, and a clamp nut 24. A clamp plate lower surface 64 of each clamp plate 20 of each lower tray clamping device 63 would abut upper horizontal surfaces 65 of one or more of the batteries 16 of the first lower row of batteries 60. The clamp plate lower surface 64 of each clamp plate 20 of each lower tray clamping device 63 would also abut upper horizontal surfaces 65 of one or more of the batteries 16 of the second lower row of batteries 61. The clamp bolt 22 of each of the lower tray clamping devices 63 would protrude through the clamp plate 22 of each of the lower tray clamping devices 63. The clamp bolt 22 of each of the lower tray clamping devices 63 would also protrude through the lower tray rib 51 that the first lower row of batteries 60 and the second lower row of batteries 61 are disposed on opposite sides of. Either the bolt head 23 of the clamp bolt 22 or the clamp nut 24 of each of the lower tray clamping devices 63 would be disposed upon an upper side of said clamp plate 20 of each of said lower tray clamping devices 63. Whichever of the bolt head 23 of the clamp bolt 22 and the clamp nut 24 is not disposed on the upper side of the clamp plate 20 would be disposed on a lower side of the lower tray rib 51 that the clamp bolt 22 protrudes through. An end of each of the clamp bolts 22, of each of the lower tray clamping devices 63, opposite the bolt head 23 would be threadedly engaged to the clamp nut 24. The clamp plate 20 of each of the lower tray clamping devices 63 would, thus, apply a downward force to the upper horizontal surfaces 65 of one or more of the batteries 16 of the first lower row of batteries 60 and the second lower row of batteries 61. The batteries 16 of the first lower row of batteries 60 and the batteries 16 of the second lower row of batteries 61 would, thus, be clamped against the first lower battery tray 12. A battery mounting system 10 constructed according to the guidelines outlined immediately above is best shown in FIG. 5. A clamp plate lower surface 64 of each clamp plate 20 of each upper tray clamping device 62 would abut upper horizontal surfaces 65 of one or more of the batteries 16 of the first upper row of batteries 58. The clamp plate lower surface 64 of each clamp plate 20 of each upper tray clamping device 62 would also abut upper horizontal surfaces 65 of one or more of the batteries 16 of the second upper row of batteries 59. The clamp bolt 22 of each of the upper tray clamping devices 62 would protrude through the clamp plate 22 of each of the upper tray clamping devices 63. The clamp bolt 22 of each of the upper tray clamping devices 63 would also protrude through one of the plurality of upper tray ribs 53 that the first upper row of batteries 58 and the second upper row of batteries 59 are disposed on opposite sides of. Either the bolt head 23 of the clamp bolt 22 or the clamp nut 24 of each of the upper tray clamping devices 62 would be disposed upon an upper side of said clamp plate 20 of each of said upper tray clamping devices 62. Whichever of the bolt head 23 of the clamp bolt 22 and the clamp nut 24 is not disposed on the upper side of the clamp plate 20 would be disposed on a lower side of the upper tray rib 53 that the respective clamp bolt 22 protrudes through. Locating the bolt head 23 or the clamp nut 24 on an underside of an upper tray rib allows more room for components below the first upper battery tray 14. An end of each of the clamp bolts 22, of each of the upper tray clamping devices 62, opposite the bolt head 23 would be threadedly engaged to the clamp nut 24. The clamp plate 20 of each of the upper tray clamping devices 63 would, thus, apply a downward force to the upper horizontal surfaces 65 of one or more of the batteries 16 of the first upper row of batteries 58 and the second upper row of batteries 59. The batteries 16 of the first lower row of batteries 58 and the batteries 16 of the second lower row of batteries 59 would, thus, be clamped against the first lower battery tray 12. A battery mounting system 10 constructed according to the guidelines outlined immediately above is best shown in FIG. 5.

Figure 23:
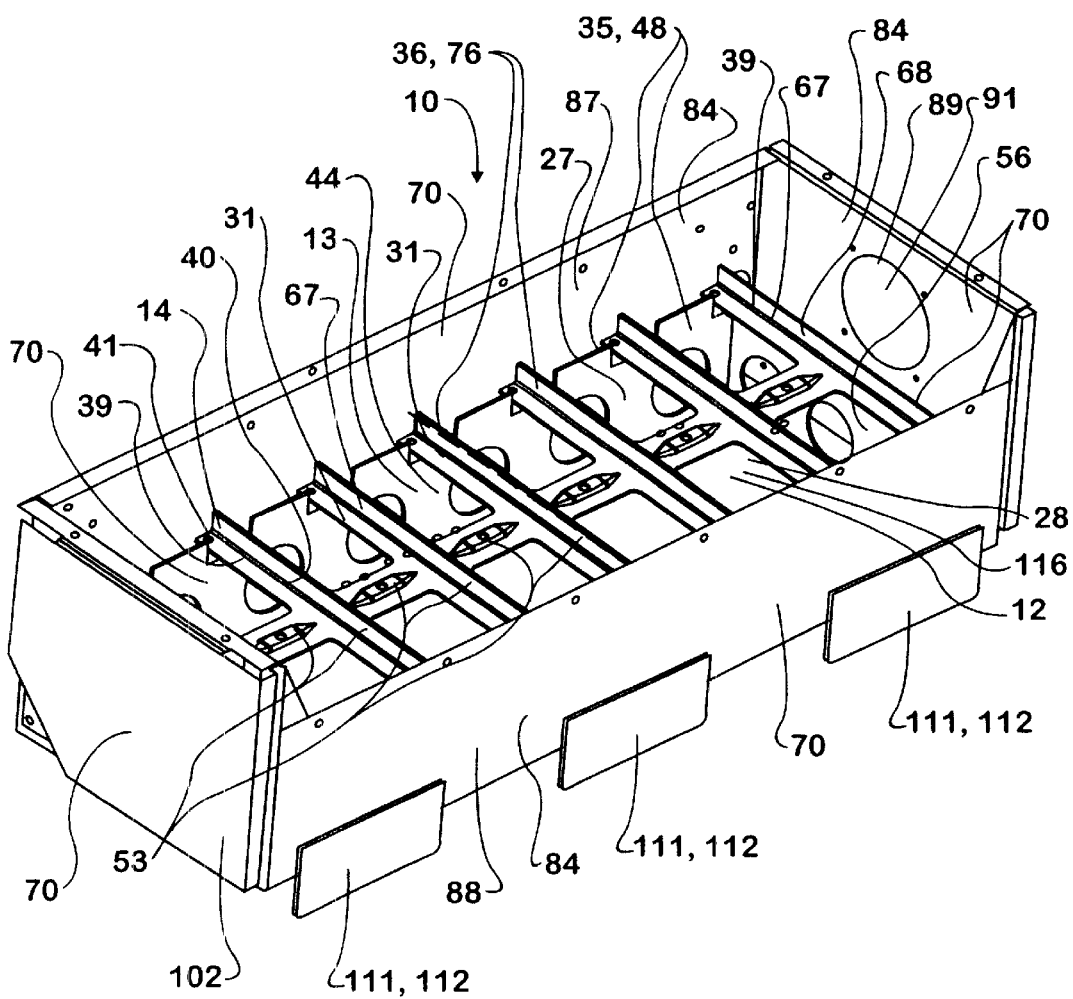
FIG. 23 is a perspective view of the first battery mounting assembly minus the lid and other components showing upper tray support components and upper battery trays within the interior of the first battery mounting assembly.

The first battery mounting assembly 10 may include additional upper battery trays 67. One or more embodiments of battery mounting assemblies 10 and/or battery mounting assembly components that are constructed in a manner such that they effect such feature(s) are best illustrated in FIGS. 22 and 23. Each of the upper battery trays 67 may be releasably fixedly engaged to the upper tray support components 13 of the first battery mounting assembly 10. The first battery mounting assembly 10 may further include clamping devices 19 for clamping a plurality of batteries 16 to each of the upper battery trays 67. In the preferred embodiment, a second upper battery tray 68 would be releaseably fixedly engaged to the first side wall 26 and the second side wall 27. Also in the preferred embodiment, clamping devices 19 releaseably clamp a plurality of batteries 16 to the second upper battery tray 68. It can be appreciated that the second upper battery tray 68 would preferably be constructed and engaged to the first battery mounting assembly 10 in many of the same ways as the first upper battery tray 14.

As was mentioned above, the number of batteries 16 that can be mounted to the first battery mounting assembly 10 is also an important consideration. In the preferred embodiment, the first battery mounting assembly 10 is constructed such that 6 batteries may be mounted in each of the first lower row of batteries 60, the second lower row of batteries 61, the first upper row of batteries 58, and the second upper row of batteries 59. The first battery mounting assembly 10 may be constructed in any of a number of different ways in order to accommodate the mounting of any of a number of different types of batteries 16. In general the first battery mounting assembly 10 is constructed to mount batteries 16 that are intended to be mounted on vehicles 15 and used for storing relatively large amounts of electrical energy for vehicles 15. In the preferred embodiment the first battery mounting assembly 10 is tailored for the mounting of 26 Ahr Hawker Genesis™ batteries.

The first battery mounting assembly 10 may include structure for isolating the batteries 16 and other components of the first battery mounting assembly 10 from the environment. One or more embodiments of battery mounting assemblies 10 and/or battery mounting assembly components that are constructed in a manner such that they effect such feature(s) are best illustrated in FIGS. 1, 2, 3, 4, 5, 6, 7, 8, 10, 13, 14, 15, 16, 17, 18, 19, 20, 21, 23, 24, 25, 26, and 27. Outer walls 84 may be included in the first battery mounting assembly 10. The outer walls 84 would most likely be fixedly engaged to the first battery mounting assembly 10 and would extend vertically above the first lower battery tray 12. A lid 85 may also be included with the first battery mounting assembly 10. The lid 85 would preferably be releaseably engaged to the first battery mounting assembly 10 to allow the lid 85 to be removed from the first battery mounting assembly 10 so that an individual might access the interior 87 of the first battery mounting assembly 10. A lid top portion 86 would be disposed directly vertically above the first lower battery tray 12 and the first upper battery tray 14. The lid top portion 86 would be at such a height that there is space between the batteries 16 disposed upon the first upper battery tray 14 and the lid top portion 86. An outer shell 88 of first battery mounting assembly 10 would comprise the outer walls 84, the lid 85, and the first lower battery tray 12. The outer shell 88 of the first battery mounting assembly 10 would preferably be constructed such that the upper tray support components 13, the first upper battery tray 14, and the batteries 16 would be substantially surrounded by the outer shell 88. In fact, the outer shell 88 would preferably be constructed such that there are virtually no openings in the outer shell 88 except for any ventilation openings 89. The spacing between the outer walls 84 and the batteries 16 mounted to the first battery mounting assembly 10 is also an important consideration. Preferably, the outer walls 84 are spaced as far as reasonably possible, given other design considerations, from the batteries 16 that are mounted to the first battery mounting assembly 10. The energy that can be dissipated by the outer walls 84 as they are deformed inwardly toward the batteries 16 during the vehicle's 15 involvement in a traffic accident is proportional to the magnitude of the distance between the outer walls 84 and the batteries 16.

In the preferred embodiment, the first battery mounting assembly 10 is constructed with a breakaway feature. In this embodiment, the first battery mounting assembly 10 would be constructed such that various components of the first battery mounting assembly 10 would breakaway or move in predetermined manners and absorb and dissipate energy under certain conditions caused by the vehicle 15 being involved in a traffic accident. It should be understood that when these components of the first battery mounting assembly 10 breakaway and move in such a manner they preferably remain attached to the vehicle 15. These components that are intended to break away under certain conditions will hereinafter be referred to as breakaway components 70. The breakaway components 70 would move in these predetermined manners when the first battery mounting assembly 10 is subjected to forces and/or accelerations in, certain directions, that are of a magnitude greater than those that would occur during normal vehicle 15 operation. The breakaway components 70 comprise any battery trays 116 upon which batteries 16 are mounted and any components that are necessary to locate the batteries 16 relative to the battery trays 116 upon which they are located. Preferably, the breakaway components 70 would include the first lower battery tray 12, the upper tray support components 13 (which may comprise the first side wall 26 and the second side wall 27), the first upper battery tray 14, the second upper battery tray 68 (where applicable), and the batteries 16 mounted to the first battery mounting assembly 10. It is also preferred that when the breakaway components 70 breakaway that they do not move substantially relative to one another. It is also preferred that, when the breakaway components 70 breakaway, support of the breakaway components 70 by the structural components 17 of the vehicle 15 is maintained. If these breakaway components 70 move relative to one another or if support of the breakaway components 70 by the structural components 17 of the vehicle 15 ceases, the risk that the batteries 16 will interact in undesirable ways with individuals and/or the environment is increased. The first battery mounting assembly 10 could be constructed in any of a number of ways easily imagined by those of ordinary skill in the art that would cause it to have a breakaway feature as described above. Obviously, the construction and engagement to one another of the breakaway components 70 must be relatively robust in order to prevent relative movement between them. Battery assembly mounting components 69 which engage the breakaway components 70 to the structural components 17 of the vehicle 15 may include, but are not necessarily limited to, the one or more main support members 11 and first battery assembly hangers 72. Appropriate construction of and engagement to one another of the battery assembly mounting components 69, the breakaway components 70 and the structural components 17 of the vehicle 15, will enable an appropriate breakaway feature of the first battery mounting assembly 10. The construction of the first battery mounting assembly 10 may be such that any of a number of things occur to allow the breakaway components 70 to breakaway when the first battery mounting assembly 10 is subjected to relatively large forces and/or accelerations in certain directions. The battery assembly mounting components 69 may be constructed with relative strengths in certain directions of certain portions proportioned to relative strengths of other portions in certain directions such that the battery assembly mounting components 69 will deform in predetermined manners to allow the breakaway components 70 to breakaway. In such a case, the battery assembly mounting components 69 should be strong enough that they do not actually fracture and cause support of the breakaway components 70 by the structural components 17 of the vehicle 15 to cease. The engagements of the battery assembly mounting components 69, the breakaway components 70, and the structural components 17 of the vehicle 15 to one another must present a relatively high resistance to relative motion between the components in some manners. This must be so in order to prevent separation of the breakaway components 70 from the vehicle 15 during a traffic accident. The engagements of the battery assembly mounting components 69, the breakaway components 70, and the structural components 17 of the vehicle 15 to one another may, however, present a relatively low resistance to relative motion between the components in other manners. An example of such an engagement of components of a first battery mounting assembly 10 is presented here. There are innumerable ways in which one of ordinary skill in the art could easily imagine that this concept could be applied to the construction of a first battery mounting assembly 10 to enable a breakaway feature of the first battery mounting assembly 10. Components of the battery assembly mounting components 69 could be engaged to components of the breakaway components 70 with a single bolt. In such an instance, if the bolt and the components it were engaged to were strong enough, this engagement would present a very high resistance to relative translation between the components yet would present a fairly low resistance to relative rotation of the components about the shank of the bolt.

In the preferred embodiment, the strengths of certain battery assembly mounting components 69 and the manner of engagement of the battery assembly mounting components 69 to the structural components 17 of the vehicle 15 are both tailored to enable the breakaway function. One or more embodiments of battery mounting assemblies 10 and/or battery mounting assembly components that are constructed in a manner such that they effect such feature(s) are best illustrated in FIGS. 5, 8, 25, 26, and 27. In the preferred embodiment, the battery assembly mounting components 69 of the first battery mounting assembly 10 comprise one or more first battery assembly hangers 72 and one or more main support members 11. Each of the first battery assembly hangers 72 is engaged to one or more of the one or more main support members 11 in a relatively rigid manner. Each of the first battery assembly hangers 72 is also engaged to the structural components 17 of the vehicle 15. Thus, the structural components 17 of the vehicle 15 support the first battery assembly hangers 72, which, in turn, support the main support members 11, which, in turn, support the breakaway components 70 (the first lower battery tray 12, the upper tray support structure 13, the first upper battery tray 14, the batteries 16, etc.). Each of the first battery assembly hangers 72 is engaged to the structural components 17 of the vehicle 15 by two or more bolts. One main support bolt 73 engages each first battery assembly hanger 72 to the structural components 17 of the vehicle 15. The main support bolts 73, the first battery assembly hangers 72, and the structural components 17 of the vehicle 15 are constructed such that engagement of the first battery assembly hangers 72 to the structural components 17 of the vehicle 15 by the main support bolts 73 alone is very strong. Engagement of the first battery assembly hangers 72 to the structural components 17 of the vehicle 15 by the main support bolts 73 alone is sufficient to maintain engagement of the first battery mounting assembly 10 to the vehicle 15. Engagement of the first battery assembly hangers 72 to the structural components 17 of the vehicle 15 by the main support bolts 73 alone is sufficient to prevent separation of the first battery mounting assembly 10 from the vehicle 15 unless the first battery mounting assembly 10 is subjected to extremely large forces and/or accelerations. One or more anti-rotation bolts 74 also engage each of the first battery assembly hangers 72 to the structural components 17 of the vehicle 15. The anti-rotation bolts 74 are engaged to each of the first battery assembly hangers 72 at a point distant from an axis of the shank of the main support bolt 73 that engages each of the first battery assembly hangers 72 to the structural components 17 of the vehicle 15. The anti-rotation bolts 74, thus, prevent each of the first battery assembly hangers 72 from rotating about the shank of the main support bolt 73 that engages it to the structural components 17 of the vehicle 15 during normal operation of the vehicle 15. The strength of the anti-rotation bolts 74 is relatively low as compared to the main support bolts 73. In the preferred embodiment each first battery assembly hanger 72 is engaged to the structural components 17 of the vehicle 15 by one main support bolt 73 and two anti-rotation bolts 74. In this embodiment the shank of each of the anti-rotation bolts 74 has a diameter that is approximately half of the diameter of the shank of the main support bolt 73 that is engaged to the same respective first battery assembly hanger 72. In the preferred embodiment, each first battery assembly hanger 72 is engaged to the structural components 17 of the vehicle 15 by one main support bolt 73 that is a grade eight bolt with a shank that is approximately 1 inch in diameter. In this embodiment, each first battery assembly hanger 72 is preferably also engaged to the structural components 17 of the vehicle 15 by two anti-rotation bolts that are grade 8 bolts with a shank that is approximately ½ inch in diameter. Also in this embodiment, each of the anti-rotation bolts 74 is preferably engaged to a first battery assembly hanger 72 at a position distant from but within approximately one foot of the axis of the shank of the main support bolt 73 engaged to the same respective first battery assembly hanger 72. As a result of this construction, relatively large forces applied to such a first battery mounting assembly 10 perpendicular to and distant from the axes of the shanks of the main support bolts 73 would cause the anti-rotation bolts 74 to shear. Thus, if the first battery mounting assembly 10 were subjected to a substantial impact in a direction perpendicular to and at a point distant from the axes of the shanks of the main support bolts 73, the anti-rotation bolts 74 would shear. After such an impact caused the anti-rotation bolts 74 to shear it would cause the first battery assembly hangers 72 to rotate about the axes of the shanks of the main support bolts 73 and the breakaway components 70 would also move with respect to the structural components 17 of the vehicle 15. The rotation of the first battery assembly hangers 72 about the axes of the shanks of the main support bolts 73 and the resulting movement of the first battery mounting assembly 10 would absorb and dissipate some of the energy of the impact. This movement of the breakaway components 70 (first lower battery tray 12, upper tray support structure 13, the batteries 16 etc.) as the battery assembly mounting components 69 (the first battery assembly hangers 72) rotate about the main support bolts 73 is the breakaway feature of the preferred embodiment in action. In the preferred embodiment, the first battery assembly hangers 72 would be relatively rigidly engaged to the main support members 11 of the first battery mounting assembly 10. As the first battery assembly hangers 72 rotate about the axes of the shanks of the main support bolts 73, parallel distances between respective first battery assembly hangers 72 and the one or more main support members 11 that the first battery assembly hangers 72 are relatively rigidly engaged to change. In order for the parallel distances between these components to change deformation of the first battery assembly hangers 72 and the main support members 11 must occur. A considerable amount of the energy of such an impact that the first battery mounting assembly 10 may be subjected to is also dissipated in deforming the first battery assembly hangers 72 and the main support members 11 in such a manner. The strength of the main support members 11, and the strength of the first battery assembly hangers 72 is of a magnitude such that, unless extremely large forces are imposed upon them, they will deform but not fracture as the first battery assembly hangers 72 rotate about the main support bolts 73. As was mentioned above, the strength of the main support bolts 73 is of a magnitude such that the first battery assembly hangers 72 will remain engaged to the structural components 17 of the vehicle 15 as the first battery assembly hangers 72 rotate about the main support bolts 73. These conditions will hold unless the first battery mounting assembly 10 is subjected to extremely severe impacts. In such a case the main support bolts 73, the first battery assembly hangers 72, or the main support members 11 may fail and allow for separation of the first battery mounting assembly 10 from the vehicle 15. The construction of the preferred embodiment of the first battery assembly 10 is an example of how the first battery assembly 10 may be designed so that the components of the first battery mounting assembly 10 will deform, fracture, and move relative to one another in predetermined, relatively desirable, manners in response to the first battery mounting assembly 10 being subjected to relatively large and undesirable forces and or accelerations. Individuals of ordinary skill in the art could easily design any number of other constructions of the first battery mounting assembly 10 with components that have relative strengths and that are engaged to one another in manners that will cause breakaway components 70 to move in relatively desirable predetermined manners relative to the vehicle 15 when the vehicle is involved in certain types of traffic accidents.

Figure 13:
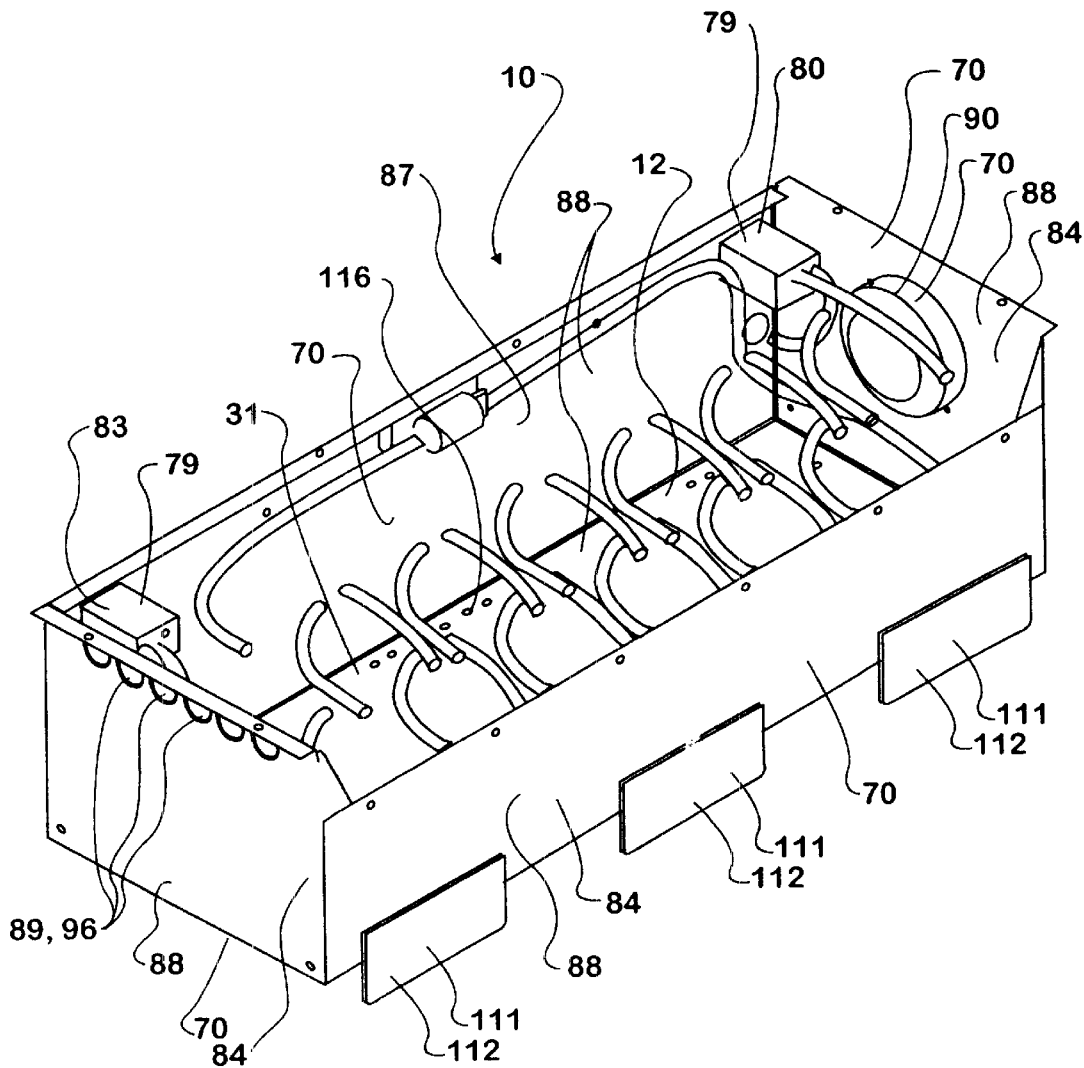
FIG. 13 is a perspective view of the first battery mounting assembly minus the lid showing the interior of the first battery mounting assembly and the positive inertial trigger electrical disconnect and the negative inertial trigger disconnect.
Figure 14:
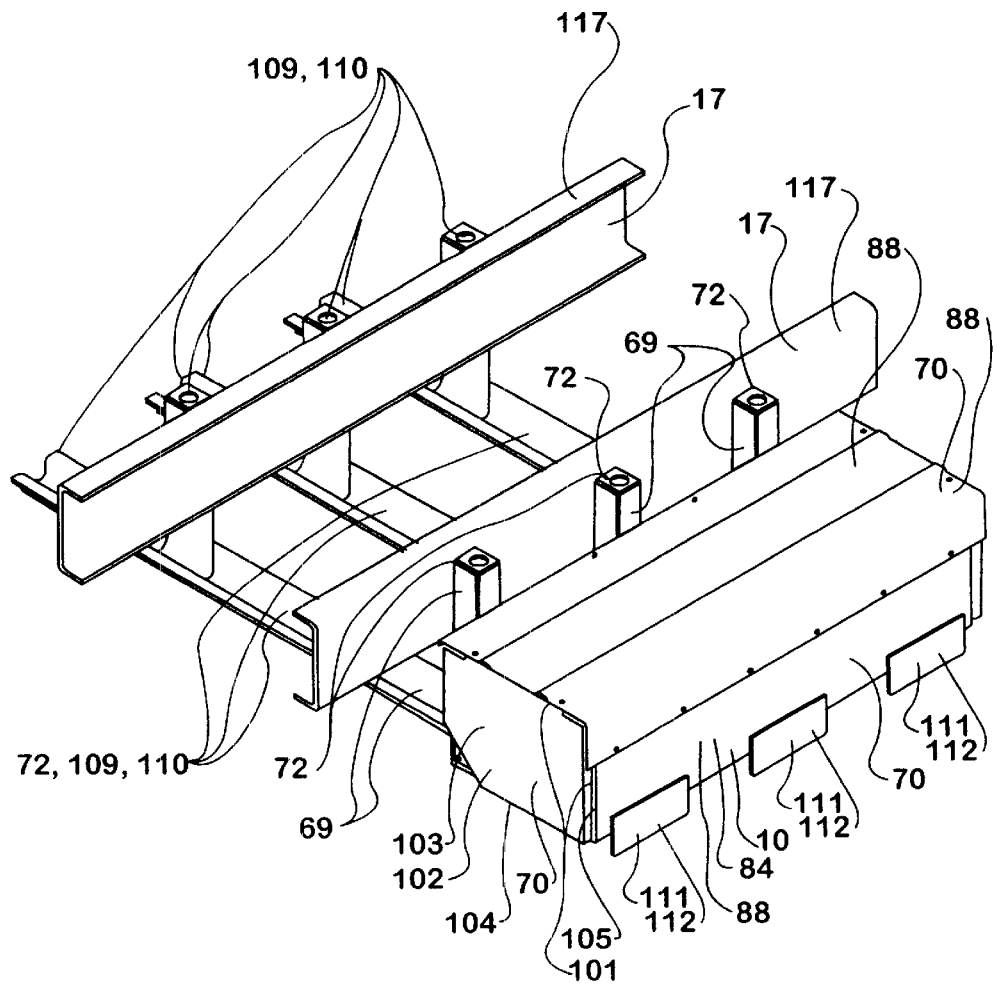
FIG. 14 is a perspective view from above showing the first battery mounting assembly mounted to the structural component of a vehicle and showing the second battery assembly hangers engaged to the first battery assembly hangers.
Figure 15:
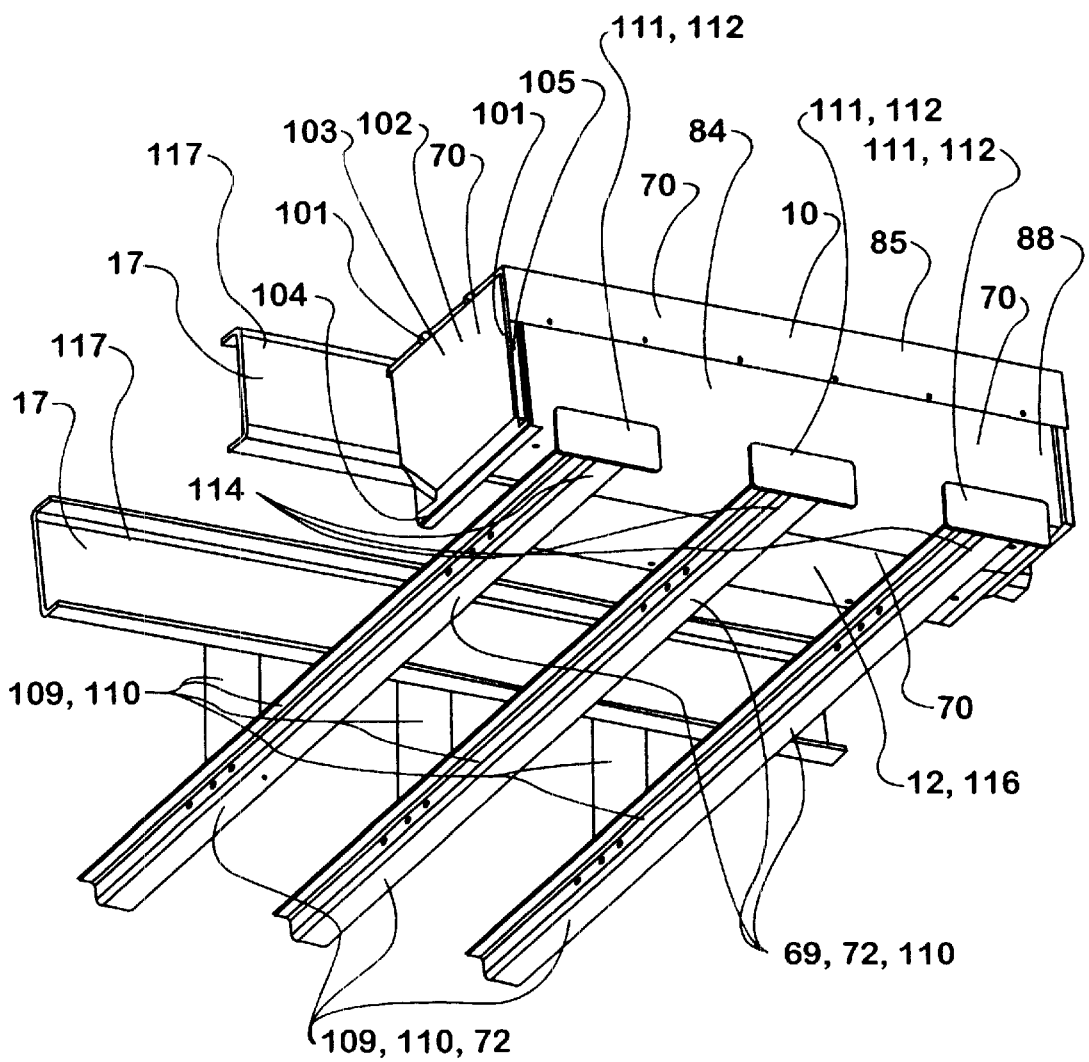
FIG. 15 is a perspective view from below showing the first battery mounting assembly mounted to the structural component of a vehicle and showing the second battery assembly hangers engaged to the first battery assembly hangers.
Figure 16:
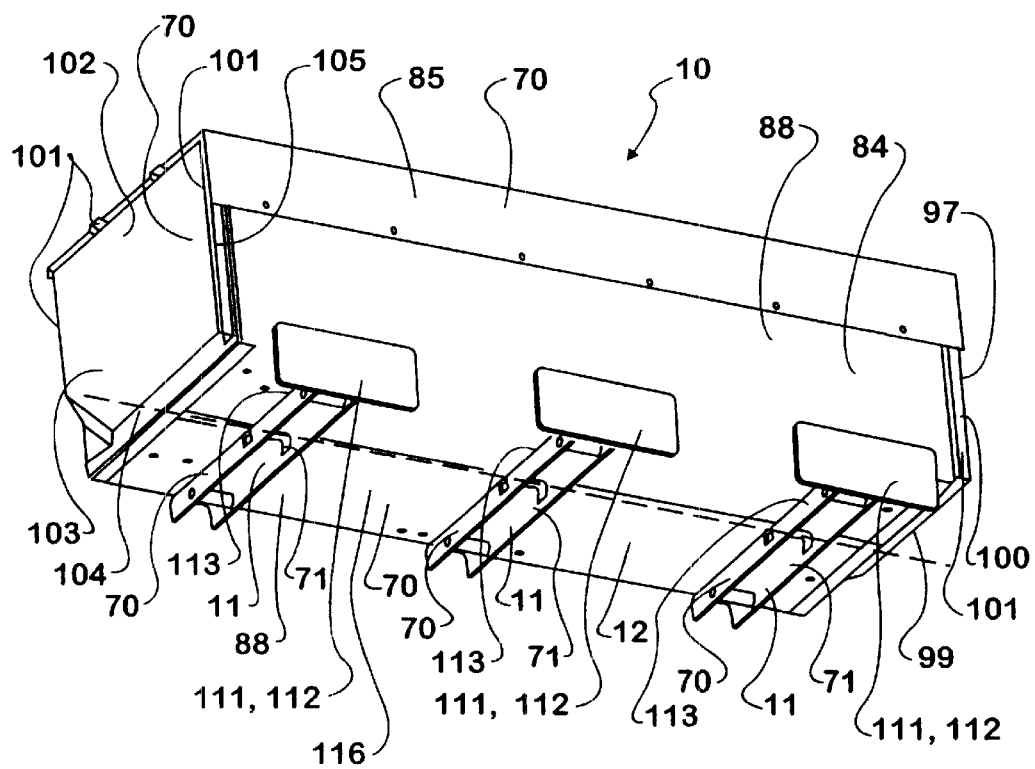
FIG. 16 is a perspective view from a first angle of the first battery mounting assembly from below showing the main support members.
Figure 17:
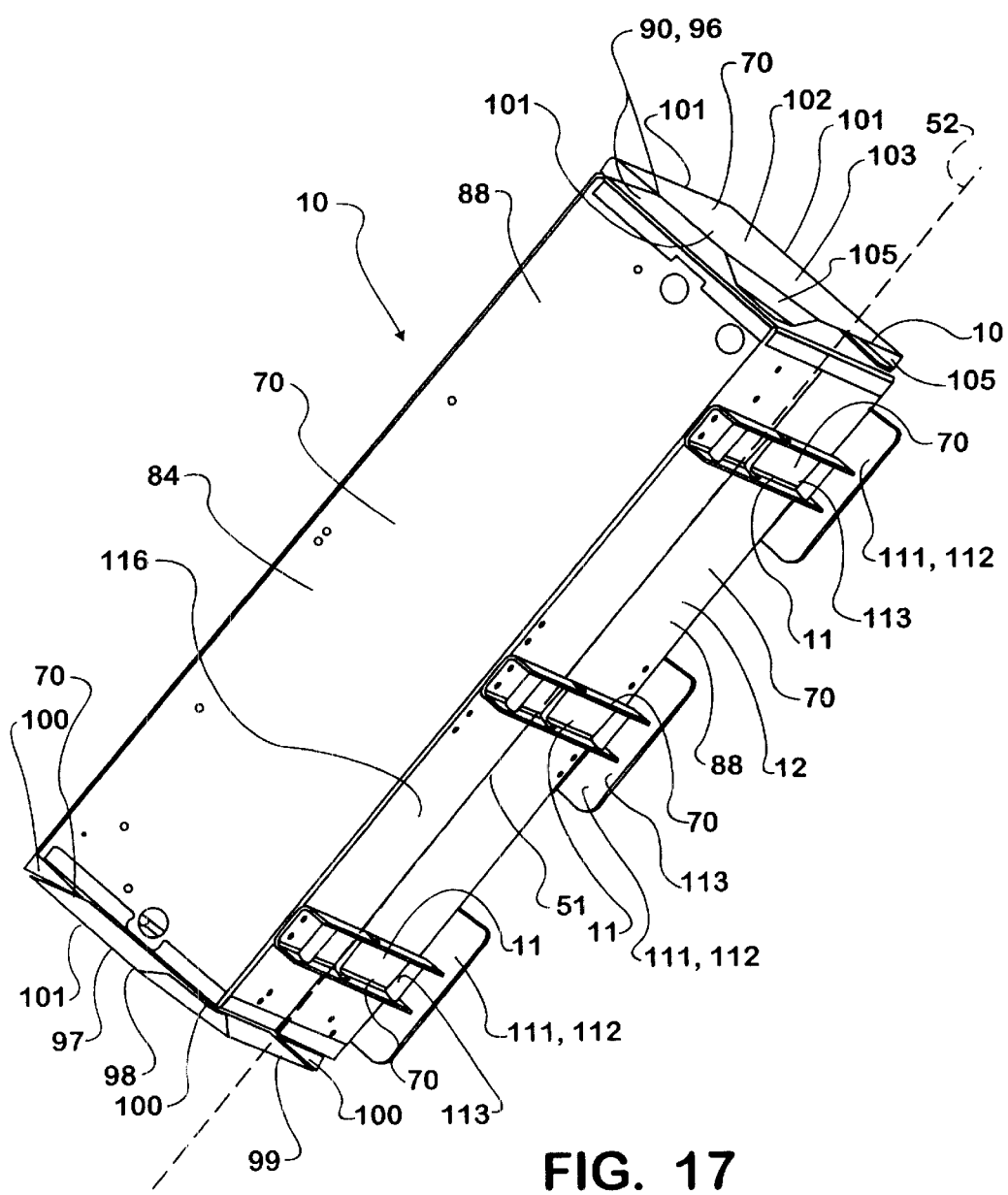
FIG. 17 is a perspective view from a second angle of the first battery mounting assembly from below showing the main support members.
Figure 18:
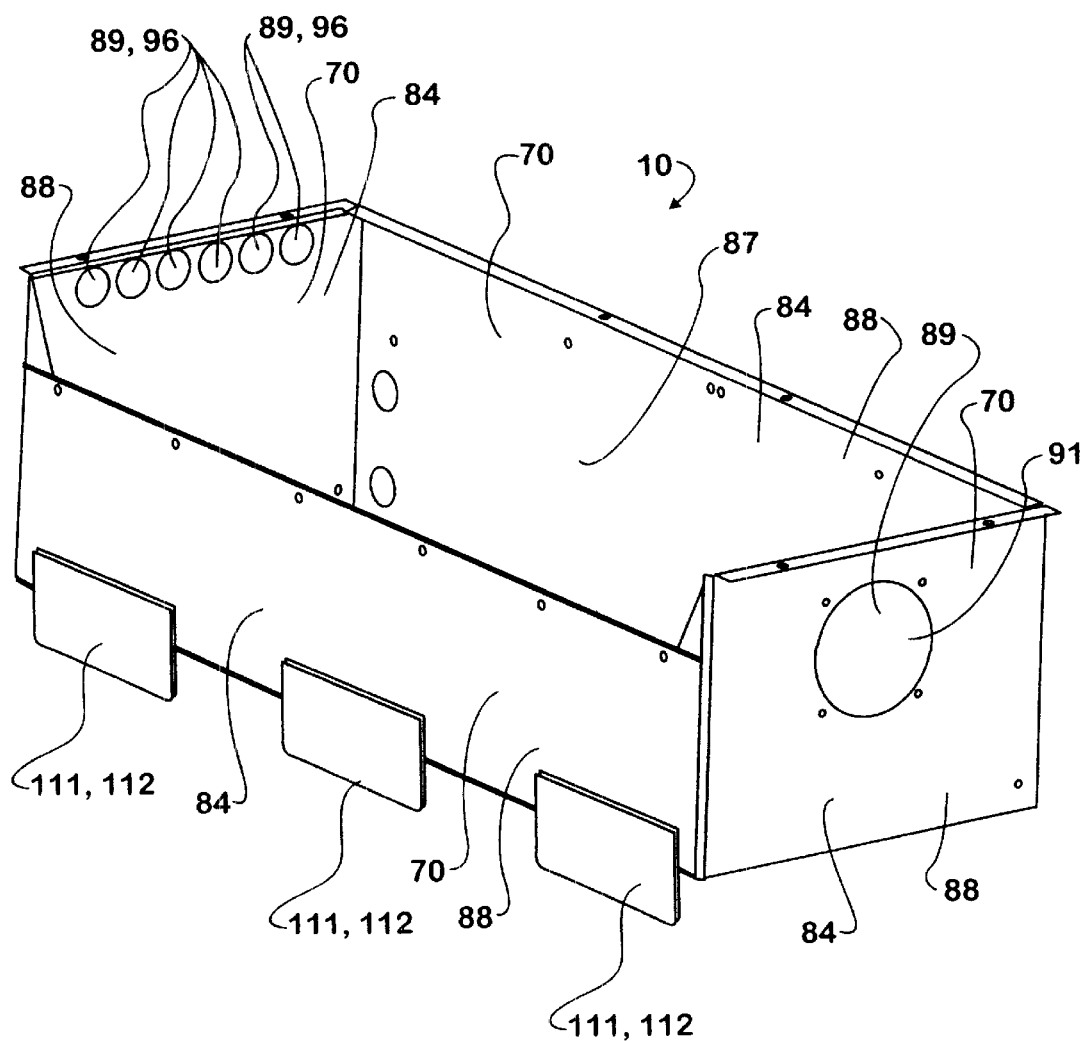
FIG. 18 is a perspective view of the first battery mounting assembly minus the lid and other components showing the ventilation intake openings.
Figure 19:
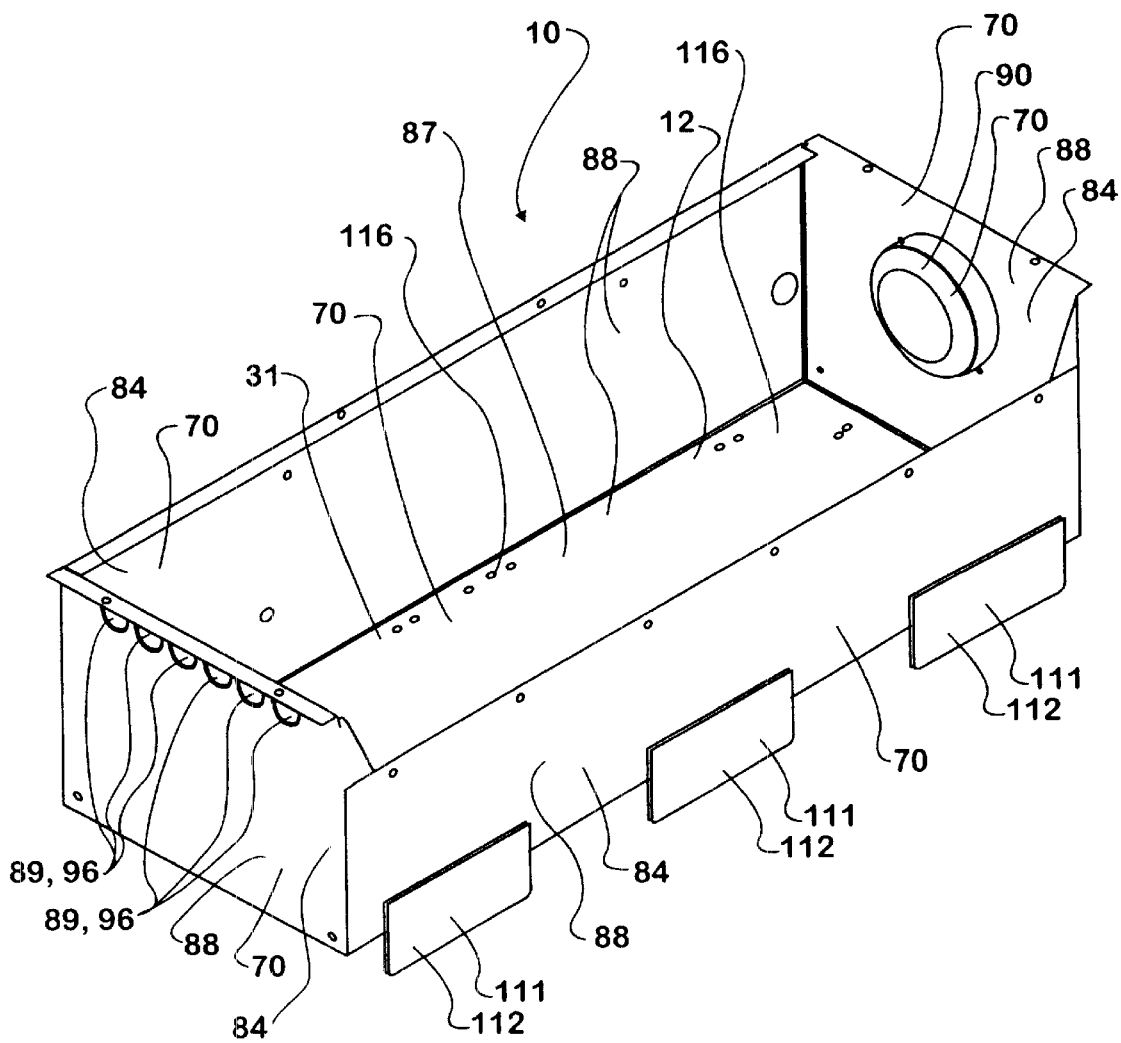
FIG. 19 is a perspective view of the first battery mounting assembly minus the lid and other components showing the ventilation fan.
Figure 20:
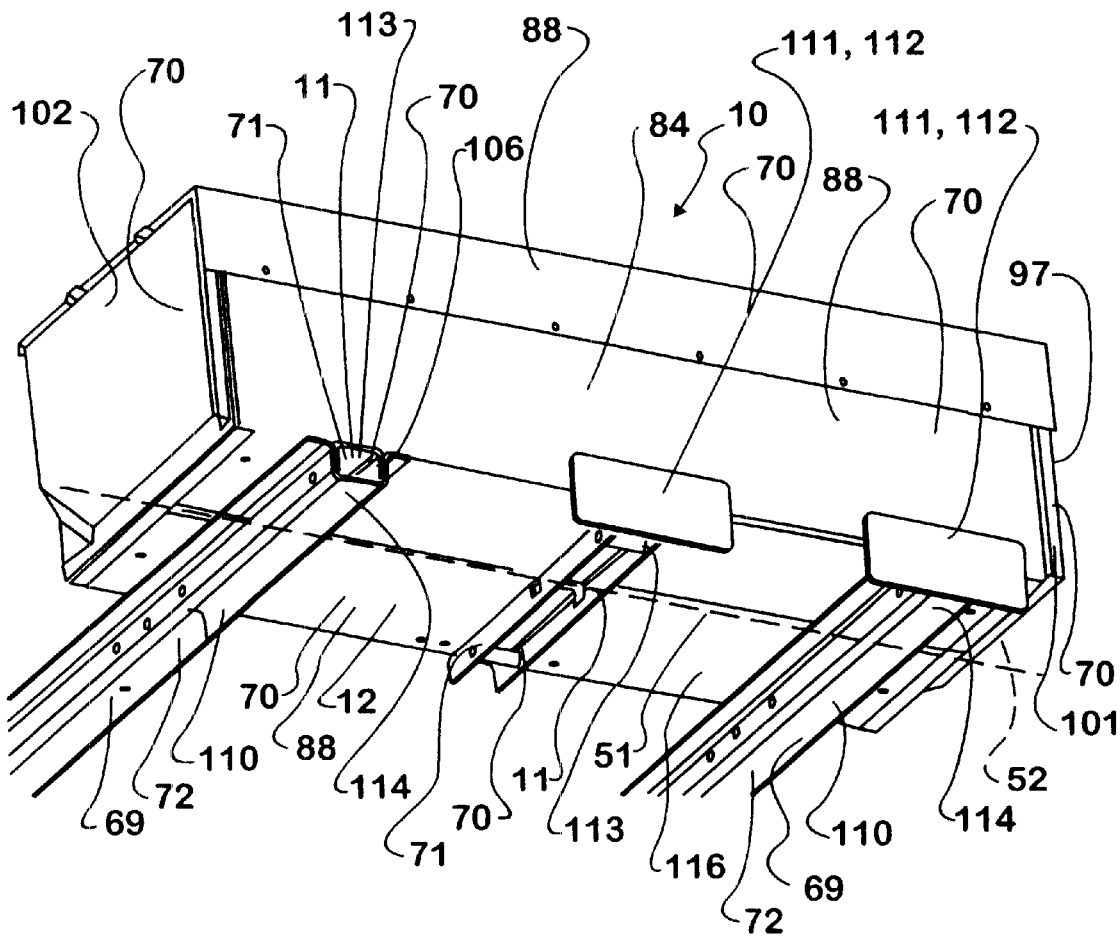
FIG. 20 is a perspective view from below of the first battery mounting assembly showing the engagement of the main support members to the first battery assembly hangers.
Figure 21:
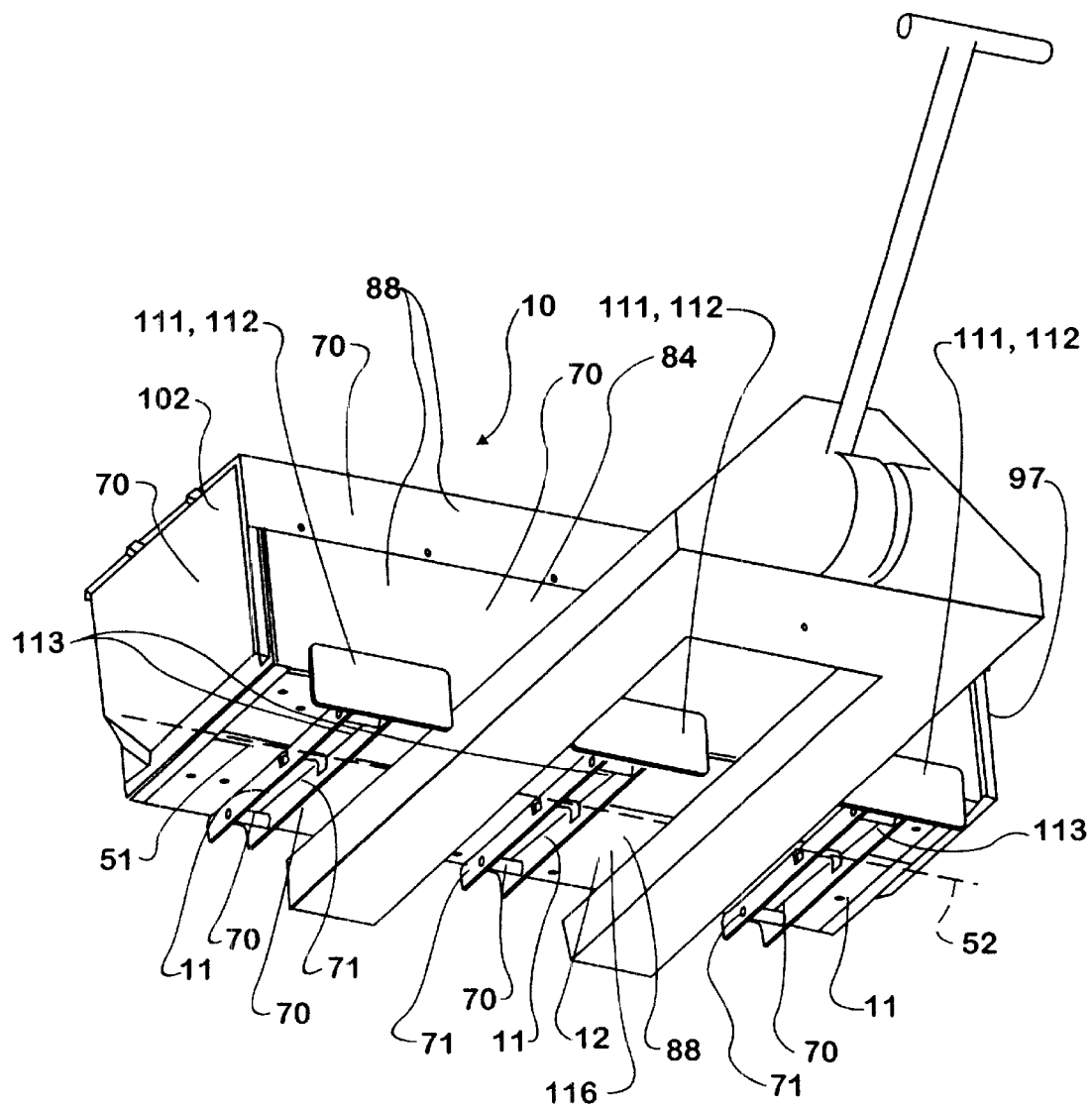
FIG. 21 is a perspective view from below of the first battery mounting assembly on a fork lift.
Figure 24:
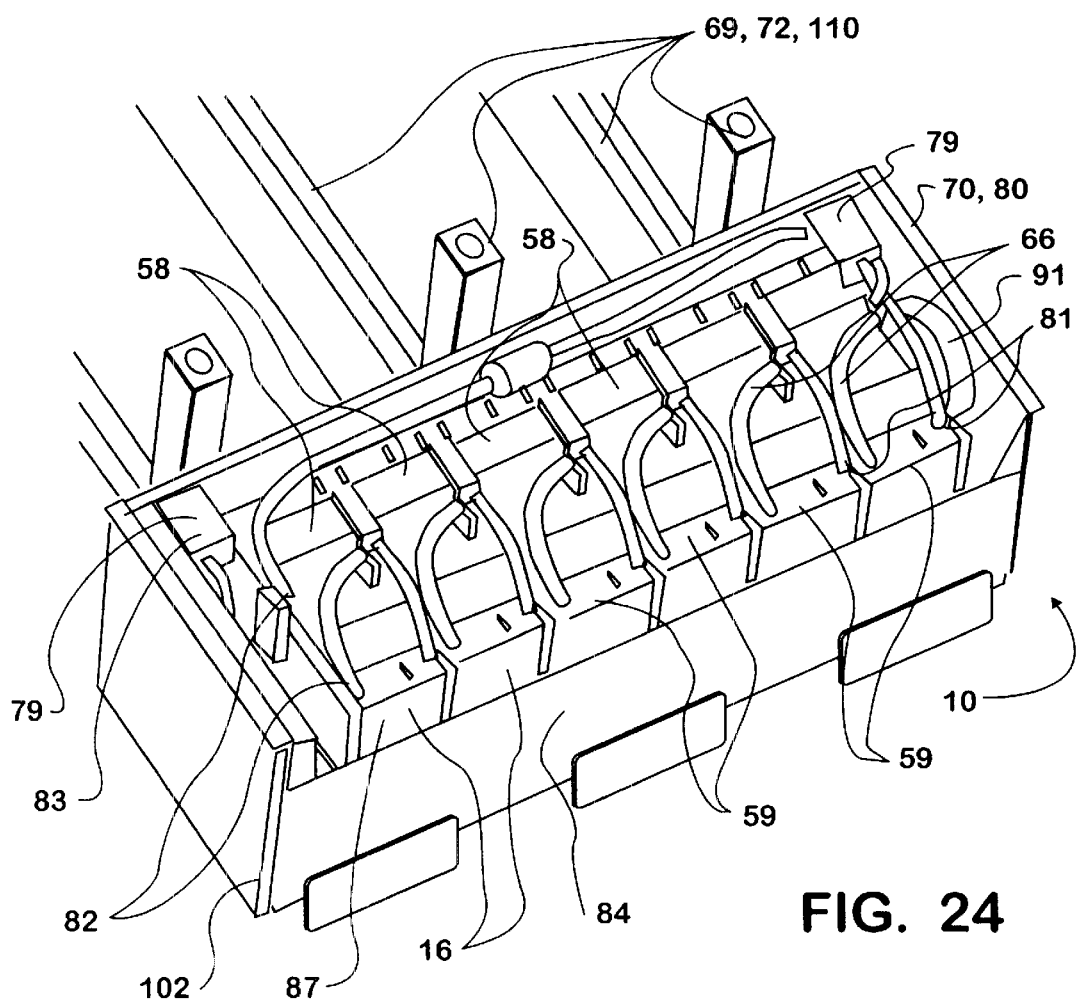
FIG. 24 is a perspective view of the first battery mounting assembly minus the lid showing the batteries and the electrical connections of the first battery mounting assembly.
Figure 25:
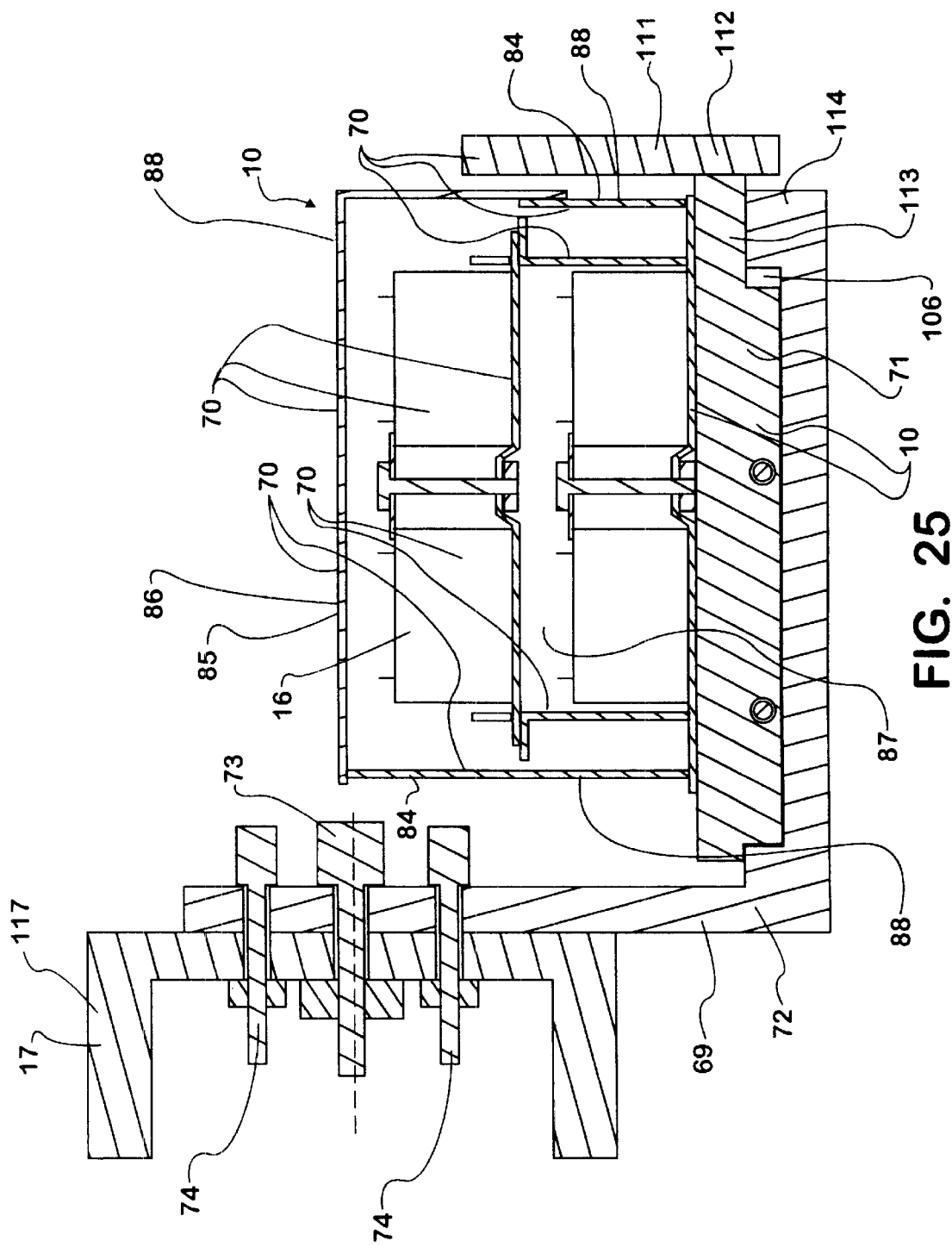
FIG. 25 is a side sectional view of the first battery mounting assembly in a direction parallel to the side walls of the upper tray support components showing the engagement of the first battery mounting assembly to the structural components of the vehicle.
Figure 26:
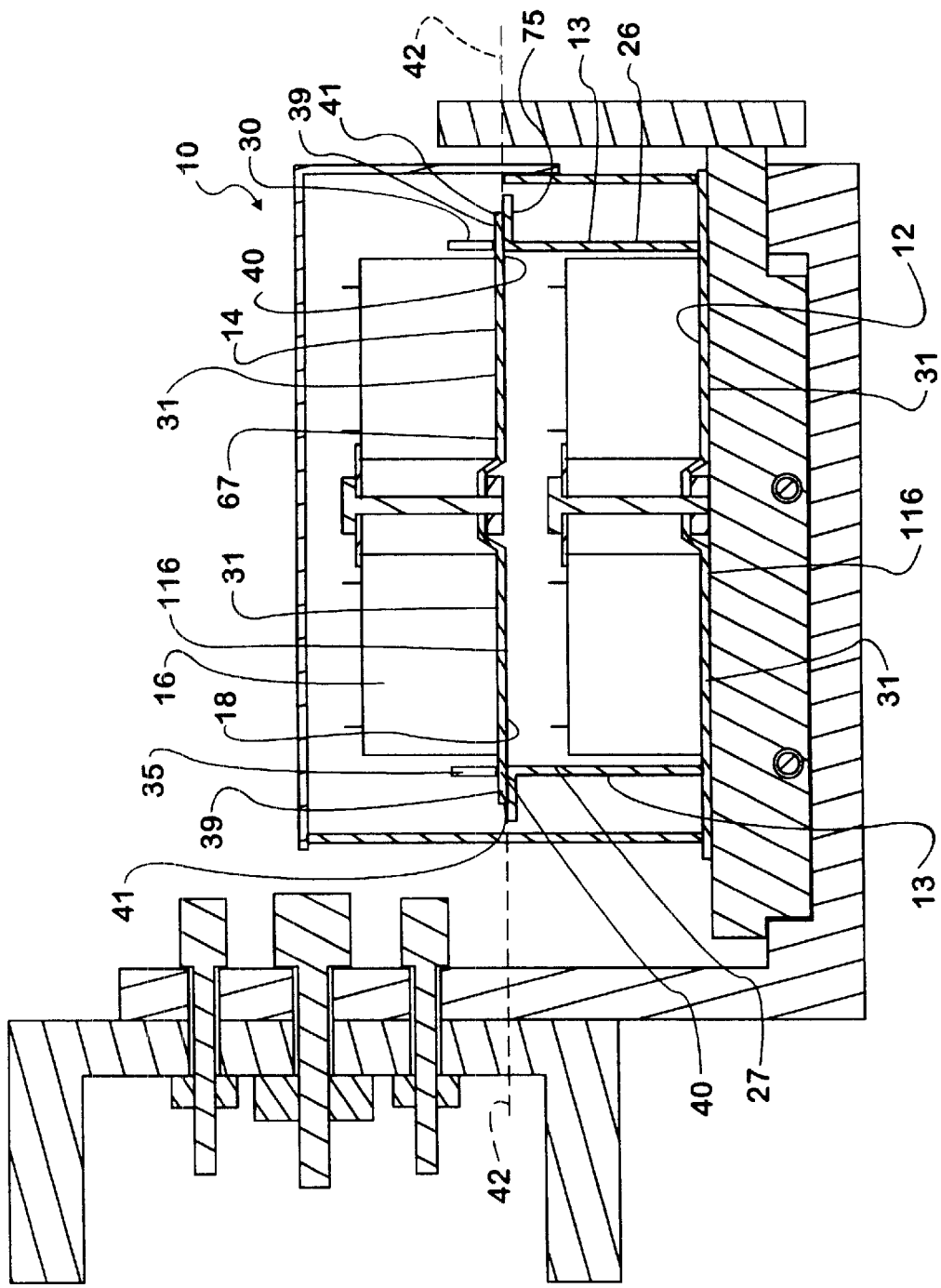
FIG. 26 is a side sectional view of the first battery mounting assembly in a direction parallel to the side walls of the upper tray support components showing the construction of the upper tray support components and the first upper battery tray.
Figure 27:
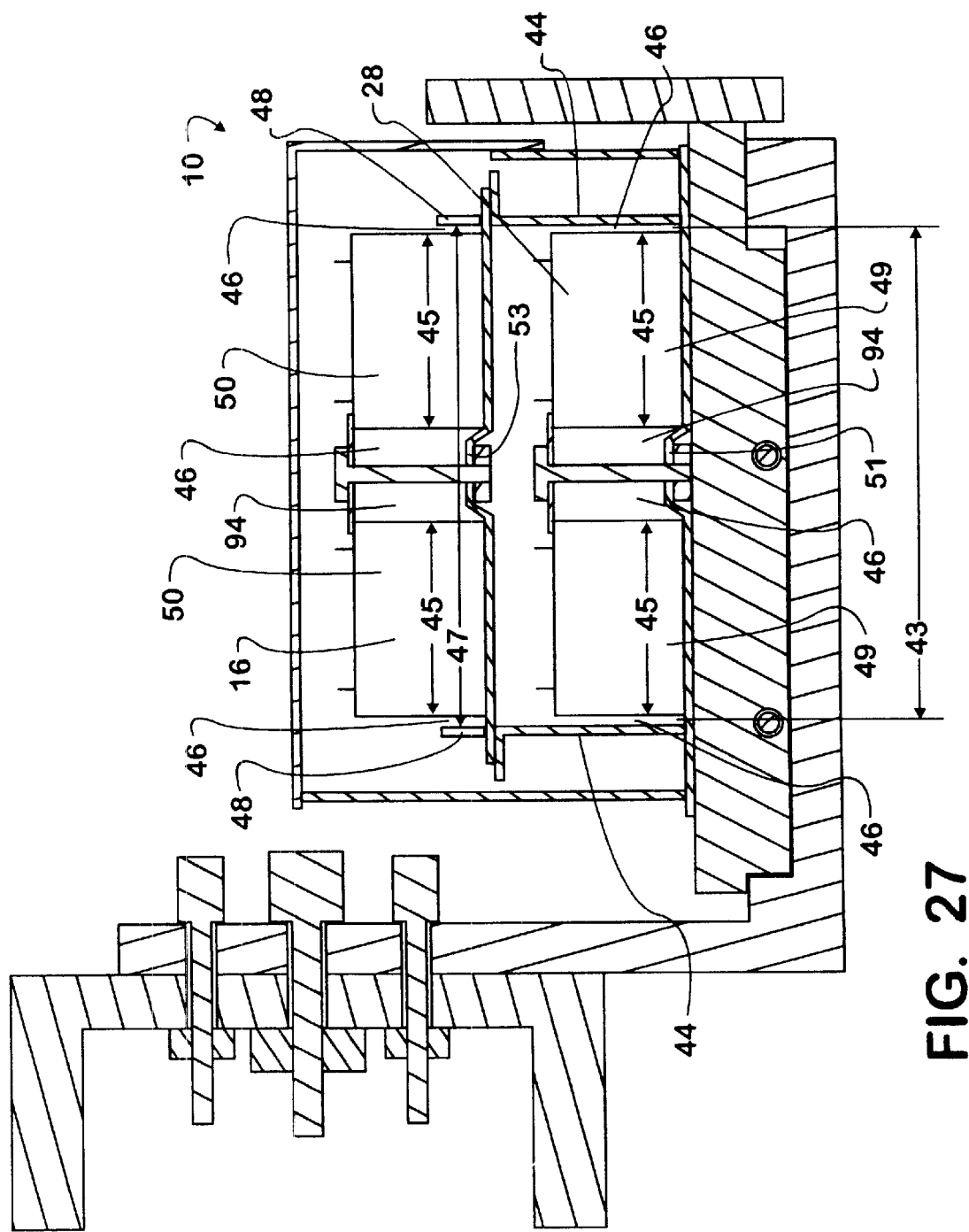
FIG. 27 is a side sectional view of the first battery mounting assembly in a direction parallel to the side walls of the upper tray support components showing the spacing of the batteries and the side walls of the upper tray support components.

The first battery mounting assembly 10 may have devices to interrupt electrical connections between the batteries 16 and portions of an electrical system of the vehicle 15 that are beyond the first battery mounting assembly 10 in the event that the vehicle 15 is involved in a traffic accident. One or more embodiments of battery mounting assemblies 10 and/or battery mounting assembly components that are constructed in a manner such that they effect such feature(s) are best illustrated in FIGS. 13 and 24. It is desirable to electrically isolate the batteries 16 from the vehicle 15 to reduce the risk that short circuits will occur as a result of the vehicle's 15 involvement in a traffic accident. When a vehicle 15 is involved in a traffic accident, deformation, movement and collision of components of the vehicle 15 can cause undesirable electrical connections. For example various electrical wires of the vehicle 15 may be smashed into electrically conducive components and a short circuit situation may result. The first battery mounting assembly 10 may include at least two inertial trigger electrical disconnects 79 mounted to the first battery mounting assembly 10. A positive inertial trigger electrical disconnect 80 would be electrically connected to one or more positive voltage terminals 81 of the batteries 16 mounted to the first battery mounting assembly 10 and is also electrically connected to the electrical system of the vehicle 15. The positive inertial trigger electrical disconnect 80 would be constructed such that it has a closed operational state and an open operational state. When the positive inertial trigger disconnect 80 were in its closed operational state it would comprise a portion of an electrical connection between the one or more positive voltage terminals 81 of the batteries 16 and the electrical system of the vehicle 15. When the positive inertial trigger disconnect 80 were in its open operational state the electrical connection between the one or more positive voltage terminals 81 of the batteries 16 and the electrical system of the vehicle 15 would be interrupted. The first battery mounting assembly 10, the positive inertial trigger disconnect 80, and the electrical system of the vehicle 15 would be constructed such that during normal vehicle 15 operation the positive inertial trigger disconnect 80 would be in a closed operational state. Thus, during normal vehicle 15 operation, the one or more positive battery terminals 81 of the batteries 16 are connected through the positive inertial trigger disconnect 80 to the electrical system of the vehicle 15. The positive inertial trigger disconnect 80 would be constructed such that, when it is subjected to relatively large accelerations, the operational state of the positive inertial trigger disconnect 80 would change from closed to open. The accelerations that the positive inertial trigger electrical disconnect 80 must be subjected to in order to cause a change of its operational state from closed to open would be greater than accelerations that the first battery mounting assembly 10 would be subjected to during normal vehicle 15 operation. Thus, if the first battery mounting assembly 10 and also the positive inertial trigger electrical disconnect 80 are subjected to large accelerations as a result of the vehicle 15 being involved in a traffic accident the operational state of the positive inertial trigger electrical disconnect 80 changes to open. When this happens the positive voltage terminals 81 of the batteries 16 are electrically disconnected from the electrical system of the vehicle 15. A negative inertial trigger electrical disconnect 83 would be electrically connected to one or more negative voltage terminals 82 of the batteries 16 mounted to the first battery mounting assembly 10 and is also electrically connected to the electrical system of the vehicle 15. The negative inertial trigger electrical disconnect 83, the electrical system of the vehicle 15, and the first battery mounting assembly 10 would be constructed in a manner such that the negative inertial trigger electrical disconnect 83 would function in a very similar manner to the positive inertial trigger electrical disconnect 80. Thus, during normal vehicle 15 operation, the one or more negative battery terminals 82 of the batteries 16 are connected through the negative inertial trigger disconnect 83 to the electrical system of the vehicle 15. If the first battery mounting assembly 10 and also the negative inertial trigger electrical disconnect 83 were subjected to large accelerations as a result of the vehicle 15 being involved in a traffic accident the operational state of the negative inertial trigger electrical disconnect 83 would change to open. When this happens the negative voltage terminals 82 of the batteries 16 are electrically disconnected from the electrical system of the vehicle 15. Thus, if a vehicle 15 constructed with a first battery mounting assembly 10 as described above were involved in a substantial traffic accident the batteries 16 would be electrically disconnected from portions of the electrical system of the vehicle 15 outside the first battery mounting assembly 10. The first battery mounting assembly 10 is constructed in a manner that tends to prevent damage of the first battery mounting assembly 10 in ways that would cause the batteries 16 to be forced into electrically conducive contact with the first battery mounting assembly 10 as a result of a traffic accident. These two qualities of the first battery mounting assembly 10 substantially reduce the risk that the batteries 16 will be electrically short circuited through components of the vehicle 15 as a result of the vehicle 15 being involved in a traffic accident. The positive inertial trigger electrical disconnect 81 and the negative inertial electrical disconnect 83 may be of many different constructions. Such electrical disconnect devices that change from an operational state of closed to open as a result of being subjected to relatively large accelerations are fairly well known. Due to differences in the design constraints of the systems within which they are to be included different constructions of such electrical disconnect devices exist. In general, such electrical disconnect devices have a switch that is caused to open when the device is subjected to large accelerations. Some examples of such electrical disconnect devices have this switch electrically connected directly to the components that are intended to be electrically disconnected when the electrical disconnect device is subjected to large accelerations. Other examples of such electrical disconnect devices have this switch electrically connected within auxiliary circuits that effect disconnection of a switch that is connected directly to the components that are intended to be electrically disconnected when the electrical disconnect device is subjected to large accelerations. Such electrical disconnect devices are commonly included in power circuits for electric fuel pumps of vehicles so that when the vehicle is involved in a traffic accident electrical power to the fuel pump is interrupted to prevent undesirable pumping of fuel. Such electrical disconnect devices have been included in the power circuits that connect the batteries of electric and hybrid electric vehicles to the electrical systems of the vehicle 15. In the past, electrical disconnect devices have only been included in the electrical connection of the positive voltage terminals 81 of the batteries 16 to the electrical system or the electrical connection of the negative voltage terminals 82 to the electrical system and not both.

The first battery mounting assembly 10 may include means for ventilating the interior 87 of the first battery mounting assembly 10. One or more embodiments of battery mounting assemblies 10 and/or battery mounting assembly components that are constructed in a manner such that they effect such feature(s) are best illustrated in FIGS. 2, 3, 7, 8, 13, 16, 18, 19, and 23. The ventilation of the interior 87 of the first battery mounting assembly 10 cools the batteries 16 mounted to the first battery mounting assembly 10 and drives gases emitted from the batteries 16 out of the interior 87 of the first battery mounting assembly 10. A ventilation fan 90 may be engaged to the first battery mounting assembly 10 adjacent a ventilation opening 89 in the outer shell 88 of the first battery mounting assembly 10. In the preferred embodiment, the ventilation fan 90 is constructed, engaged to the first battery mounting assembly 10 and connected to fan controls in a manner such that ventilation air leaving the fan travels into as opposed to out of the interior 87 of the first battery mounting assembly 10. Because the ventilation fan 90 "pushes" air into, as opposed to "pulling" air out of the interior 87 of the first battery mounting assembly 10 air pressure in the interior 87 of the first battery mounting assembly 10 is greater than air pressure outside the first battery mounting assembly 10. The flow of ventilation air is more effective in cooling the batteries 16 if the air pressure in the interior 87 of the first battery mounting assembly 10 is greater the air pressure outside the first battery mounting assembly 10. In the preferred embodiment the ventilation fan 90, must, thus, be disposed adjacent a ventilation intake opening 91 through which ventilation air travels into the interior 87 of the first battery mounting assembly 10. In the preferred embodiment, the ventilation fan 90 is positioned such that a central portion 92 of an airstream 93 flows directly into and then through spaces 94 between adjacent rows 95 of batteries 16. This relationship is best illustrated in FIG. 7. With the ventilation fan 90 so positioned, there is a much lower restriction to flow of ventilation air through the first battery mounting assembly 10 than there would be with the ventilation fan 90 located in other positions. The flow of ventilation air between adjacent rows 95 of batteries 16 is also very effective in cooling the batteries 16. In the preferred embodiment, a ventilation exhaust opening 96, through which ventilation air exits the interior 87 of the first battery mounting assembly 10, is defined by the outer walls 84 of the first battery mounting assembly 10 at a point substantially opposite the ventilation intake opening 91.

In the preferred embodiment, the first battery assembly hangers 72 and the main support members 11 that are engaged to them are constructed and engaged to one another in a very strong manner. In this embodiment, each of the first battery assembly hangers 72 defines a support member recess 106. A portion of a main support member 11 protrudes into the support member recess 106 of each of the first battery assembly hangers 72. One or more embodiments of battery mounting assemblies 10 and/or battery mounting assembly components that are constructed in a manner such that they effect such feature(s) are best illustrated in FIGS. 5, 8, 20, 25, 26, and 27. Abutment between surfaces of the support member recesses 106 and the surfaces of the main support members 11 that are disposed within them makes this style of engagement of the main support members 11 to the first battery assembly hangers 72 very strong. Preferably one or more bolts protrude through bores defined by the first battery assembly hangers 72 into or through one or more bores defined by portions of the main support members 11 disposed within support member recesses 106 and engage the components to one another. Also in the preferred embodiment, the main support members 11 are spaced relative to one another such that there are convenient surfaces available on the underside of the first battery mounting assembly 10 for lifting the first battery mounting assembly 10 with the forks of a fork lift.

Structure may be included in the first battery mounting assembly 10 to inhibit the introduction of debris into the interior 87 of the first battery mounting assembly 10 through the ventilation intake opening 91. As is best shown in FIG. 8, the first battery mounting assembly 10 may include a first debris shield 97 that is intended to inhibit debris from traveling into the interior 87 of the first battery mounting assembly 10 through the ventilation intake opening 91. The first debris shield 97 would be comprised of a first sheet barrier 98 disposed substantially parallel to a portion of the outer walls 84 that defines the ventilation intake opening 91. The first sheet barrier 98 would be constructed and positioned such that a large percentage of the ventilation intake opening 91 would be aligned with the first sheet barrier 98 in directions perpendicular to the portion of the outer walls 84 that define the ventilation intake opening 91. The first sheet barrier 98 would extend downwardly from a portion that is disposed adjacent the ventilation intake opening 91 to a first sheet barrier lower edge 99. The first sheet barrier 98 would be constructed and positioned such that a distance from a portion of the first sheet barrier 98 that is adjacent the ventilation intake opening 91 to the first sheet barrier lower edge 99 is considerably greater than a parallel distance between the first sheet barrier 98 and the portion of the outer wall 84 that defines the ventilation intake opening 91. The first debris shield 97 would be mounted to the first battery mounting assembly 10 by a first sheet barrier mounting wall 100. The first sheet barrier mounting wall 100 would be engaged to the first sheet barrier 98 around a periphery 101 of the first sheet barrier 98. The first sheet barrier mounting wall 100 would extend from the periphery 101 of the first sheet barrier 98 toward the portion of the outer wall 84 of the first battery mounting assembly 10 that defines the ventilation intake opening 91. A portion of the first sheet barrier mounting wall 100 opposite a portion that is engaged to the periphery 101 of the first sheet barrier 98 would be engaged to a portion of the outer wall 84 that defines the ventilation intake opening 91. Said first sheet barrier mounting wall 100 would extend between the outer wall 84 and every portion of the periphery 101 of the first sheet barrier 98 except a portion adjacent the first sheet barrier lower edge 99. In other words, the only opening between the periphery 101 of the first sheet barrier 98 and the outer wall 84 would be an opening disposed adjacent the first sheet barrier lower edge 99. In order for debris to reach the ventilation intake opening 91 and travel through the ventilation intake opening 91 into the interior 87 of the first battery mounting assembly 10, it must first travel substantially vertically through the narrow space between the first debris shield 97 and the outer wall 84. Because this is unlikely to happen, it is unlikely that substantial amounts of debris would enter the interior 87 of the first battery mounting assembly 10 through the ventilation intake opening 91. The first debris shield 97 is preferably constructed such that the space between the first debris shield 97 and the outer wall 84 is substantially wider in horizontal directions parallel to the outer wall 84 than it is in directions perpendicular to the outer wall 84. As a result, when the ventilation fan 90 is operational, the velocity of ventilation air through the space between the first debris shield 97 and the outer wall 84 is relatively low. This is desirable because ventilation air traveling at such a low velocity is less likely to carry debris with it into the interior 87 of the first battery mounting assembly 10. The first battery mounting assembly 10, may further include a second debris shield 102 intended to inhibit debris from entering the interior 87 of the first battery mounting assembly 10 through the ventilation exhaust opening 96. The second debris shield 102 would comprise a second sheet barrier 103 with a second sheet barrier lower edge 104 and a second sheet barrier mounting wall 105. The second debris shield 102 would likely be constructed and positioned in a manner relative to the ventilation exhaust opening 96 that is very similar to the manner in which the first debris shield 97 is constructed and positioned relative to the ventilation intake opening 91.

A second battery mounting assembly 108, for mounting batteries 16 to the vehicle 15, may be mounted to the vehicle 15. One or more embodiments of battery mounting assemblies 10, 108 and/or battery mounting assembly components that are constructed in a manner such that they effect such feature(s) are best illustrated in FIGS. 3, 4, 14, and 15. The second battery mounting assembly 108 would likely comprise one or more second battery assembly hangers 109 that are engaged to the structural components 17 of the vehicle 15. The one or more second battery assembly hangers 109 would support the second battery mounting assembly 108. One or more of the first battery assembly hangers 72 may be rigidly engaged to one or more of the second battery assembly hangers 109. Those first battery assembly hangers 72 and second battery assembly hangers 109 that are engaged to one another reinforce each other. Battery assembly hangers 110 that are engaged to and reinforce one another in such a manner generally do not have to be constructed as robustly as battery assembly hangers 110 that are independent of one another. Such engagement of first battery assembly hangers 72 to second battery assembly hangers 109 can also be beneficial in the event that the vehicle 15 is involved in a traffic accident. In such an event the reinforcement that the battery assembly hangers 110 provide for one another allows the battery assembly hangers 110 to transmit more energy directly to the structural components 17 of the vehicle 15. The first battery mounting assembly 10 and the second battery mounting assembly 109 may be disposed upon opposite lateral sides of the vehicle 15. In such a case the first battery assembly hangers 72 and the second battery assembly hangers 109 may be constructed and engaged to the vehicle 15 such that they meet and are rigidly engaged to one another at a longitudinally and vertically disposed central plane of the vehicle 15. It can be easily imagined that the second battery mounting assembly 108 could be constructed in many of the same ways that the first battery mounting assembly 10 is.

The first battery mounting assembly 10 of the present invention may include structure to prevent objects from colliding directly with the batteries 16. One or more bumper components 111 may be included in the first battery mounting assembly 10. One or more embodiments of battery mounting assemblies 10 and/or battery mounting assembly components that are constructed in a manner such that they effect such feature(s) are well illustrated in most of the figures. Each of the one or more bumper components 111 would be engaged to either one or more main support members 11 or to one or more first battery assembly hangers 72. The bumper components 111 would be positioned such that they are farther from a centroid of the vehicle 15 than at least some of the batteries 16 mounted to the first battery mounting assembly 10. Each of the bumper components 111 would be disposed at a similar vertical position as some of the batteries 16 that are mounted to the first battery mounting assembly 10. The bumper components 111 are constructed with a high strength and are relatively rigidly engaged to the first battery mounting assembly 10. The bumper components 111 are intended to be subjected to relatively large forces in directions that would tend to drive the bumper components 111 toward the batteries 16 without the bumper components 111 actually being driven into contact with the batteries 16. For example, other vehicles may travel at the first battery mounting assembly 10 mounted to the vehicle 15 and impact the bumper components 111 in a direction that would tend to drive the bumper components 111 toward the batteries 16 that are mounted to the first battery mounting assembly 10. The bumper components 111 would transmit a large amount of the energy of such an impact through other components of the first battery mounting assembly 10 to the structural components 17 of the vehicle 15 before the bumper components 111 were driven into contact with the batteries 16. Preferably the bumper components 111 would transmit the energy of such an impact through other components of the first battery mounting assembly 10 to the structural components 17 of the vehicle 15 without the bumper components 111 being driven into contact with the batteries 16 at all. Obviously, however, if the bumper components 111 are subjected to extremely large impacts in certain directions the bumper components 111 will be driven into contact with the batteries 16 that are mounted to the first battery mounting assembly 10. In the preferred embodiment the bumper components 111 are relatively thick plates 112 that are fixedly engaged to outer ends 113 of the main support members 11 of the first battery mounting assembly 10. As was mentioned above, the bumper components 111 could, alternatively, be engaged to outer ends 114 of the first battery assembly hangers 72. In the preferred embodiment the plates 112 extend substantially vertically above the first lower battery tray 12. A number of other constructions of the bumper components 111 and manners in which the bumper components 111 could be engaged to the first battery mounting assembly 10 and provide the desired functionality could be easily imagined by one of ordinary skill in the art. In particular the bumper components 111 could be of many other shapes and could be engaged to the first battery mounting assembly 10 by relatively stiff spring components as opposed to being fixedly engaged to the first battery mounting assembly 10.

In the preferred embodiment, the first battery mounting assembly 10 may have further provisions to prevent undesirable electrical connection of the positive voltage battery terminals 81 or the negative voltage battery terminals 82 to the components of the first battery mounting assembly 10. One or more of the components of the first battery mounting assembly 10 may be made of steel and coated with an elastomer (not shown) with a high electrical resistance. In the preferred embodiment, the lid 85, the first lower battery tray 12, the outer walls 84, the side walls 44, the upper battery trays 67, the end walls 115 and the clamping devices 19 are made of steel and are coated with the elastomer (not shown) with a high electrical resistance. It should be appreciated that not all of the components of the first battery mounting assembly 10 must necessarily be coated with the elastomer coating. The preferred elastomer coating is Arma 952, an ARMA COATINGS® Polyurethane/Polyurea spray elastomer. Arma 952 is a combination of Polyurethane and Polyurea elastomers and is sprayed on surfaces of any components that are to be coated with it to a thickness from approximately one sixteenth of an inch ($\frac{1}{16}$") to one eighth of an inch ($\frac{1}{8}$") coating. The $\frac{1}{16}$" to $\frac{1}{8}$" coating thickness for the elastomer is optimum for durability, electrical insulation, and EMI/RFI shielding. The elastomer coating will not chip or rust from standard road debris like typical painted surfaces. The Polyurethane/Polyurea elastomer (Arma 952) provides a flexible but extremely tough monolithic membrane which provides excellent abrasion and chemical resistance.

Figure 9:
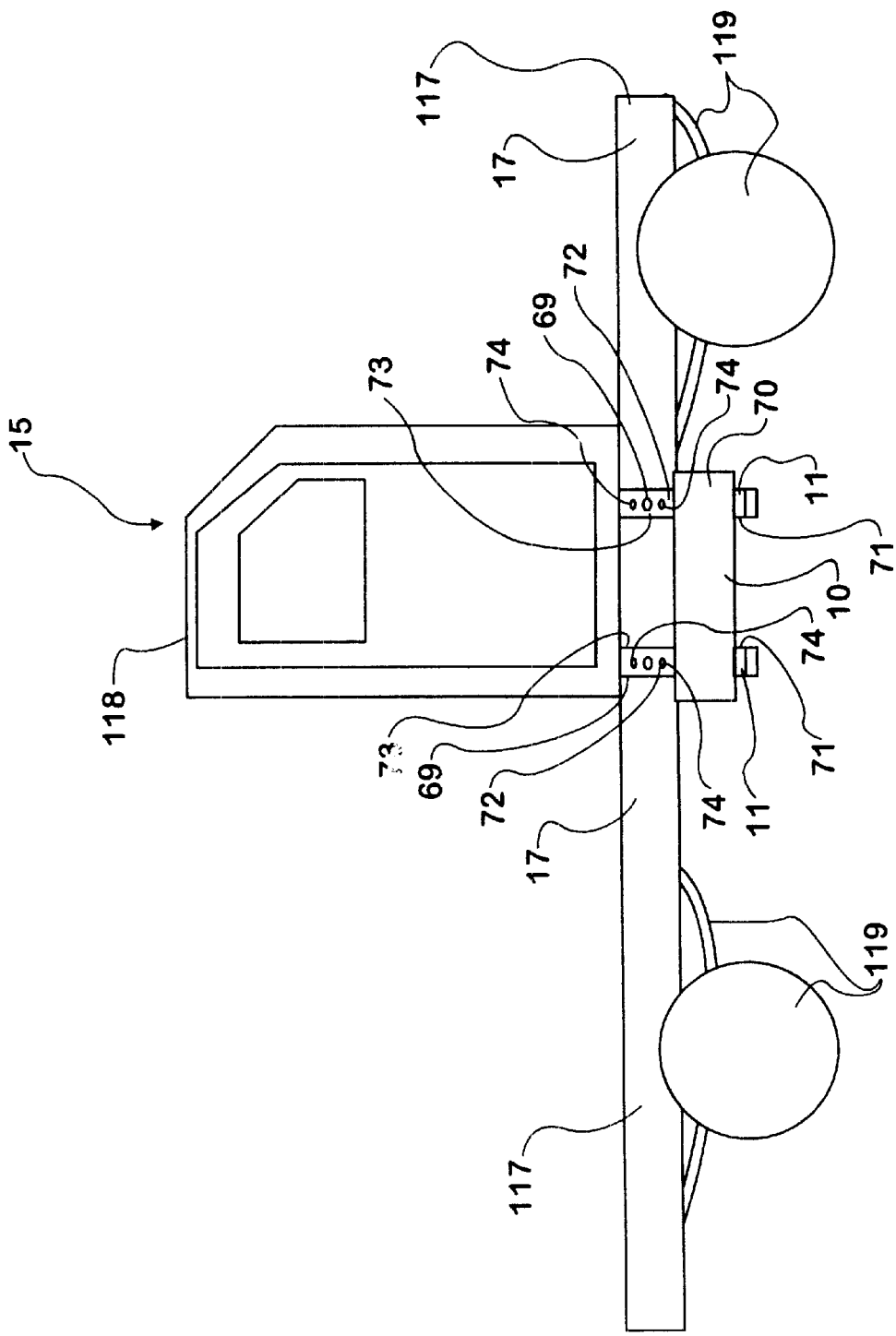
FIG. 9 is a side elevational view of the first battery mounting assembly mounted to a vehicle.
Figure 10:
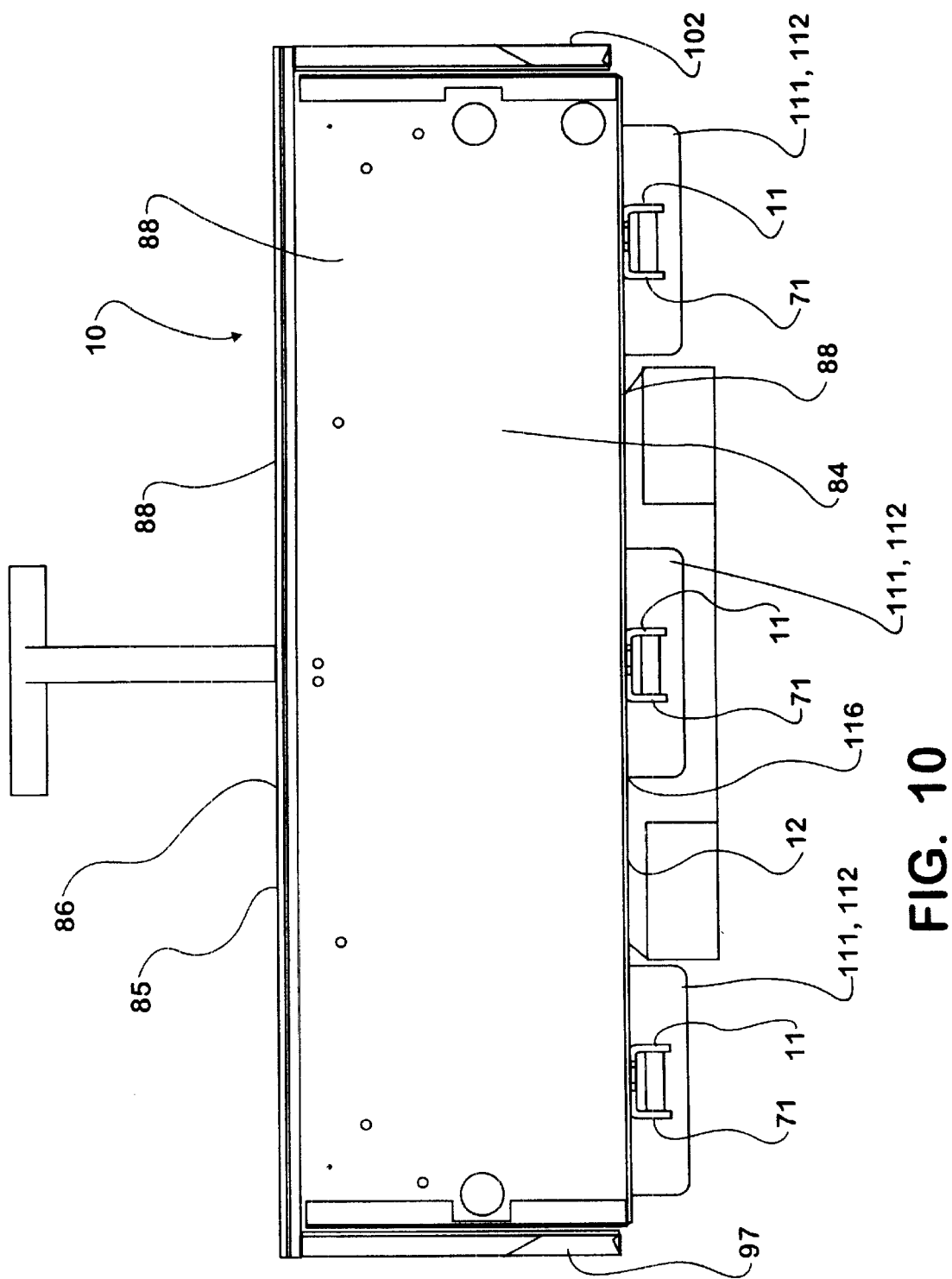
FIG. 10 is a side elevational view showing the first battery mounting assembly on a fork lift.
Figure 11:
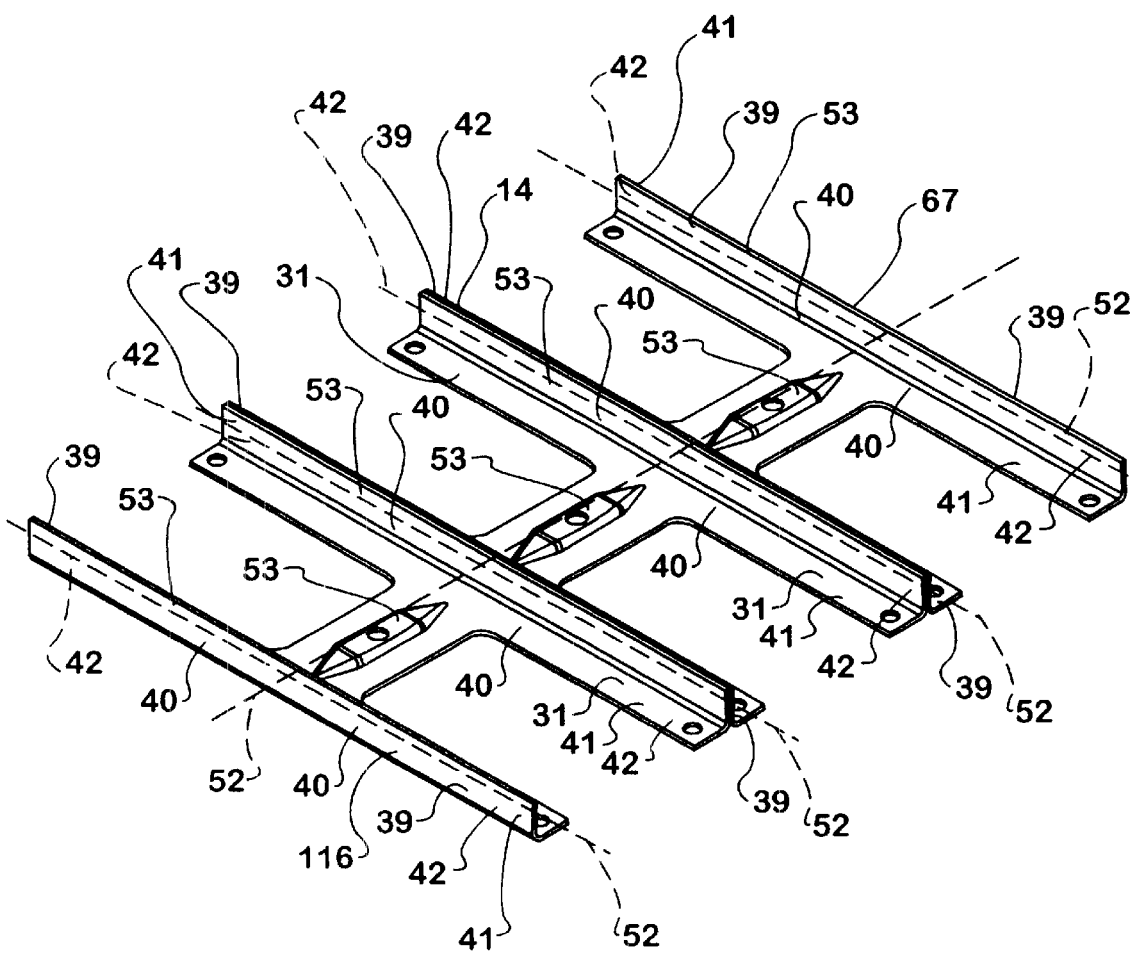
FIG. 11 is a perspective view from above of an embodiment of the first upper battery tray.
Figure 12:
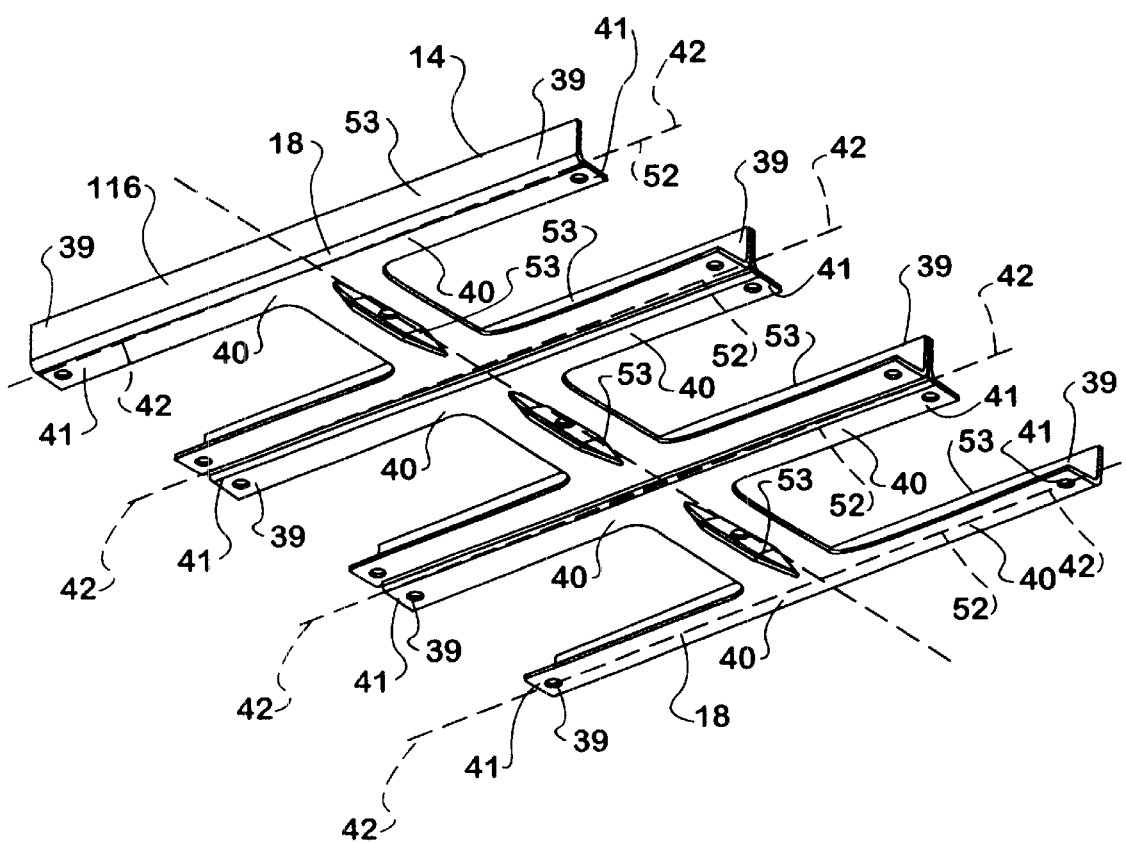
FIG. 12 is a perspective view from below of an embodiment of the first upper battery tray.

The first battery mounting assembly 10 and the second battery mounting assembly 108 are preferably mounted to a vehicle 15. An example of a vehicle 15 with a first battery mounting assembly 10 according to the present invention is illustrated in FIG. 9. The vehicle 15 would likely have structural components 17 upon which a large percentage of the components of the vehicle 15 depend for support in a direct or indirect manner. The structural components 17 of the vehicle 15 may include a frame 117. The vehicle 15 may also have a body 118 within which individuals or objects may be disposed and isolated from undesirable elements of an environment outside the body 118. The body 118 would likely be engaged to and supported by the frame 117. The vehicle 15 would also likely include a suspension system 119 for supporting the vehicle 15 and providing the vehicle 15 with a relatively low resistance to horizontal movement relative to the ground. The frame 117 would likely be engaged to and supported by the suspension system 119.

The detailed description included above describes a considerable number of features which the first battery mounting assembly 10 and the second battery mounting assembly 108 preferably include. It should be noted that a battery mounting assembly 10, 108 of the present invention may be of any design that includes one or more of the features described above and in some instances some features of the invention will be employed without a corresponding use of other features. There are three key features that a battery mounting assembly 10, 108 of the present invention may have that are considered to be particularly beneficial and novel. These three features include multiple stacked batteries, breakaway features, and a bumper feature. Any battery mounting assembly 10, 108 that includes one or more of these features is considered to be a novel contribution of the present invention to battery mounting technology. Any such battery mounting assembly 10, 108 that includes one of the three key features of the present invention is in accordance with the teachings of the present invention regardless of whether it comprises any of the other features described above that a battery mounting assembly 10, 108 may have.

A battery mounting assembly 10, 108 that is designed with a multiple stacked batteries feature is constructed, as is described above, in such a manner that a plurality of batteries 16 may be supported upon an upper battery tray 14, 68 above one or more batteries 16 supported upon a lower battery tray 12. One or more embodiments of battery mounting assemblies 10 and/or battery mounting assembly components that are constructed in a manner such that they effect this feature are best illustrated in FIGS. 5, 8, 22, 23, 24, 25, 26, and 27. In order to support the upper battery trays 14, 68, such a battery mounting assembly 10, 108 according to the present invention would have upper tray support components 13 that are engaged directly or indirectly to one or more main support members 11 that are, in turn, engaged to and supported by structural components 17 of the vehicle 15. The upper battery tray(s) 14, 68 would be supported by the upper tray support components 13 of the battery mounting assembly 10, 108. Construction of a battery mounting assembly 10, 108 in such a manner that it has such a multiple stacked batteries feature allows for very space efficient location of a multitude of batteries 16 on a vehicle 15.

A battery mounting assembly 10, 108 that is designed with a breakaway feature is constructed in such a manner that in certain circumstances breakaway components 70 of the battery mounting assembly 10, 108 break away and move in predetermined directions. One or more embodiments of battery mounting assemblies 10 and/or battery mounting assembly components that are constructed in a manner such that they effect this feature are best illustrated in FIGS. 5, 8, 9, 25, 26, and 27. Generally battery mounting assemblies 10, 108 are constructed with such a breakaway feature so that, when a vehicle 15 that such a battery mounting assembly 10, 108 is mounted to is involved in certain types of traffic accidents, movement of the break away components 70 in predetermined directions absorbs energy. A breakaway feature of a battery mounting assembly 10, 108 is effected by constructing the battery mounting assembly 10, 108 and the vehicle 15 that it is engaged to with battery assembly mounting components 69 and engagements that are relatively weak in certain directions. Such a construction causes battery assembly mounting components 69 of the battery mounting assembly 10, 108 and the vehicle 15 to deform and/or fracture and move relative to one another when the vehicle 15 and/or the battery mounting assembly 10, 108 is subjected to relatively large forces and/or accelerations in certain predetermined directions. The predetermined directions in which such a battery mounting assembly 10, 108 moves when the vehicle 15 and/or the battery mounting assembly 10, 108 mounted to it are subjected to relatively large forces and/or accelerations are break away motions of the battery mounting assembly 10, 108. The construction of such a battery mounting assembly 10, 108 and the vehicle 15 is strong enough, however, that even when the battery mounting assembly 10, 108 undergoes break away motions it remains engaged to and supported by the structural components 17 of the vehicle 15. A battery mounting assembly 10, 108 with a break away feature is constructed in such a manner that, when it undergoes break away motions, the breakaway components 70 move relative to structural components 17 of the vehicle 15 but not relative to one another. The breakaway components 70 of the battery mounting assembly 10, 108 include the first lower battery tray 12 and any components necessary to engage batteries 16 to the first lower battery tray 12. In order to help prevent motion of the break components 70 relative to one another the breakaway components 70 of the battery mounting assembly 10, 108 are constructed and engaged to one another in a relatively strong and rigid manner.

A battery mounting assembly 10, 108 that has a bumper feature includes bumper components 111 that help protect batteries 16 mounted to the battery mounting assembly 10, 108 in the event that the battery mounting assembly 10, 108 is impacted directly by a large object such as another vehicle. One or more embodiments of battery mounting assemblies 10 and/or battery mounting assembly components that are constructed in a manner such that they effect this feature are well illustrated in most of the Figures. Each of the bumper components 111 of such a battery mounting assembly 111 is mounted to one or more main support members 11 and/or first battery assembly hangers 72. The bumper components 111 are mounted to the battery mounting assembly 10, 108 in such a position that they are farther from a centroid of the vehicle 15 than one or more of the batteries 16 that are mounted to the battery mounting assembly 10, 108. The one or more bumper components 111 of such a battery mounting assembly 10, 108 are mounted at a relative height similar to that of some of the batteries 16 that are closer to the centroid of the vehicle 15 than the bumper components 111. Thus, when an object such as another vehicle travels in a horizontal direction toward the vehicle 15 to which the battery mounting assembly 10, 108 is mounted, the object will impact the bumper components 111 before contacting the batteries 16 that are mounted upon the battery mounting assembly 10, 108. The bumper components 111, thus, protect the batteries 16 that are mounted to the battery mounting assembly 10, 108 from direct impacts. The bumper components 111 and the one or more main support members 11 and/or first battery assembly hangers 72 that the bumper components 111 are mounted to are constructed in a relatively strong manner so that the bumper components 111 may be subjected to relatively large forces without being driven into the batteries 16.

Those skilled in the art will appreciate that modifications could be made to the invention as described without departing from the spirit and scope of the invention and thus the scope of the invention is limited only by the following claims.

We claim:

1. A first battery mounting assembly for mounting batteries that have horizontal upper surfaces, a positive voltage terminal and a negative voltage terminal and that may be arranged in a first lower row of batteries, a second lower row of batteries, a first upper row of batteries and a second upper row of batteries to a vehicle that has a centroid, structural components, an electrical system, and may also have a second battery mounting assembly that is mounted to the vehicle with second battery assembly hangers that may be mounted to the structural components of the vehicle, said first battery mounting assembly comprising:

(a) one or more main support members engaged to and supported by some of the structural components of the vehicle;

(b) a first lower battery tray, upon which a plurality of the batteries that are to be mounted to the vehicle are supported when the batteries are mounted to the vehicle, engaged to and supported by said one or more main support members;

(c) one or more upper tray support components directly or indirectly engaged to and supported by said one or more main support members and/or said first lower battery tray;

(d) a first upper battery tray, upon which a plurality of the batteries that are to be mounted to the vehicle are supported when the batteries are mounted to the vehicle, (e) wherein said first upper battery tray is engaged to and supported by said one or more upper tray support components;

(f) wherein at least a portion of said first upper battery tray is disposed directly vertically above said first lower battery tray at a distance above said first lower battery tray such that one or more of the batteries that are to be mounted to the vehicle may be supported upon said first lower battery tray below said first upper battery tray and there would be space between any of the batteries, if they were supported on said first lower battery tray, and a lower surface of said first upper battery tray; and (g) wherein said upper tray support components, which do not include any of the batteries that are to be mounted to said first battery mounting assembly, extend vertically from said one or more main support members and/or said first lower battery tray and are engaged directly to said first upper battery tray in such a manner that said first upper battery tray is supported in a same spaced relationship above said first lower battery tray whether or not any of the batteries are disposed on the first lower battery tray or the first upper battery tray.

2. The first battery mounting assembly of claim 1, wherein:

(a) said first upper battery tray is releaseably fixedly engaged to said upper tray support components;

(b) said first battery mounting assembly further comprises one or more clamping devices for releaseably clamping a plurality of the batteries to said first upper tray;

(a) said fixed engagement of said first upper battery tray to said upper tray support components is of such a construction that it may be readily released, and the first upper battery tray separated from the first battery mounting assembly whether or not there are batteries clamped to the first upper battery tray; and (c) said clamping devices are constructed such that whether said first upper battery tray is releaseably fixedly engaged to said upper tray support components or said first upper battery tray has been separated from said upper tray support components, when the batteries are clamped to said first upper battery tray said one or more clamping devices that clamp the plurality of the batteries to said first upper battery tray may be readily released and the batteries may be removed from said first upper battery tray one at a time.

3. The first battery mounting assembly of claim 2, wherein:

(a) said upper tray support components comprise a first side wall;

(b) said first side wall is fixedly engaged to said first lower battery tray and/or one or more of said one or more main support members;

(c) said first side wall extends substantially vertically above said first lower battery tray;

(d) said upper tray support components comprise a second side wall;

(e) said second side wall is fixedly engaged to said first lower battery tray and/or one or more of said one or more main support members;

(f) said second side wall extends substantially vertically above said first lower battery tray;

(g) said first upper battery tray is engaged directly or indirectly to and is supported by said first side wall and said second side wall;

(h) said first side wall and said second side wall are positioned relative to one another such that a lower battery space is defined horizontally between said first side wall and said second side wall and vertically above at least a portion of said first lower battery tray;

(i) said first upper battery tray is disposed such that a majority of a battery support surface of said first upper battery tray is disposed horizontally between said first side wall and said second side wall;

(j) said first battery mounting assembly is further comprised of a first end wall and a second end wall;

(k) said first end wall is directly or indirectly fixedly engaged to said first lower battery tray and/or one or more of said one or more main support members and extends vertically above said first lower battery tray;

(l) said second end wall is directly or indirectly fixedly engaged to said first lower battery tray and/or one or more of said one or more main support members and extends vertically above said first lower battery tray;

(m) said first end wall and said second end wall are each substantially planar and are disposed such that they are substantially parallel to one another and perpendicular to said first side wall and said second side wall; and (n) said first end wall and said second end wall are each fixedly engaged to said side walls at outer end portions of said side walls.

4. The first battery mounting assembly of claim 3, wherein:

(a) said first side wall comprises a plurality of first side wall vertical tabs that are fixedly engaged to said first side wall and extend vertically from said first side wall to a point above said battery support surface of said first upper battery tray;

(b) said first side wall vertical tabs are spaced relative to one another such that first side wall tray locating slots are defined between respective ones of said first side wall vertical tabs;

(c) said first side wall and said first side wall vertical tabs are constructed and positioned relative to one another such that each of said first side wall tray locating slots, extends upwardly from a lower end, to an upper end which is an opening between upper ends of adjacent first side wall vertical tabs;

(d) said second side wall comprises a plurality of second side wall vertical tabs that are fixedly engaged to said second side wall and extend vertically from said second side wall to a point above said battery support surface of said first upper battery tray;

(e) said second side wall vertical tabs are spaced relative to one another such that second side wall tray locating slots are defined between respective ones of said second side wall vertical tabs;

(f) said second side wall and said second side wall vertical tabs are constructed and positioned relative to one another such that each of said second side wall tray locating slots, extends upwardly from a lower end, to an upper end which is an opening between upper ends of adjacent second side wall vertical tabs;

(g) said first upper battery tray comprises a plurality of tray locating members;

(h) each respective tray locating member has a tray engagement end and a terminal end; and (i) each of said tray locating members is fixedly engaged to said first upper battery tray and protrudes horizontally through a respective one of said first side wall tray locating slots or a respective one of said second side wall tray locating slots such that either said first side wall or said second side wall is disposed horizontally between a tray engagement end and a terminal end of each tray locating member.

5. The first battery mounting assembly of claim 4, wherein:

(a) said first battery mounting assembly further comprises outer walls, and a lid;

(b) said outer walls are fixedly engaged to said first battery mounting assembly and extend vertically above said first lower battery tray;

(c) said outer walls are disposed relative to one another such that said upper tray support components are disposed horizontally between said outer walls;

(d) said lid is engaged to said first battery mounting assembly in a releasable manner;

(e) a lid top portion of said lid is disposed directly vertically above said first lower battery tray and said first upper battery tray at a height that allows for space between the batteries that are to be disposed upon said first upper battery tray and said lid top portion when the batteries are disposed upon said first upper battery tray;

(f) an outer shell of said first battery mounting assembly comprises said outer walls, said lid, and said first lower battery tray;

(g) said outer walls, said lid, and said first lower battery tray are constructed and engaged to said first battery mounting assembly such that said first side wall, said second side wall, said first upper battery tray, and the batteries that are to be mounted to said first battery mounting assembly are substantially surrounded in all directions horizontally and vertically by said outer shell of said first battery mounting assembly when the batteries are mounted to said first battery mounting assembly.

6. The first battery mounting assembly of claim 5, wherein:

(a) said first battery mounting assembly comprises breakaway components and battery assembly mounting components;

(b) said breakaway components comprise said first lower battery tray, said first side wall, said second side wall, said first upper battery tray, and the batteries that are to be mounted to said first battery mounting assembly;

(c) said battery assembly mounting components comprise said one or more main support members and any components of said first battery mounting assembly engaged between said one or more main support members and the structural components of the vehicle;

(d) said breakaway components and said battery assembly mounting components are constructed and engaged to one another and the structural components of the vehicle in a manner such that, when said first battery mounting assembly is subjected to relatively large forces in certain directions, such as would occur when the vehicle is involved in a traffic accident, certain components of said battery assembly mounting components deform and/or fracture in predetermined manners and/or certain engagements of said breakaway components, said battery assembly mounting components, and the structural components of the vehicle to one another allow relative motion to occur between one another in predetermined manners such that said breakaway components move in predetermined manners relative to the vehicle and energy is absorbed and dissipated by said first battery mounting assembly as said breakaway components move relative to the vehicle;

(e) said breakaway components are constructed and engaged to one another in a relatively rigid manner such that, if said first battery mounting assembly is subjected to relatively large forces that cause said breakaway components to move in said predetermined manners relative to the vehicle, said breakaway components are prevented from moving relative to one another in all but relatively extreme traffic accidents; and (f) said breakaway components and said battery assembly mounting components are constructed and engaged to one another and the structural components of the vehicle in a relatively strong manner such that, even when some components of said first battery mounting assembly deform and/or fracture, as a result of said first battery mounting assembly being subjected to relatively large forces and/or accelerations in certain directions, said first battery mounting assembly remains to be supported by the vehicle during and after all but relatively extreme traffic accidents.

7. The first battery mounting assembly of claim 6, wherein:

(a) said battery assembly mounting components comprise first battery assembly hangers that are engaged to said one or more main support members in a relatively rigid manner;

(b) each of said first battery assembly hangers are engaged to the structural components of the vehicle by a main support bolt and one or more anti-rotation bolts;

(c) each anti-rotation bolt is engaged to a first battery assembly hanger at a point distant from an axis of a shank of a main support bolt that is engaged to a same first battery assembly hanger as said anti-rotation bolt;

(d) each main support bolt, each first battery assembly hanger, and the structural components of the vehicle are constructed with a strength such that engagement of each first battery assembly hanger to the structural components of the vehicle could be maintained by engagement of said first battery assembly hanger to the structural components of the vehicle by said main support bolt alone;

(e) each main support bolt, each first battery assembly hanger, and the structural components of the vehicle are constructed with a strength such that, even if said first battery mounting assembly were subjected to relatively large forces and/or accelerations as a result of the vehicle being involved in a traffic accident, engagement of each first battery assembly hanger to the structural components of the vehicle could be maintained by engagement of said each first battery assembly hanger to the structural components of the vehicle by said main support bolt alone; and (f) said anti-rotation bolts are of a relatively weak construction as compared to said main support bolts.

8. The first battery mounting assembly of claim 7, wherein:

(a) one or more of said first battery assembly hangers are constructed to be relatively rigidly engaged to one or more of the second battery assembly hangers when said first battery mounting assembly is mounted to the vehicle.

9. The first battery mounting assembly of claim 8, wherein:

(a) said first battery mounting assembly further comprises one or more bumper components;

(b) each of said one or more bumper components is engaged to one of said main support members and/or one of said first battery assembly hangers;

(c) each of said bumper components is positioned at a point of said first battery mounting assembly such that when said first battery mounting assembly is properly mounted to the vehicle and the batteries are mounted to the first battery mounting assembly, each of said bumper components are positioned farther from the centroid of the vehicle than one or more of the batteries that are mounted to said first battery mounting assembly;

(d) each of said bumper components are positioned at a relative height similar to that at which some of the batteries are disposed when they are mounted to said first battery mounting assembly;

(e) said one or more bumper components and said one or more main support members and/or first battery assembly hangers that said bumper components are engaged to are of a relatively strong construction such that, when said battery mounting assembly is properly mounted to the vehicle and the batteries are property mounted to said battery mounting assembly, said bumper components can be subjected to relatively large forces in directions that would tend to drive said bumper components toward the batteries without said bumper components being driven into said batteries.

10. The first battery mounting assembly of claim 9, wherein:

(a) said first side wall is substantially planar;

(b) said second side wall is substantially planar;

(c) said first side wall and said second side wall are disposed substantially parallel to one another;

(d) said first side wall and said second side wall are positioned relative to one another such that the batteries that are to be supported upon said first lower battery tray may be positioned upon said first lower battery tray such that any spaces between each of the batteries and an adjacent one of the batteries or said first side wall or said second side wall are relatively small in directions perpendicular to said first side wall and said second side wall;

(e) each of said first side wall vertical tabs is substantially planar and is located approximately in a first vertical tab plane as is every other first side wall vertical tab;

(f) each of said second side wall vertical tabs is substantially planar and is located approximately in a second vertical tab plane as is every other second side wall vertical tab;

(g) said first side wall vertical tabs and said second side wall vertical tabs are disposed such that said first vertical tab plane is disposed substantially parallel to said second vertical tab plane; and (h) said first side wall vertical tabs and said second side wall vertical tabs are positioned relative to one another such that the batteries that are to be supported upon said first upper battery tray may be positioned upon said first upper battery such that any spaces between each of the batteries and an adjacent one of the batteries or said first side wall vertical tabs or said second side wall vertical tabs are relatively small in directions perpendicular to said first vertical tab plane and said second vertical tab plane.

11. The first battery mounting assembly of claim 10, wherein:

(a) said first lower battery tray defines one or more lower tray ribs that extend vertically above a battery support surface of said first lower battery tray;

(b) each of said lower tray ribs has a longitudinal rib axis that extends in directions parallel to said first side wall and said second side wall;

(c) each lower tray rib is positioned such that any distance, in a direction perpendicular to said first side wall and said second side wall, between a lower tray rib and an adjacent lower tray rib or side wall is just slightly greater than a battery width of the one of the batteries that is to be disposed upon said first lower battery tray between said lower tray rib and said adjacent lower tray rib or side wall;

(d) said first upper battery tray defines one or more upper tray ribs that extend vertically above a battery support surface of said first upper battery tray;

(e) each of said upper tray ribs has a longitudinal rib axis;

(f) one or more of said upper tray ribs are positioned such that their longitudinal rib axes are disposed substantially parallel to said first vertical tab plane and said second vertical tab plane;

(g) one or more of said upper tray ribs are positioned such that their longitudinal rib axes are disposed substantially perpendicular to said first vertical tab plane and said second vertical tab plane;

(h) each of said upper tray ribs is positioned such that any distance, in a direction perpendicular to said longitudinal rib axis of said upper tray rib, between an upper tray rib and an adjacent upper tray rib or vertical tab is just slightly greater than a battery width of one of the batteries that is to be disposed upon said first upper battery tray between said upper tray rib and said adjacent upper tray rib or vertical tab; and (i) said first battery mounting assembly is constructed such that each of said first side wall tray locating slots and each of said second side wall tray locating slots is of a width narrower than any of the battery widths of any of the batteries that are to be supported upon said first upper battery tray.

12. The first battery mounting assembly of claim 11, wherein:

(a) one or more of said first battery assembly hangers defines a support member recess; and (b) a portion of one or more of said one or more main support members of said first battery mounting assembly protrudes into a support recess defined by a battery assembly hanger.

13. The first battery mounting assembly of claim 12, wherein:
(a) said first battery mounting assembly is further comprises at least two inertial trigger electrical disconnects mounted to said first battery mounting assembly;
(b) a positive inertial trigger electrical disconnect is intended to be electrically connected to the positive voltage terminals of one or more of the batteries that are to be mounted to said first battery mounting assembly and said positive inertial trigger electrical disconnect is also intended to be electrically connected to the electrical system of the vehicle;
(c) said positive inertial trigger electrical disconnect is constructed such that during normal vehicle operation, when the batteries are mounted to said first battery mounting system, said positive inertial trigger electrical disconnect operates in closed operational state and acts as part of an electrical connection between one or more of the positive voltage battery terminals and the electrical system of the vehicle;
(d) said positive inertial trigger electrical disconnect is constructed such that, when the batteries are mounted to the battery mounting assembly, and when said first battery mounting assembly is subjected to relatively large accelerations greater than those that said first battery mounting assembly would be subjected to during normal vehicle operation and thus said positive inertial trigger disconnect is subjected to similar relatively large accelerations, said operational state of said positive inertial trigger disconnect changes from closed to open and said electrical connection between the one or more positive voltage terminals of the batteries and the electrical system of the vehicle is interrupted;
(e) a negative inertial trigger electrical disconnect is intended to be electrically connected to one or more of the negative voltage terminals of the batteries that are to be mounted to said first battery mounting assembly and said negative inertial trigger electrical disconnect is also intended to be electrically connected to the electrical system of the vehicle;
(f) said negative inertial trigger electrical disconnect is constructed such that during normal vehicle operation, when the batteries are mounted to said first battery mounting assembly, said negative inertial trigger electrical disconnect operates in closed operational state and acts as part of an electrical connection between one or more of the negative voltage battery terminals of the batteries and the electrical system of the vehicle; and
(g) said negative inertial trigger electrical disconnect is constructed such that, when the batteries are mounted to the vehicle, and when said first battery mounting assembly is subjected to relatively large accelerations greater than those that said first battery mounting assembly would be subjected to during normal vehicle operation and thus said negative inertial trigger disconnect is subjected to similar relatively large accelerations, said operational state of said negative inertial trigger disconnect changes from closed to open and said electrical connection between the one or more negative voltage terminals of the batteries and the electrical system of the vehicle is interrupted.

14. The first battery mounting assembly of claim 13, wherein:
(a) when the batteries are mounted to said first battery mounting assembly the first lower row of batteries is disposed upon said first lower battery tray on one side of and adjacent to a lower tray rib that is defined by said first lower battery tray;
(b) said lower tray rib that the first lower row of batteries is disposed on one side of is positioned such that a longitudinal rib axis of said lower tray rib is disposed substantially parallel to said first side wall and said second side wall;
(c) when the batteries are mounted to said first battery mounting assembly the second lower row of batteries is disposed adjacent to said lower tray rib, that the first lower row of batteries is disposed adjacent, and the second lower row of batteries is disposed on a side of said lower tray rib opposite a side of said lower tray rib upon which the first lower row of batteries is disposed;
(d) said first battery mounting assembly further comprises one or more lower tray clamping devices for clamping the batteries of the first lower row of batteries and the batteries of the second lower row of batteries to said first lower battery tray;
(e) each of said lower tray clamping devices comprises a clamp plate, a clamp bolt and a clamp nut;
(f) a clamp plate lower surface of said clamp plate of each of said lower tray clamping devices abuts the horizontal upper surface of one or more of the batteries in the first lower row and the horizontal upper surface of one or more of the batteries in the second lower row when the batteries are clamped to said first lower battery tray;
(g) said clamp bolt of each of said lower tray clamping devices protrudes through said clamp plate of each of said lower tray clamping devices and through said lower tray rib that the first lower row of batteries and the second lower row of batteries are disposed upon opposite sides of when the batteries are clamped to said first lower battery tray;
(h) either a bolt head of said clamp bolt or said clamp nut of each of said lower tray clamping devices is disposed on an upper side of said clamp plate of each of said lower tray clamping devices;
(i) whichever of said clamp nut and said bolt head of each of said lower tray clamping devices is not disposed on said upper side of said clamp plate of each of said lower tray clamping devices is disposed on a lower side of said lower tray rib that the first lower row of batteries and the second lower row of batteries are disposed upon opposite sides of when the batteries are clamped to said first lower battery tray;
(j) an end of each of said clamp bolts of said lower tray clamping devices opposite said bolt head is threadedly engaged to said clamp nut of each of said lower tray clamping devices;
(k) each of said clamp plates of said lower tray clamping devices applies a downward clamping force to, and thus clamps against said battery support surface of said lower battery tray, one or more of the batteries of the first lower row of batteries and one or more of the batteries of the second lower row of batteries when the batteries are mounted to said first lower battery tray;
(l) when the batteries are clamped to said first upper battery tray the first upper row of batteries is disposed upon said first upper battery tray on one side of and adjacent to a plurality of upper tray ribs that are defined by said first upper battery tray, and said plurality of upper tray ribs are positioned in line with one another and parallel to said first vertical tab plane and said second vertical tab plane;

(m) when the batteries are clamped to said first upper battery tray, the second upper row of batteries is disposed adjacent to said plurality of upper tray ribs that the first upper row of batteries is disposed adjacent, and the second upper row of batteries is disposed on a side of said plurality of upper tray ribs opposite said side of said plurality of upper tray ribs upon which the first upper row of batteries is disposed;

(n) said clamping devices that clamp the batteries to the first upper battery tray, when the batteries are clamped to the first upper battery tray, are comprised of one or more upper tray clamping devices that clamp the batteries of the first upper row of batteries and the batteries of the second upper row of batteries to said first upper battery tray;

(o) each of said upper tray clamping devices comprises a clamp plate, a clamp bolt and a clamp nut;

(p) a clamp plate lower surface of said clamp plate of each of said upper tray clamping devices abuts the horizontal upper surface of one or more of the batteries in the first upper row of batteries and the horizontal upper surface of one or more of the batteries in the second upper row of batteries when the batteries are clamped to said first upper battery tray;

(q) said clamp bolt of each of said upper tray clamping devices protrudes through said clamp plate of each of said upper tray clamping devices and through one of said plurality of upper tray ribs that the first upper row of batteries and the second upper row of batteries are disposed upon opposite sides of when the batteries are clamped to said first upper battery tray;

(r) either a bolt head of said clamp bolt or said clamp nut of each of said upper tray clamping devices is disposed on an upper side of said clamp plate of each of said upper tray clamping devices;

(s) when the batteries are clamped to said first upper battery tray, whichever of said clamp nut and said bolt head of each of said upper tray clamping devices is not disposed on said upper side of said clamp plate of each of said upper tray clamping devices is disposed on a lower side of one of said plurality of upper tray ribs that the first upper row of batteries and the second upper row of batteries are disposed upon opposite sides of;

(t) an end of each of said clamp bolts of said upper tray clamping devices opposite said bolt head is threadedly engaged to said clamp nut of each of said upper tray clamping devices; and (u) when the batteries are clamped to said first upper battery tray each of said clamp plates of said upper tray clamping devices applies a downward clamping force to, and thus clamps against said battery support surface of said first upper battery tray, one or more of the batteries of the first upper row of batteries and one or more of the batteries of the second upper row of batteries.

15. The first battery mounting assembly of claim 14, wherein:

(a) said first battery mounting assembly further comprises a ventilation fan;

(b) said ventilation fan is mounted to said first battery mounting assembly adjacent a ventilation intake opening defined by said outer walls of said first battery mounting assembly;

(c) said ventilation fan is constructed, engaged to said first battery mounting assembly and electrically connected to fan controls in such a manner that, when said ventilation fan is operational, as air travels away from said ventilation fan it flows into as opposed to out of an interior of said first battery mounting assembly;

(d) said ventilation fan is positioned within said first battery mounting assembly such that when said ventilation fan is operational, and when the batteries are mounted to said first battery mounting assembly, a central portion of an air stream exiting said ventilation fan travels through spaces between the first upper row of batteries and the second upper row of batteries and/or spaces between the first lower row of batteries and the second lower row of batteries;

(e) said outer walls of said first battery mounting assembly define a ventilation exhaust opening through which air may be displaced from said interior of said first battery mounting assembly by air that is introduced to said interior of said first battery mounting assembly by said ventilation fan; and (f) said ventilation exhaust opening is disposed at a point in said outer walls substantially opposite said ventilation intake opening.

16. The first battery mounting assembly of claim 15, wherein:

(a) said first battery mounting assembly further comprises a second upper battery tray that is releasably fixedly engaged to and supported by said first side wall and said second side wall; and (b) structure is present for releaseably clamping a plurality of batteries to said second upper battery tray.

17. The first battery mounting assembly of claim 16, wherein:

(a) said first battery mounting assembly further comprises a first debris shield mounted to said first battery mounting assembly;

(b) said first debris shield comprises a first sheet barrier that is disposed substantially parallel to a portion of said outer walls of said first battery mounting assembly that defines said ventilation intake opening;

(c) said first sheet barrier is of such a shape and is positioned such that a large percentage of said intake ventilation opening is aligned with some portion of said first sheet barrier in directions perpendicular to said portion of said outer walls that defines said ventilation intake opening;

(d) said first sheet barrier extends downwardly from a portion of said first sheet barrier that is disposed adjacent to said ventilation intake opening to a first sheet barrier lower edge;

(e) said first sheet barrier is constructed and positioned such that a distance from said portion of said first sheet barrier that is disposed adjacent said ventilation intake opening to said first sheet barrier lower edge is considerably greater than a distance in directions perpendicular to said first sheet barrier between said portion of said outer wall that defines said ventilation intake opening and said first sheet barrier;

(f) said first debris shield further comprises a first sheet barrier mounting wall;

(g) said first sheet barrier mounting wall is engaged to said first sheet barrier around a periphery of said first sheet barrier;

(h) said first sheet barrier mounting wall extends from said periphery of said first sheet barrier in directions toward said portion of said outer wall that defines said ventilation intake opening;

(i) a portion of said first sheet barrier mounting wall opposite a portion that is engaged to said periphery of said first sheet barrier is engaged to said portion of said outer wall that defines said ventilation intake opening;

(j) said first sheet barrier mounting wall is constructed and engaged to said first battery mounting assembly in a manner such that said first sheet barrier mounting wall extends in an unbroken manner between said portion of said outer wall that defines said ventilation intake opening and every portion of said periphery of said first sheet barrier with the exception of a portion of said periphery of said first sheet barrier that is disposed adjacent said first sheet barrier lower edge;

(k) said first battery mounting assembly further comprises a second debris shield mounted to said first battery mounting assembly;

(l) said second debris shield comprises a second sheet barrier that is disposed substantially parallel to a portion of said outer walls of said first battery mounting assembly that defines said ventilation exhaust opening;

(m) said second sheet barrier is of such a shape and is positioned such that a large percentage of said exhaust ventilation opening is aligned with some portion of said second sheet barrier in directions perpendicular to said portion of said outer walls that defines said ventilation exhaust opening;

(n) said second sheet barrier extends downwardly from a portion of said second sheet barrier that is disposed adjacent to said ventilation exhaust opening to a second sheet barrier lower edge;

(o) said second sheet barrier is constructed and positioned such that a distance from said portion of said second sheet barrier that is disposed adjacent said ventilation exhaust opening to said second sheet barrier lower edge is considerably greater than a distance in directions perpendicular to said second sheet barrier between said portion of said outer wall that defines said ventilation exhaust opening and said second sheet barrier;

(p) said second debris shield further comprises a second sheet barrier mounting wall;

(q) said second sheet barrier mounting wall is engaged to said second sheet barrier around a periphery of said second sheet barrier;

(r) said second sheet barrier mounting wall extends from said periphery of said second sheet barrier in directions toward said portion of said outer wall that defines said ventilation exhaust opening;

(s) a portion of said second sheet barrier mounting wall opposite a portion that is engaged to said periphery of said second sheet barrier is engaged to said portion of said outer wall that defines said ventilation exhaust opening; and (t) said second sheet barrier mounting wall is constructed and engaged to said first battery mounting assembly in a manner such that said second sheet barrier mounting wall extends in an unbroken manner between said portion of said outer wall that defines said ventilation exhaust opening and every portion of said periphery of said second sheet barrier with the exception of a portion of said periphery of said second sheet barrier that is disposed adjacent said second sheet barrier lower edge.

18. The first battery mounting assembly of claim 17, wherein:

(a) one or more components of said first battery mounting assembly are made of steel;

(a) one or more of said components of said first battery mounting assembly that are made of steel are coated with an elastomer with high electrical resistance.

19. A first battery mounting assembly for mounting batteries to a vehicle that has a centroid and structural components and to which vehicle a second battery mounting assembly may be mounted by one or more second battery assembly hanger, comprising:

(a) battery assembly mounting components engaged to the structural components of the vehicle;

(b) breakaway components that are engaged to said battery assembly mounting components;

(c) wherein said breakaway components comprise a first lower battery tray that is engaged directly or indirectly to and supported by said battery assembly mounting components;

(d) wherein said breakaway components further comprise any components of said first battery mounting assembly necessary to secure the batteries that are to be disposed upon said firs lower battery tray, to said first lower battery tray;

(e) wherein said breakaway components and said battery assembly mounting components are constructed and engaged to one another and the structural components of the vehicle in a manner such that, when said first battery mounting assembly is subjected to relatively large forces in certain directions, such as would occur when the vehicle is involved in a traffic accident, certain components of said battery assembly mounting components deform and/or fracture in a predetermined manner and/or certain engagements of said breakaway components, said battery assembly mounting components, and the structural components of the vehicle to one another allow relative motion to occur between one another in a predetermined manner such that said breakaway components move in predetermined manners relative to the vehicle and energy is absorbed and dissipated by said first battery mounting assembly as said breakaway components move relative to the vehicle;

(f) wherein said breakaway components are constructed and engaged to one another in a relatively rigid manner such that, if said first components mounting assembly is subjected to relatively large forces that cause said breakaway components to move in predetermined manners relative to the vehicle, said breakaway components are prevented from moving relative to one another in all but relatively extreme traffic accidents;

(g) wherein said breakaway components and said battery assembly mounting components are constructed and engaged to one another and the structural components of the vehicle in a relatively strong manner such that, even when some components of said firs battery mounting assembly deform and/or fracture, as a result of said first battery mounting assembly being subjected to relatively large forces and/or accelerations in certain directions, said first battery mounting assembly remains to be supported by the vehicle during and after all but relatively extreme traffic accidents;

(h) wherein said battery assembly mounting components of said first battery assembly mounting comprise one or more main support members;

(i) wherein said battery assembly mounting components comprise first battery assembly hangers that are engaged to said one or more main support members in a relatively rigid manner;

(j) wherein each of said first battery assembly hangers are engaged to the structural components of the vehicle by a main support bolt and one or more anti-rotation bolts;

(k) wherein each anti-rotation bolt is engaged to a first battery assembly hanger at a point distant from an axis of a shank of a main support bolt that is engaged to a same first battery assembly hanger as said anti-rotation bolt;

(l) wherein each main support bolt, each first battery assembly hanger, and the structural components of the vehicle are constructed with a strength such that engagement of each first battery assembly hanger to the structural components of the vehicle could be maintained by engagement of said each first battery assembly hanger to the structural components of the vehicle by said main support bolt alone;

(m) wherein each main support bolt, each first battery assembly hanger, and the structural components of the vehicle are constructed with a strength such that, even if said first battery mounting assembly were subjected to relatively large forces and/or accelerations as a result of the vehicle being involved in a traffic accident, engagement of each first battery assembly hanger to the structural components of the vehicle could be maintained by engagement of said each battery assembly hanger to the structural components of the vehicle by said main support bolt alone; and (n) wherein said anti-rotation bolts are of a relatively weak construction as compared to said main support bolts.

20. The first battery mounting assembly of claim 19, wherein:

(a) said first battery mounting assembly further comprises one or more bumper components;

(b) each of said one or more bumper components is engaged to one of said main support members and/or one of said first battery assembly hangers;

(c) each of said bumper components is positioned at a point of said first battery mounting assembly such that, when said first battery mounting assembly is properly mounted to said vehicle and the batteries are mounted to the battery mounting assembly, each of said bumper components is disposed farther from the centroid of the vehicle than one or more of the batteries that are mounted to said first battery mounting assembly;

(d) each of said bumper components are positioned at a relative height similar to that at which the batteries are to be mounted to said first battery mounting assembly;

(e) said one or more bumper components and said one or more main support members and/or first battery assembly hangers that said bumper components are engaged to are of a relatively strong construction such that, when said first battery mounting assembly is properly mounted to the vehicle and the batteries are mounted to the first battery mounting assembly, said bumper components can be subjected to relatively large forces in directions that would tend to drive said bumper components toward the batteries without said bumper components being driven into the batteries.

21. The first battery mounting assembly of claim 20, wherein:

(a) one or more of said first battery assembly hangers are constructed to be relatively rigidly engaged to one or more of the second battery assembly hangers when said first battery mounting assembly is mounted to the vehicle.

22. The first battery mounting assembly of claim 21, wherein:

(a) said breakaway components further comprise a first lower battery tray, upon which a plurality of the batteries that are to be mounted to the vehicle are supported when the batteries are mounted to the vehicle, engaged to and supported by said one or more main support members;

(b) said breakaway components further comprise one or more upper tray support components directly or indirectly engaged to and supported by said one or more main support members and/or said first lower battery tray;

(c) said breakaway components further comprise a first upper battery tray, upon which a plurality of the batteries that are to be mounted to the vehicle are supported when the batteries are mounted to the vehicle;

(d) said first upper battery tray is engaged to and supported by said one or more upper tray support components; and (e) at least a portion of said first upper battery tray is disposed directly vertically above said first lower battery tray at a distance above said first lower battery tray such that one or more of the batteries that are to be mounted to the vehicle may be supported upon said first lower battery tray below said first upper battery tray and there would be space between any of the batteries, if they were supported on said first lower battery tray, and a lower surface of said first upper battery tray.

23. The first battery mounting assembly of claim 22, wherein:

(a) said first upper battery tray is releaseably fixedly engaged to said upper tray support components;

(b) said breakaway components further comprise one or more clamping devices for releaseably clamping a plurality of the batteries to said first upper battery tray;

(b) said fixed engagement of said first upper battery tray to said upper tray support components is of such a construction that it may be readily released, and the first upper battery tray separated from the first battery mounting assembly whether or not there are batteries clamped to the first upper battery tray; and (c) said clamping devices are constructed such that whether said first upper battery tray is releaseably fixedly engaged to said upper tray support components or said first upper battery tray has been separated from said upper tray support components, when the batteries are clamped to said first upper battery tray said one or more clamping devices that clamp the plurality of the batteries to said first upper battery tray may be readily released and the batteries may be removed from said first upper battery tray one at a time.

24. The first battery mounting assembly of claim 23, wherein:

(a) said upper tray support components are comprised of a first side wall;

(b) said first side wall is fixedly engaged to said first lower battery tray and/or one or more of said one or more main support members;

(c) said first side wall extends substantially vertically above said first lower battery tray;

(d) said upper tray support components are comprised of a second side wall;

(e) said second side wall is fixedly engaged to said first lower battery tray and/or one or more of said one or more main support members;

(f) said second side wall extends substantially vertically above said first lower battery tray;

(g) said first upper battery tray is engaged directly or indirectly to and is supported by said first side wall and said second side wall;

(h) said first side wall and said second side wall are positioned relative to one another such that a lower battery space is defined horizontally between said first side wall and said second side wall and vertically above at least a portion of said first lower battery tray;

(i) said first upper battery tray is disposed such that a majority of a battery support surface of said first upper battery tray is disposed horizontally between said first side wall and said second side wall;

(j) said breakaway components further comprise a first end wall and a second end wall;

(k) said first end wall is directly or indirectly fixedly engaged to said first lower battery tray and/or one or more of said one or more main support members and extends vertically above said first lower battery tray;

(l) said second end wall is directly or indirectly fixedly engaged to said first lower battery tray and/or one or more of said one or more main support members and extends vertically above said first lower battery tray;

(m) said first end wall and said second end wall are each substantially planar and are disposed such that they are substantially parallel to one another and perpendicular to said first side wall and said second side wall; and (n) said first end wall and said second end wall are each fixedly engaged to said side walls at outer end portions of said side walls.

25. The first battery mounting assembly of claim 24, wherein:

(a) one or more of said first battery assembly hangers defines a support member recess; and (b) a portion of one or more of said one or more main support members of said first battery mounting assembly protrudes into a support recess defined by a battery assembly hanger.

26. The first battery mounting assembly of claim 25, wherein:

(a) said first side wall comprises a plurality of first side wall vertical tabs that are fixedly engaged to said first side wall and extend vertically from said first side wall to a point above said battery support surface of said first upper battery tray;

(b) said first side wall vertical tabs are spaced relative to one another such that first side wall tray locating slots are defined between respective ones of said first side wall vertical tabs;

(c) said first side wall and said first side wall vertical tabs are constructed and positioned relative to one another such that each of said first side wall tray locating slots, extends upwardly from a lower end, to an upper end which is an opening between upper ends of adjacent first side wall vertical tabs;

(d) said second side wall comprises a plurality of second side wall vertical tabs that are fixedly engaged to said second side wall and extend vertically from said second side wall to a point above said battery support surface of said first upper battery tray;

(e) said second side wall vertical tabs are spaced relative to one another such that second side wall tray locating slots are defined between respective ones of said second side wall vertical tabs;

(f) said second side wall and said second side wall vertical tabs are constructed and positioned relative to one another such that each of said second side wall tray locating slots, extends upwardly from a lower end, to an upper end which is an opening between upper ends of adjacent second side wall vertical tabs;

(g) said first upper battery tray comprises a plurality of tray locating members;

(h) each respective tray locating member has a tray engagement end and a terminal end; and (i) each of said tray locating members is fixedly engaged to said first upper battery tray and protrudes horizontally through a respective one of said first side wall tray locating slots or a respective one of said second side wall tray locating slots such that either said first side wall or said second side wall is disposed horizontally between a tray engagement end and a terminal end of each tray locating member.

27. The first battery mounting assembly of claim 26, wherein:

(a) said breakaway components further comprise outer walls, and a lid;

(b) said outer walls are fixedly engaged to said first battery mounting assembly and extend vertically above said first lower battery tray;

(c) said outer walls are disposed relative to one another such that said upper tray support components are disposed horizontally between said outer walls;

(d) said lid is engaged to said first battery mounting assembly in a releasable manner;

(e) a lid top portion of said lid is disposed directly vertically above said first lower battery tray and said first upper battery tray at a height that allows for space between the batteries that are to be disposed upon said first upper battery tray and said lid top portion when the batteries are disposed upon said first upper battery tray;

(f) an outer shell of said first battery mounting assembly comprises said outer walls, said lid, and said first lower battery tray;

(g) said outer walls, said lid, and said first lower battery tray are constructed and engaged to said first battery mounting assembly such that said first side wall, said second side wall, said first upper battery tray, and the batteries that are to be mounted to said first battery mounting assembly are substantially surrounded in all directions horizontally and vertically by said outer shell of said first battery mounting assembly when the batteries are mounted to said first battery mounting assembly.

28. A first battery mounting assembly for mounting batteries to a vehicle that has a centroid and structural components and to which vehicle a second battery mounting assembly may be mounted by one or more second battery assembly hangers, comprising:

(a) one or more first battery assembly hangers engaged to and supported by some of the structural components of the vehicle;

(b) one or more main support members engaged to and supported by said one or more first battery assembly hangers;

(c) a first lower battery tray, upon which a plurality of the batteries that are to be mounted to the vehicle are supported when the batteries are mounted to the vehicle, engaged to and supported by said one or more main support members;

(d) one or more bumper components;

(e) wherein each of said one or more bumper components is engaged to one of said main support members and/or one of said first battery assembly hangers;

(f) wherein each of said bumper components is positioned at a point of said first battery mounting assembly such that, when said first battery mounting assembly is properly mounted to the vehicle and the batteries are mounted to said first battery mounting assembly, each of said one or more bumper components is positioned farther from the centroid of the vehicle than one or more of the batteries that are mounted to said first battery mounting assembly;

(g) wherein each of said bumper components are positioned at a relative height similar to that at which some of the batteries are to be mounted to said first battery mounting assembly;

(j) wherein said one or more bumper components and said one or more main support members and/or first battery assembly hangers that said bumper components are engaged to are of a relatively strong construction such that, when said first battery mounting assembly is properly mounted to the vehicle and the batteries are mounted to said first battery mounting assembly, said bumper components can be subjected to relatively large forces in directions that would tend to drive said bumper components toward the batteries without said bumper components impacting the batteries.

29. The first battery mounting assembly of claim 28, wherein:

(a) one or more of said first battery assembly hangers are constructed to be relatively rigidly engaged to one or more of the second battery assembly hangers when said first battery mounting assembly is mounted to the vehicle.

30. The first battery mounting assembly of claim 29, wherein:

(a) said first battery mounting assembly further comprises one or more upper tray support components directly or indirectly engaged to and supported by said one or more main support members and/or said first lower battery tray;

(b) said first battery mounting assembly further comprises a first upper battery tray, upon which a plurality of the batteries that are to be mounted to the vehicle are supported when the batteries are mounted to the vehicle;

(c) wherein said first upper battery tray is engaged to and supported by said one or more upper tray support components; and (d) at least a portion of said first upper battery tray is disposed directly vertically above said first lower battery tray at a distance above said first lower battery tray such that one or more of the batteries that are to be mounted to the vehicle may be supported upon said first lower battery tray below said first upper battery tray and there would be space between any of the batteries, if they were supported on said first lower battery tray, and a lower surface of said first upper battery tray.

31. The first battery mounting assembly of claim 30, wherein:

(c) said first upper battery tray is releaseably fixedly engaged to said upper tray support components;

(d) said first battery mounting assembly further comprises one or more clamping devices for releaseably clamping a plurality of the batteries to said first upper battery tray;

(e) said fixed engagement of said first upper battery tray to said upper tray support components is of such a construction that it may be readily released, and the first upper battery tray separated from the first battery mounting assembly whether or not there are batteries clamped to the first upper battery tray; and (f) said clamping devices are constructed such that whether said first upper battery tray is releaseably fixedly engaged to said upper tray support components or said first upper battery tray has been separated from said upper tray support components, when the batteries are clamped to said first upper battery tray said one or more clamping devices that clamp the plurality of the batteries to said first upper battery tray may be readily released and the batteries may be removed from said first upper battery tray one at a time.

32. The first battery mounting assembly of claim 31, wherein:

(a) said upper tray support components are comprised of a first side wall;

(b) said first side wall is fixedly engaged to said first lower battery tray and/or one or more of said one or more main support members;

(c) said first side wall extends substantially vertically above said first lower battery tray;

(d) said upper tray support components are comprised of a second side wall;

(e) said second side wall is fixedly engaged to said first lower battery tray and/or one or more of said one or more main support members;

(f) said second side wall extends substantially vertically above said first lower battery tray;

(g) said first upper battery tray is engaged directly or indirectly to and is supported by said first side wall and said second side wall;

(h) said first side wall and said second side wall are positioned relative to one another such that a lower battery space is defined horizontally between said first side wall and said second side wall and vertically above at least a portion of said first lower battery tray;

(i) said first upper battery tray is disposed such that a majority of a battery support surface of said first upper battery tray is disposed horizontally between said first side wall and said second side wall;

(j) said first battery mounting assembly is further composed of a first end wall and a second end wall;

(k) said first end wall is directly or indirectly fixedly engaged to said first lower battery tray and/or one or more of said one or more main support members and extends vertically above said first lower battery tray;

(l) said second end wall is directly or indirectly fixedly engaged to said first lower battery tray and/or one or more of said one or more main support members and extends vertically above said first lower battery tray;

(m) said first end wall and said second end wall are each substantially planar and are disposed such that they are substantially parallel to one another and perpendicular to said first side wall and said second side wall; and (n) said first end wall and said second end wall are each fixedly engaged to said side walls at outer end portions of said side walls.

33. A vehicle, comprising:

(a) structural components, upon which a large percentage of components of said vehicle depend for support in a direct or indirect manner;

(b) wherein said structural components comprise a frame;
(c) a body, within which individuals and/or objects may be disposed and be isolated from undesirable elements of an environment outside said body;
(d) wherein said body is engaged to and supported by said frame;
(e) a suspension system for supporting said vehicle;
(f) wherein said frame is engaged to and supported by said suspension system;
(g) a first battery mounting assembly engaged to said vehicle;
(h) wherein said first battery mounting assembly comprises one or more main support members engaged directly or indirectly to and supported by some of said structural components of said vehicle;
(i) wherein said first battery mounting assembly further comprises a first lower battery tray, upon which a plurality of batteries are supported, engaged directly or indirectly to and supported by said one or more main support members;
(j) wherein said first battery mounting assembly further comprises one or more upper tray support components directly or indirectly engaged to and supported by one or more of said one or more main support members and/or said first lower battery tray;
(k) wherein said first battery mounting assembly further comprises a first upper battery tray, upon which a plurality of batteries are supported, engaged to and supported by said one or more upper tray support components; and
(l) wherein at least a portion of said first upper battery tray is disposed directly vertically above said first lower battery tray at a distance above said first lower battery tray such that there is space between said one or more batteries that are supported upon said first lower battery tray and a lower surface of said first upper battery tray; and
(m) wherein said upper tray support components, which do not include any of the batteries that are to be mounted to said first battery mounting assembly, extend vertically from said one or more main support members and/or said first lower battery tray and are engaged directly to said first upper battery tray in such a manner that said first upper battery tray is supported in a same spaced relationship above said first lower battery tray whether or not any of the batteries are disposed on the first lower battery tray or the first upper battery tray.

34. The vehicle of claim 33, wherein:
(a) said first upper battery tray is releaseably fixedly engaged to said upper tray support components;
(b) said first battery mounting assembly further comprises one or more clamping devices that releaseably clamp a plurality of said batteries to said first upper battery tray;
(c) said fixed engagement of said first upper battery tray to said upper tray support components is of such a construction that they may be released and said first upper battery tray, with said batteries clamped to it may be separated as a unit from said first battery mounting assembly; and
(d) said clamping devices that clamp said batteries to said first upper battery tray are of a construction such that, whether said first upper battery tray is releaseably fixedly engaged to said upper tray support components or said first upper battery tray has been separated from said upper tray support components said one or more clamping devices that clamp said batteries to said first upper battery tray may be released and the batteries may be removed from said first upper battery tray one at a time.

35. The vehicle of claim 34, wherein:
(a) said upper tray support components comprise a first side wall;
(b) said first side wall is fixedly engaged to said first lower battery tray and/or one or more of said one or more main support members;
(c) said first side wall extends substantially vertically above said first lower battery tray;
(d) said upper tray support components comprise a second side wall;
(e) said second side wall is fixedly engaged to said first lower battery tray and/or one or more of said one or more main support members;
(f) said second side wall extends substantially vertically above said first lower battery tray;
(g) said first upper battery tray is engaged directly or indirectly to and is supported by said first side wall and said second side wall;
(h) said first side wall and said second side wall are positioned relative to one another such that a lower battery space is defined horizontally between said first side wall and said second side wall and vertically above at least a portion of said first lower battery tray;
(i) said first upper battery tray is disposed such that a majority of a battery support surface of said first upper battery tray is disposed horizontally between said first side wall and said second side wall;
(j) said first battery mounting assembly is further comprised of a first end wall and a second end wall;
(k) said first end wall is directly or indirectly fixedly engaged to said first lower battery tray and/or one or more of said one or more main support members and extends vertically above said first lower battery tray;
(l) said second end wall is directly or indirectly fixedly engaged to said first lower battery tray and/or one or more of said one or more main support members and extends vertically above said first lower battery tray;
(m) said first end wall and said second end wall are each substantially planar and are disposed such that they are substantially parallel to one another and perpendicular to said first side wall and said second side wall; and
(n) said first end wall and said second end wall are each fixedly engaged to said side walls at outer end portions of said side walls.

36. The vehicle of claim 35, wherein:
(a) said first side wall comprises a plurality of first side wall vertical tabs that are fixedly engaged to said first side wall and extend vertically from said first side wall to a point above said battery support surface of said first upper battery tray;
(b) said first side wall vertical tabs are spaced relative to one another such that first side wall tray locating slots are defined between respective ones of said first side wall vertical tabs;
(c) said first side wall and said first side wall vertical tabs are constructed and positioned relative to one another such that each of said first side wall tray locating slots, extends upwardly from a lower end, to an upper end which is an opening between upper ends of adjacent first side wall vertical tabs;
(d) said second side wall comprises a plurality of second side wall vertical tabs that are fixedly engaged to said second side wall and extend vertically from said second side wall to a point above said battery support surface of said first upper battery tray;
(e) said second side wall vertical tabs are spaced relative to one another such that second side wall tray locating slots are defined between respective ones of said second side wall vertical tabs;
(f) said second side wall and said second side wall vertical tabs are constructed and positioned relative to one another such that each of said second side wall tray locating slots, extends upwardly from a lower end, to an upper end which is an opening between upper ends of adjacent second side wall vertical tabs;
(g) said first upper battery tray comprises a plurality of tray locating members;
(h) each respective tray locating member has a tray engagement end and a terminal end; and
(i) each of said tray locating members is fixedly engaged to said first upper battery tray and protrudes horizontally through a respective one of said first side wall tray locating slots or a respective one of said second side wall tray locating slots such that either said first side wall or said second side wall is disposed horizontally between a tray engagement end and a terminal end of each tray locating member.

37. The vehicle of claim 36, wherein:
(a) said first battery mounting assembly further comprises outer walls, and a lid;
(b) said outer walls are fixedly engaged to said first battery mounting assembly and extend vertically above said first lower battery tray;
(c) said outer walls are disposed relative to one another such that said upper tray support components are disposed horizontally between said outer walls;
(d) said lid is engaged to said first battery mounting assembly in a releasable manner;
(e) a lid top portion of said lid is disposed directly vertically above said first lower battery tray and said first upper battery tray at a height such that space is present between said batteries supported upon said first upper battery tray and said lid top portion;
(f) an outer shell of said first battery mounting assembly comprises said outer walls, said lid, and said first lower battery tray;
(g) said outer walls, said lid, and said first lower battery tray are constructed and engaged to said first battery mounting assembly such that said first side wall, said second side wall, said first upper battery tray, and said batteries that are mounted to said first battery mounting assembly are substantially surrounded in all directions horizontally and vertically by said outer shell of said first battery mounting assembly.

38. The vehicle of claim 37, wherein:
(a) said first battery mounting assembly comprises breakaway components and battery assembly mounting components;
(b) said breakaway components comprise said first lower battery tray, said first side wall, said second side wall, said first upper battery tray, and said batteries that are mounted to said first battery mounting assembly;
(c) said battery assembly mounting components comprise said one or more main support members and any components of said first battery mounting assembly engaged between said one or more main support members and said structural components of said vehicle;
(d) said breakaway components and said battery assembly mounting components are constructed and engaged to one another and said structural components of said vehicle in a manner such that, when said first battery mounting assembly is subjected to relatively large forces in certain directions, such as would occur when said vehicle is involved in a traffic accident, certain components of said battery assembly mounting components deform and/or fracture in predetermined manners and/or certain engagements of said breakaway components, said battery assembly mounting components, and said structural components of said vehicle to one another allow relative motion to occur between one another in predetermined manners such that said breakaway components move in predetermined manners relative to said vehicle and energy is absorbed and dissipated by said first battery mounting assembly as said breakaway components move relative to said vehicle;
(e) said breakaway components are constructed and engaged to one another in a relatively rigid manner such that, if said first battery mounting assembly is subjected to relatively large forces that cause said breakaway components to move in predetermined manners relative to said vehicle, said breakaway components are prevented from moving relative to one another in all but relatively extreme traffic accidents; and
(f) said breakaway components and said battery assembly mounting components are constructed and engaged to one another and said structural components of said vehicle in a relatively strong manner such that even when some components of said first battery mounting assembly deform and/or fracture, as a result of said first battery mounting assembly being subjected to relatively large forces and/or accelerations in certain directions, said first battery mounting assembly remains to be supported by said vehicle during and after all but relatively extreme traffic accidents.

39. The vehicle of claim 38, wherein:
(a) said battery assembly mounting components comprise first battery assembly hangers that are engaged to said one or more main support members in a relatively rigid manner;
(b) each of said first battery assembly hangers are engaged to said structural components of said vehicle by a main support bolt and one or more anti-rotation bolts;
(c) each anti-rotation bolt is engaged to a first battery assembly hanger at a point distant from an axis of a shank of a main support bolt that is engaged to a same first battery assembly hanger as said each anti-rotation bolt;
(d) each main support bolt, each first battery assembly hanger, and said structural components of said vehicle are constructed with a strength such that engagement of each battery assembly hanger to said structural components of said vehicle could be maintained by engagement of said first battery assembly hanger to said structural components of said vehicle by said main support bolt alone;
(e) each main support bolt, each first battery assembly hanger, and said structural components of said vehicle are constructed with a strength such that, even if said first battery mounting assembly were subjected to relatively large forces and/or accelerations as a result of said vehicle being involved in a traffic accident, engagement of each first battery assembly hanger to said structural components of said vehicle would be maintained by engagement of said each first battery assembly hanger to said structural components of said vehicle by said main support bolt alone;

(f) said anti-rotation bolts are of a relatively weak construction as compared to said main support bolts.

40. The vehicle of claim 39, wherein:

(a) said vehicle comprises a second battery mounting assembly;

(b) said second battery mounting assembly is engaged to and supported by one or more second battery assembly hangers;

(c) each of said one or more second battery assembly hangers is fixedly engaged to and supported by said structural components of said vehicle (d) one or more of said first battery assembly hangers are relatively rigidly engaged to one or more of said second battery assembly hangers.

41. The vehicle of claim 33, wherein:

(a) said first battery mounting assembly further comprises one or more bumper components;

(b) each of said one or more bumper components is engaged to one of said main support members and/or one of said first battery assembly hangers;

(c) each of said bumper components is positioned at a point farther from a centroid of said vehicle than one or more of said batteries that are mounted to said first battery mounting assembly;

(d) each of said bumper components are positioned at a relative height similar to that of some of said batteries that are mounted to said first battery mounting assembly;

(e) said one or more bumper components and said one or more main support members and/or first battery assembly hangers that said bumper components are engaged to are of a relatively strong construction such that said bumper components can be subjected to relatively large forces in directions that would tend to drive said bumper components toward said batteries that are mounted to said first battery mounting assembly without said bumper components being driven into said batteries of said first battery mounting assembly.

42. The vehicle of claim 41, wherein:

(a) said first side wall is substantially planar;

(b) said second side wall is substantially planar;

(c) said first side wall and said second side wall are disposed substantially parallel to one another;

(d) said first side wall and said second side wall are positioned relative to one another such that said batteries that are supported upon said first lower battery tray are positioned upon said first lower battery tray such that any spaces between each battery and an adjacent battery or said first side wall or said second side wall are relatively small in directions perpendicular to said first side wall and said second side wall;

(e) each of said first side wall vertical tabs is substantially planar and is located approximately in a first vertical tab plane as is every other first side wall vertical tab;

(f) each of said second side wall vertical tabs is substantially planar and is located approximately in a second vertical tab plane as is every other second side wall vertical tab;

(g) said first side wall vertical tabs and said second side wall vertical tabs are disposed such that said first vertical tab plane is disposed substantially parallel to said second vertical tab plane; and (h) said first side wall vertical tabs and said second side wall vertical tabs are positioned relative to one another such that said batteries that are supported upon said first upper battery tray are positioned upon said first upper battery such that any spaces between each battery and an adjacent battery or said first side wall vertical tabs or said second side wall vertical tabs are relatively small in directions perpendicular to said first vertical tab plane and said second vertical tab plane.

43. The vehicle of claim 42, wherein:

(a) said first lower battery tray defines one or more lower tray ribs that extend vertically above a battery support surface of said first lower battery tray;

(b) each of said lower tray ribs has a longitudinal rib axis that extends in directions parallel to said first side wall and said second side wall;

(c) each lower tray rib is positioned such that any distance, in a direction perpendicular to said first side wall and said second side wall, between a lower tray rib and an adjacent lower tray rib or side wall is just slightly greater than a battery width of batteries that are disposed upon said first lower battery tray between said lower tray rib and said adjacent lower tray rib or side wall;

(d) said first upper battery tray defines one or more upper tray ribs that extend vertically above a battery support surface of said first upper battery tray;

(e) each of said upper tray ribs has a longitudinal rib axis;

(f) one or more of said upper tray ribs are positioned such that their longitudinal rib axes are disposed substantially parallel to said first vertical tab plane and said second vertical tab plane;

(g) one or more of said upper tray ribs are positioned such that their longitudinal rib axes are disposed substantially perpendicular to said first vertical tab plane and said second vertical tab plane;

(h) each upper tray rib is positioned such that any distance, in a direction perpendicular to said longitudinal rib axis of said upper tray rib, between an upper tray rib and an adjacent upper tray rib or vertical tab is just slightly greater than a battery width of batteries that are disposed upon said first upper battery tray between said upper tray rib and said adjacent upper tray rib or vertical tab; and (i) said first battery mounting assembly is constructed such that each of said first side wall tray locating slots and each of said second side wall tray locating slots is of a width narrower than any battery widths of any of said batteries that are supported upon said first upper battery tray.

44. The vehicle of claim 43, wherein:

(a) one or more of said first battery assembly hangers defines a support member recess; and (b) a portion of one or more of said one or more main support members of said first battery mounting assembly protrudes into a support recess defined by a battery assembly hanger.

45. The vehicle of claim 44, wherein:

(a) said first battery mounting assembly is further comprised of at least two inertial trigger electrical disconnects mounted to said first battery mounting assembly;

(b) a positive inertial trigger electrical disconnect is electrically connected to positive voltage terminals of one or more of said batteries that are mounted to said first battery mounting assembly and said positive inertial trigger electrical disconnect is also electrically connected to an electrical system of said vehicle;

(c) said positive inertial trigger electrical disconnect is constructed such that during normal vehicle operation, said positive inertial trigger electrical disconnect operates in closed operational state and acts as part of an electrical connection between one or more of said positive voltage battery terminals and said electrical system of said vehicle;

(d) said positive inertial trigger electrical disconnect is constructed such that, when said first battery mounting assembly is subjected to relatively large accelerations greater than those that said first battery mounting assembly would be subjected to during normal vehicle operation and thus said positive inertial trigger disconnect is subjected to similar relatively large accelerations, said operational state of said positive inertial trigger electrical disconnect changes from closed to open and said electrical connection between said one or more positive voltage terminals of said batteries and said electrical system of said vehicle is interrupted;

(e) a negative inertial trigger electrical disconnect is electrically connected to one or more negative voltage terminals of said batteries that are mounted to said first battery mounting assembly and said negative inertial trigger electrical disconnect is also electrically connected to said electrical system of said vehicle;

(f) said negative inertial trigger electrical disconnect is constructed such that during normal vehicle operation, said negative inertial trigger electrical disconnect operates in a closed operational state and acts as part of an electrical connection between one or more of said negative voltage battery terminals of said batteries and said electrical system of said vehicle; and (g) said negative inertial trigger electrical disconnect is constructed such that, when said first battery mounting assembly is subjected to relatively large accelerations greater than those that said first battery mounting assembly would be subjected to during normal vehicle operation and thus said negative inertial trigger disconnect is subjected to similar relatively large accelerations, said operational state of said negative inertial trigger disconnect changes from closed to open and said electrical connection between said one or more negative voltage terminals of said batteries and said electrical system of said vehicle is interrupted.

46. The vehicle of claim 45, wherein:

(a) a first lower row of batteries is disposed upon said first lower battery tray on one side of and adjacent to a lower tray rib that is defined by said first lower battery tray;

(b) said lower tray rib that said first lower row of batteries is disposed on one side of is positioned such that a longitudinal rib axis of said lower tray rib is disposed substantially parallel to said first side wall and said second side wall;

(c) a second lower row of batteries is disposed adjacent to said lower tray rib that said first lower row of batteries is disposed adjacent, and said second lower row of batteries is disposed on a side of said lower tray rib opposite a side of said lower tray rib upon which said first lower row of batteries is disposed;

(d) said first battery mounting assembly further comprises one or more lower tray clamping devices which clamp said batteries of said first lower row of batteries and said batteries of said second lower row of batteries to said first lower battery tray;

(e) each of said lower tray clamping devices comprises a clamp plate, a clamp bolt and a clamp nut;

(f) a clamp plate lower surface of said clamp plate of each of said lower tray clamping devices abuts a horizontal upper surface of one or more of said batteries in said first lower row and a horizontal upper surface of one or more of said batteries in said second lower row;

(g) said clamp bolt of each of said lower tray clamping devices protrudes through said clamp plate of each of said lower tray clamping devices and through said lower tray rib that said first lower row of batteries and said second lower row of batteries are disposed upon opposite sides of;

(h) either a bolt head of said clamp bolt or said clamp nut of each of said lower tray clamping devices is disposed on an upper side of said clamp plate of each of said lower tray clamping devices;

(i) whichever of said clamp nut and said bolt head of each of said lower tray clamping devices is not disposed on said upper side of said clamp plate of each of said lower tray clamping devices is disposed on a lower side of said lower tray rib that said first lower row of batteries and said second lower row of batteries are disposed upon opposite sides of;

(j) an end of each of said clamp bolts of said lower tray clamping devices opposite said bolt head is threadedly engaged to said clamp nut of each of said lower tray clamping devices;

(k) each of said clamp plates of said lower tray clamping devices applies a downward clamping force to, and thus clamps against said battery support surface of said lower battery tray, one or more of said batteries of said first lower row of batteries and one or more of said batteries of said second lower row of batteries;

(l) a first upper row of batteries is disposed upon said first upper battery tray on one side of and adjacent to a plurality of upper tray ribs that are defined by said first upper battery tray, and said plurality of upper tray ribs are positioned in line with one another and parallel to said first vertical tab plane and said second vertical tab plane;

(m) a second upper row of batteries is disposed adjacent to said plurality of upper tray ribs that said first upper row of batteries is disposed adjacent, and said second upper row of batteries is disposed on a side of said plurality of upper tray ribs opposite said side of said plurality of upper tray ribs upon which said first upper row of batteries is disposed;

(n) said clamping devices that clamp said batteries to said first upper battery tray, comprise one or more upper tray clamping devices that clamp said batteries of said first upper row of batteries and said batteries of said second upper row of batteries to said first upper battery tray;

(o) each of said upper tray clamping devices comprises a clamp plate, a clamp bolt and a clamp nut;

(p) a clamp plate lower surface of said clamp plate of each of said upper tray clamping devices abuts a horizontal upper surface of one or more of said batteries in said first upper row of batteries and a horizontal upper surface of one or more of said batteries in said second upper row of batteries;

(q) said clamp bolt of each of said upper tray clamping devices protrudes through said clamp plate of each of said upper tray clamping devices and through one of said plurality of upper tray ribs that said first upper row of batteries and said second upper row of batteries are disposed upon opposite sides of;

(r) either a bolt head of said clamp bolt or said clamp nut of each of said upper tray clamping devices is disposed on an upper side of said clamp plate of each of said upper tray clamping devices;

(s) whichever of said clamp nut and said bolt head of each of said upper tray clamping devices is not disposed on said upper side of said clamp plate of each of said upper tray clamping devices is disposed on a lower side of one of said plurality of upper tray ribs that said first upper row of batteries and said second upper row of batteries are disposed upon opposite sides of;

(t) an end of each of said clamp bolts of said upper tray clamping devices opposite said bolt head is threadedly engaged to said clamp nut of each of said upper tray clamping devices; and (u) each of said clamp plates of said upper tray clamping devices applies a downward clamping force to, and thus clamps against said battery support surface of said first upper battery tray, one or more of said batteries of said first upper row of batteries and one or more of said batteries of said second upper row of batteries.

47. The vehicle of claim 46, wherein:

(a) said first battery mounting assembly further comprises a ventilation fan;

(b) said ventilation fan is mounted to said first battery mounting assembly adjacent a ventilation intake opening defined by said outer walls of said first battery mounting assembly;

(c) said ventilation fan is constructed, engaged to said first battery mounting assembly and electrically connected to fan controls in such a manner that, when said ventilation fan is operational, as air travels away from said ventilation fan it flows into as opposed to out of an interior of said first battery mounting assembly;

(d) said ventilation fan is positioned within said first battery mounting assembly such that when said ventilation fan is operational, a central portion of an air stream exiting said ventilation fan travels through spaces between said first upper row of batteries and said second upper row of batteries and/or spaces between said first lower row of batteries and said second lower row of batteries;

(e) said outer walls of said first battery mounting assembly define a ventilation exhaust opening through which air may be displaced from said interior of said first battery mounting assembly by air that is introduced to said interior of said first battery mounting assembly by said ventilation fan; and (f) said ventilation exhaust opening is disposed at a point in said outer walls substantially opposite said ventilation intake opening.

48. The vehicle of claim 47, wherein:

(a) said first battery mounting assembly further comprises a second upper battery tray that is releasably fixedly engaged to and supported by said first side wall and said second side wall; and (b) structure is present for releaseably clamping a plurality of batteries to said second upper battery tray.

49. The vehicle of claim 48, wherein:

(a) said first battery mounting assembly further comprises a first debris shield mounted to said first battery mounting assembly;

(b) said first debris shield comprises a first sheet barrier that is disposed substantially parallel to a portion of said outer walls of said first battery mounting assembly that defines said ventilation intake opening;

(c) said first sheet barrier is of such a shape and is positioned such that a large percentage of said intake ventilation opening is aligned with some portion of said first sheet barrier in directions perpendicular to said portion of said outer walls that defines said ventilation intake opening;

(d) said first sheet barrier extends downwardly from a portion of said first sheet barrier that is disposed adjacent to said ventilation intake opening to a first sheet barrier lower edge;

(e) said first sheet barrier is constructed and positioned such that a distance from said portion of said first sheet barrier that is disposed adjacent said ventilation intake opening to said first sheet barrier lower edge is considerably greater than a distance in directions perpendicular to said portion of said outer walls that defines said ventilation intake opening between said portion of said outer wall that defines said ventilation intake opening and said first sheet barrier;

(f) said first debris shield further comprises a first sheet barrier mounting wall;

(g) said first sheet barrier mounting wall is engaged to said first sheet barrier around a periphery of said first sheet barrier;

(h) said first sheet barrier mounting wall extends from said periphery of said first sheet barrier in directions toward said portion of said outer wall that defines said ventilation intake opening;

(i) a portion of said first sheet barrier mounting wall opposite a portion that is engaged to said periphery of said first sheet barrier is engaged to said portion of said outer wall that defines said ventilation intake opening;

(j) said first sheet barrier mounting wall is constructed and engaged to said first battery mounting assembly in a manner such that said first sheet barrier mounting wall extends in an unbroken manner between said portion of said outer wall that defines said ventilation intake opening and every portion of said periphery of said first sheet barrier with the exception of a portion of said periphery of said first sheet barrier that is disposed adjacent said first sheet barrier lower edge;

(k) said first battery mounting assembly further comprises a second debris shield mounted to said first battery mounting assembly;

(l) said second debris shield comprises a second sheet barrier that is disposed substantially parallel to a portion of said outer walls of said first battery mounting assembly that defines said ventilation exhaust opening;

(m) said second sheet barrier is of such a shape and is positioned such that a large percentage of said exhaust ventilation opening is aligned with some portion of said second sheet barrier in directions perpendicular to said portion of said outer walls that defines said ventilation exhaust opening;

(n) said second sheet barrier extends downwardly from a portion of said second sheet barrier that is disposed adjacent to said ventilation exhaust opening to a second sheet barrier lower edge;

(o) said second sheet barrier is constructed and positioned such that a distance from said portion of said second sheet barrier that is disposed adjacent said ventilation exhaust opening to said second sheet barrier lower edge is considerably greater than a distance in directions perpendicular to said second sheet barrier between said portion of said outer wall that defines said ventilation exhaust opening and said second sheet barrier;

(p) said second debris shield further comprises a second sheet barrier mounting wall;

(q) said second sheet barrier mounting wall is engaged to said second sheet barrier around a periphery of said second sheet barrier;

(r) said second sheet barrier mounting wall extends from said periphery of said second sheet barrier in directions toward said portion of said outer wall that defines said ventilation exhaust opening;

(s) a portion of said second sheet barrier mounting wall opposite a portion that is engaged to said periphery of said second sheet barrier is engaged to said portion of said outer wall that defines said ventilation exhaust opening; and (t) said second sheet barrier mounting wall is constructed and engaged to said first battery mounting assembly in a manner such that said second sheet barrier mounting wall extends in an unbroken manner between said portion of said outer wall that defines said ventilation exhaust opening and every portion of said periphery of said second sheet barrier with the exception of a portion of said periphery of said second sheet barrier that is disposed adjacent said second sheet barrier lower edge.

50. The vehicle of claim 49, wherein:

(a) one or more components of said first battery mounting assembly are made of steel;

(b) one or more of said components of said first battery mounting assembly that are made of steel are coated with an elastomer with high electrical resistance.

51. A vehicle, comprising:

(a) structural components, upon which a large percentage of components of said vehicle depend for support in a direct or indirect manner;

(b) wherein said structural components comprise a frame;

(c) a body, within which individuals and/or objects may be disposed and be isolated from undesirable elements of an environment outside said body;

(d) wherein said body is engaged to and supported by said frame;

(e) a suspension system for supporting said vehicle;

(f) wherein said frame is engaged to and supported by said suspension system;

(g) a first battery mounting assembly engaged to said vehicle;

(h) wherein said first battery mounting assembly comprises battery assembly mounting components engaged to said structural components of said vehicle;

(i) wherein said first battery mounting assembly further comprises breakaway components that are engaged to said battery assembly mounting components;

(j) wherein said breakaway components comprise a first lower battery tray that is engaged directly or indirectly to and supported by said battery assembly mounting components;

(k) wherein said breakaway components further comprise any components of said first battery mounting assembly necessary to secure batteries that are disposed upon said first lower battery tray, to said first lower battery tray;

(l) wherein said breakaway components and said battery assembly mounting components are constructed and engaged to one another and said structural components of said vehicle in a manner such that, when said first battery mounting assembly is subjected to relatively large forces in certain directions, such as would occur when said vehicle is involved in a traffic accident, certain, components of said battery assembly mounting components deform and/or fracture in a predetermined manner and/or certain engagements of said breakaway components, said battery assembly mounting components, and said structural components of said vehicle to one another allow relative motion to occur between one another in a predetermined manner such that said breakaway components move in predetermined manners relative to said vehicle and energy is absorbed and dissipated by said first battery mounting assembly as said breakaway components move relative to said vehicle;

(m) wherein said breakaway components are constructed and engaged to one another in a relatively rigid manner such that, if said first battery mounting assembly is subjected to relatively large forces that cause said breakaway components to move in predetermined manners relative to said vehicle, said breakaway components are prevented from moving relative to one another in all but relatively extreme traffic accidents;

(n) wherein said breakaway components and said battery assembly mounting components are constructed and engaged to one another and said structural components of said vehicle in a relatively strong manner such that, even when some components of said first battery mounting assembly deform and/or fracture, as a result of said first battery mounting assembly being subjected to relatively large forces and/or accelerations in certain directions, said first battery mounting assembly remains to be supported by said vehicle during and after all but relatively extreme traffic accidents;

(o) wherein said battery assembly mounting components of said first battery mounting assembly comprise one or more main support members;

(p) wherein said battery assembly mounting components comprise first battery assembly hangers that are engaged to said one or more main support members in a relatively rigid manner;

(q) wherein each of said first battery assembly hangers are engaged to said structural components of said vehicle by a main support bolt and one or more anti-rotation bolts;

(r) wherein each anti-rotation bolt is engaged to a first battery assembly hanger at a point distant from an axis of a shank of a main support bolt that is engaged to a same first battery assembly hanger as said anti-rotation bolt;

(s) wherein each main support bolt, each first battery assembly hanger, and said structural components of said vehicle are constructed with a strength such that engagement of each first battery assembly hanger to said structural components of said vehicle could be maintained by engagement of said first battery assembly hanger to said structural components of said vehicle by said main support bolt alone;

(t) wherein each main support bolt, each first battery assembly hanger, and said structural components of said vehicle are constructed with a strength such that, even if said first battery mounting assembly were subjected to relatively large forces and/or accelerations as a result of said vehicle being involved in a traffic accident, engagement of each first battery assembly hanger to said structural components of said vehicle would be maintained by engagement of said each battery assembly hanger to said structural components of said vehicle by said main support bolt alone; and (u) wherein said anti-rotation bolts are of a relatively weak construction as compared to said main support bolts.

52. The vehicle of claim 51, wherein:

(a) said first battery mounting assembly further comprises one or more bumper components;

(b) each of said one or more bumper components is engaged to one of said main support members and/or one of said first battery assembly hangers;

(c) each of said bumper components is positioned at a point farther from a centroid of said vehicle than one or more of said batteries that are mounted to said first battery mounting assembly are;

(d) each of said bumper components are positioned at a relative height similar to that of some of said batteries that are mounted to said first battery mounting assembly;

(e) said one or more bumper components and said one or more main support members and/or first battery assembly hangers that said bumper components are engaged to are of a relatively strong construction such that said bumper components can be subjected to relatively large forces in directions that would tend to drive said bumper components toward said batteries without said bumper components impacting said batteries.

53. The vehicle of claim 52, wherein:

(a) said vehicle further comprises a second battery mounting assembly;

(b) said vehicle further comprises one or more second battery assembly hangers engaged to said structural components of said vehicle in a relatively rigid manner;

(c) said second battery mounting assembly is engaged to and supported by said one or more second battery assembly hangers; and (d) one or more of said first battery assembly hangers are relatively rigidly engaged to one or more of said second battery assembly hangers.

54. The vehicle of claim 53, wherein:

(a) said first lower battery tray is engaged to and supported upon said one or more main support components;

(b) said breakaway components further comprise one or more upper tray support components directly or indirectly engaged to and supported by said one or more main support members and/or said first lower battery tray;

(c) said breakaway components comprise a first upper battery tray, upon which a plurality of said batteries that are mounted to said vehicle are supported, engaged to and supported by said one or more upper tray support components; and (d) at least a portion of said first upper battery tray is disposed directly vertically above said first lower battery tray at a distance above said first lower battery tray such that space is present between batteries supported upon said first lower battery tray and a lower surface of said first upper battery tray.

55. The vehicle of claim 54, wherein:

(a) said first upper battery tray is releaseably fixedly engaged to said upper tray support components;

(b) said breakaway components further comprise one or more clamping devices that releaseably clamp a plurality of said batteries to said first upper battery tray;

(c) said fixed engagement of said first upper battery tray to said upper tray supporting components is of a construction such that it may be released and said first upper batter tray may be separated from said first battery mounting assembly whether or not batteries are clamped to said first upper battery tray;

(d) whether said first upper battery tray is releaseably fixedly engaged to said upper tray support components or said first battery tray has been separated from said upper tray support components, said clamping devices that clamp said batteries to said first upper battery tray may be released and said batteries may be removed from said first upper battery tray one at a time.

56. The vehicle of claim 55, wherein:

(a) said upper tray support components comprise a first side wall;

(b) said first side wall is fixedly engaged to said first lower battery tray and/or one or more of said one or more main support members;

(c) said first side wall extends substantially vertically above said first lower battery tray;

(d) said upper tray support components comprise a second side wall;

(e) said second side wall is fixedly engaged to said first lower battery tray and/or one or more of said one or more main support members;

(f) said second side wall extends substantially vertically above said first lower battery tray;

(g) said first upper battery tray is engaged directly or indirectly to and is supported by said first side wall and said second side wall;

(h) said first side wall and said second side wall are positioned relative to one another such that a lower battery space is defined horizontally between said first side wall and said second side wall and vertically above at least a portion of said first lower battery tray;

(i) said first upper battery tray is disposed such that a majority of a battery support surface of said first upper battery tray is disposed horizontally between said first side wall and said second side wall;

(j) said breakaway components further comprise a first end wall and a second end wall;

(k) said first end wall is directly or indirectly fixedly engaged to said first lower battery tray and/or one or more of said one or more main support members and extends vertically above said first lower battery tray;

(l) said second end wall is directly or indirectly fixedly engaged to said first lower battery tray and/or one or more of said one or more main support members and extends vertically above said first lower battery tray;

(m) said first end wall and said second end wall are each substantially planar and are disposed such that they are substantially parallel to one another and perpendicular to said first side wall and said second side wall; and (n) said first end wall and said second end wall are each fixedly engaged to said side walls at outer end portions of said side walls.

57. The vehicle of claim 56, wherein:
(c) one or more of said first battery assembly hangers defines a support member recess; and
(a) a portion of one or more of said one or more main support members of said first battery mounting assembly protrudes into a support recess defined by a battery assembly hanger.

58. The vehicle of claim 57, wherein:
(a) said first side wall comprises a plurality of first side wall vertical tabs that are fixedly engaged to said first side wall and extend vertically from said first side wall to a point above said battery support surface of said first upper battery tray;
(b) said first side wall vertical tabs are spaced relative to one another such that first side wall tray locating slots are defined between respective ones of said first side wall vertical tabs;
(c) said first side wall and said first side wall vertical tabs are constructed and positioned relative to one another such that each of said first side wall tray locating slots extends upwardly to an upper end which is an opening between upper ends of adjacent first side wall vertical tabs;
(d) said second side wall comprises a plurality of second side wall vertical tabs that are fixedly engaged to said second side wall and extend vertically from said second side wall to a point above said battery support surface of said first upper battery tray;
(e) said second side wall vertical tabs are spaced relative to one another such that second side wall tray locating slots are defined between respective ones of said second side wall vertical tabs;
(f) said second side wall and said second side wall vertical tabs are constructed and positioned relative to one another such that each of said second side wall tray locating slots, extends upwardly from a lower end, to an upper end which is an opening between upper ends of adjacent second side wall vertical tabs;
(g) said first upper battery tray comprises a plurality of tray locating members;
(h) each respective tray locating member has a tray engagement end and a terminal end; and
(i) each of said tray locating members is fixedly engaged to said first upper battery tray and protrudes horizontally through a respective one of said first side wall tray locating slots or a respective one of said second side wall tray locating slots such that either said first side wall or said second side wall is disposed horizontally between a tray engagement end and a terminal end of each tray locating member.

59. The vehicle of claim 58, wherein:
(a) said breakaway components further comprise outer walls, and a lid;
(b) said outer walls are fixedly engaged to said first battery mounting assembly and extend vertically above said first lower battery tray;
(c) said outer walls are disposed relative to one another such that said upper tray support components are disposed horizontally between said outer walls;
(d) said lid is engaged to said first battery mounting assembly in a releasable manner;
(e) a lid top portion of said lid is disposed directly vertically above said first lower battery tray and said first upper battery tray at a height that allows for space between batteries that are disposed upon said first upper battery tray and said lid top portion;
(f) an outer shell of said first battery mounting assembly comprises said outer walls, said lid, and said first lower battery tray;
(g) said outer walls, said lid, and said first lower battery tray are constructed and engaged to said first battery mounting assembly such that said first side wall, said second side wall, said first upper battery tray, and said batteries that are mounted to said first battery mounting assembly are substantially surrounded in all directions horizontally and vertically by said outer shell of said first battery mounting assembly.

60. A vehicle, comprising:
(a) structural components, upon which a large percentage of components of said vehicle depend for support in a direct or indirect manner;
(b) wherein said structural components comprise a frame;
(c) a body, within which individuals and/or objects may be disposed and be isolated from undesirable elements of an environment outside said body;
(d) wherein said body is engaged to and supported by said frame;
(e) a suspension system for supporting said vehicle;
(f) wherein said frame is engaged to and supported by said suspension system;
(g) a first battery mounting assembly engaged to said vehicle;
(h) wherein said first battery mounting assembly comprises one or more first battery assembly hangers engaged to and supported by some of said structural components of said vehicle;
(i) wherein said first battery mounting assembly further comprises one or more main support members engaged to and supported by said one or more first battery assembly hangers;
(j) wherein said first battery mounting assembly further comprises a first lower battery tray, upon which a plurality of batteries are supported, engaged to and supported by said one or more main support members;
(k) wherein said first battery mounting assembly further comprises one or more bumper components;
(l) wherein each of said one or more bumper components is engaged to one of said main support members and/or one of said first battery assembly hangers;
(m) wherein each of said bumper components is positioned at a point farther from a centroid of said vehicle than one or more of said batteries that are mounted to said first battery mounting assembly are;
(n) wherein each of said bumper components are positioned at a relative height similar to that of some of said batteries that are mounted to said first battery mounting assembly; and
(o) said one or more bumper components and said one or more main support members and/or first battery assembly hangers that said bumper components are engaged to are of a relatively strong construction such that said bumper components can be subjected to relatively large forces in directions that would tend to drive said bumper components toward said batteries without said bumper components impacting said batteries.

61. The vehicle of claim 60, wherein:
(a) said vehicle further comprises a second battery mounting assembly;

(b) said vehicle further comprises one or more second battery assembly hangers that are fixedly engaged to said structural components of said vehicle;

(c) said second battery mounting assembly is engaged to and supported by said one or more second battery assembly hangers;

(d) one or more of said first battery assembly hangers are relatively rigidly engaged to one or more of said second battery assembly hangers.

62. The vehicle of claim 61, wherein:

(a) said first battery mounting assembly further comprises one or more upper tray support components directly or indirectly engaged to and supported by said one or more main support members and/or said first lower battery tray;

(b) said first battery mounting assembly further comprises a first upper battery tray, upon which a plurality of batteries are supported, engaged to and supported by said one or more upper tray support components; and (c) at least a portion of said first upper battery tray is disposed directly vertically above said first lower battery tray at a distance above said first lower battery tray such that one or more batteries are supported upon said first lower battery tray below said first upper battery tray and there is space between any of said batteries and a lower surface of said first upper battery tray.

63. The vehicle of claim 62, wherein:

(a) said first upper battery tray is releaseably fixedly engaged to said upper tray support components;

(b) said first battery mounting assembly further comprises one or more clamping devices that releaseably clamp a plurality of said batteries to said first upper battery tray;

(c) said fixed engagement of said first upper battery tray to said upper tray support components is of such a construction that it may be readily released and said first upper battery tray may be separated from said first battery mounting assembly whether or not said batteries are clamped to said first upper battery tray; and (d) said clamping devices that clamp said batteries to said first upper battery tray are of such a construction that, whether said first upper battery tray is releaseably fixedly engaged to said upper tray support components or said first upper battery tray has been separated from said upper tray support components, said one or more clamping devices that clamp said batteries to said first upper battery tray may be released and said batteries may be removed from said first upper battery tray one at a time.

64. The vehicle of claim 63, wherein:

(a) said upper tray support components comprise a first side wall;

(b) said first side wall is fixedly engaged to said first lower battery tray and/or one or more of said one or more main support members;

(c) said first side wall extends substantially vertically above said first lower battery tray;

(d) said upper tray support components comprise a second side wall;

(e) said second side wall is fixedly engaged to said first lower battery tray and/or one or more of said one or more main support members;

(f) said second side wall extends substantially vertically above said first lower battery tray;

(g) said first upper battery tray is engaged directly or indirectly to and is supported by said first side wall and said second side wall;

(h) said first side wall and said second side wall are positioned relative to one another such that a lower battery space is defined horizontally between said first side wall and said second side wall and vertically above at least a portion of said first lower battery tray;

(i) said first upper battery tray is disposed such that a majority of a battery support surface of said first upper battery tray is disposed horizontally between said first side wall and said second side wall;

(j) said first battery mounting assembly is further comprised of a first end wall and a second end wall;

(k) said first end wall is directly or indirectly fixedly engaged to said first lower battery tray and/or one or more of said one or more main support members and extends vertically above said first lower battery tray;

(l) said second end wall is directly or indirectly fixedly engaged to said first lower battery tray and/or one or more of said one or more main support members and extends vertically above said first lower battery tray;

(m) said first end wall and said second end wall are each substantially planar and are disposed such that they are substantially parallel to one another and perpendicular to said first side wall and said second side wall; and (n) said first end wall and said second end wall are each fixedly engaged to said side walls at outer end portions of said side walls.

* * * * *